US008789143B2

(12) United States Patent
Radhakrishnan et al.

(10) Patent No.: US 8,789,143 B2
(45) Date of Patent: Jul. 22, 2014

(54) METHOD AND APPARATUS FOR TOKEN-BASED CONDITIONING

(75) Inventors: Rakesh Radhakrishnan, Ashburn, VA (US); Cynthia Ann Frick, Newark, DE (US); Radu Marian, Indian Trail, NC (US); Abdulkader Omar Barbir, Ottawa (CA); Rajat P. Badhwar, Leesburg, VA (US)

(73) Assignee: Bank of America Corporation, Charlotte, NC (US)

( * ) Notice: Subject to any disclaimer, the term of this patent is extended or adjusted under 35 U.S.C. 154(b) by 88 days.

(21) Appl. No.: 13/210,164

(22) Filed: Aug. 15, 2011

(65) Prior Publication Data
US 2013/0047265 A1    Feb. 21, 2013

(51) Int. Cl.
*G06F 7/04* (2006.01)
*G06F 15/16* (2006.01)
*G06F 17/30* (2006.01)
*G06F 11/00* (2006.01)
*G06F 12/14* (2006.01)
*G08B 23/00* (2006.01)
*H04N 7/16* (2011.01)
*H04L 29/06* (2006.01)
*G06F 21/00* (2013.01)
*G06F 21/34* (2013.01)
*G06F 21/53* (2013.01)
*G06F 21/35* (2013.01)

(52) U.S. Cl.
CPC ........ *G06F 21/34* (2013.01); *G06F 2221/2137* (2013.01); *H04L 63/105* (2013.01); *G06F 2221/2113* (2013.01); *G06F 21/53* (2013.01); *H04L 63/102* (2013.01); *G06F 2221/2151* (2013.01); *G06F 21/35* (2013.01); *G06F 2221/2129* (2013.01)
USPC ............ 726/4; 726/5; 726/7; 726/21; 726/25; 726/26; 726/27; 726/28; 726/29; 726/30; 713/155; 713/182; 713/183

(58) Field of Classification Search
CPC ................... G06F 21/6218; G06F 2221/2141; G06F 21/6209; G06F 21/31; G06F 21/32; G06F 21/335; H04L 9/3213; H04L 9/3263; H04L 9/3226; H04L 63/102; H04L 63/105; H04L 63/0807; H04L 63/101; H04L 2463/082; H04L 67/306
USPC ................. 726/2–21; 713/150–159, 168–181
See application file for complete search history.

(56) References Cited

U.S. PATENT DOCUMENTS 5,634,122 A    5/1997 Loucks et al.
6,014,647 A *  1/2000 Nizzari et al. .................. 705/39
(Continued)

FOREIGN PATENT DOCUMENTS

WO   PCT/US12/50100    8/2012
WO   PCT/US12/50110    8/2012
(Continued)

OTHER PUBLICATIONS

*Protegrity Tokenization: Securing Sensitive Data for PCI HIPAA and Other Data Security Initiatives*; 13 pages, Mar. 2011.
(Continued)

*Primary Examiner* — Tae Kim
(74) *Attorney, Agent, or Firm* — Michael A. Springs

(57) ABSTRACT

According to one embodiment, an apparatus may store a plurality of tokens indicating a user is requesting access to a resource over a network. The apparatus may determine a condition associated with accessing the resource based on the plurality of tokens. The condition may be determined in addition to a determination to grant or deny access to the resource. The condition may include an obligation to be fulfilled and a message providing instruction regarding how to fulfill the obligation. The apparatus may generate a decision token representing the condition, and communicate the decision token to a resource provider to facilitate enforcement of the condition.

15 Claims, 38 Drawing Sheets

(56) References Cited

U.S. PATENT DOCUMENTS

| | | | |
|---|---|---|---|
| 6,182,142 | B1 | 1/2001 | Win et al. |
| 6,308,274 | B1 | 10/2001 | Swift |
| 6,427,151 | B1* | 7/2002 | Chan et al. ............................ 1/1 |
| 7,284,054 | B2* | 10/2007 | Radhakrishnan ............. 709/226 |
| 7,302,394 | B1 | 11/2007 | Baray et al. |
| 7,353,176 | B1 | 4/2008 | Baray et al. |
| 7,409,551 | B2* | 8/2008 | Fujishiro et al. .............. 713/171 |
| 7,434,252 | B2 | 10/2008 | Ballinger et al. |
| 7,502,933 | B2* | 3/2009 | Jakobsson et al. ............ 713/172 |
| 7,774,830 | B2 | 8/2010 | Dillaway et al. |
| 7,924,709 | B2 | 4/2011 | Lynn |
| 8,036,877 | B2 | 10/2011 | Treadgold et al. |
| 8,087,090 | B2* | 12/2011 | Cheng et al. ..................... 726/27 |
| 8,185,747 | B2* | 5/2012 | Wood et al. .................... 713/186 |
| 8,281,114 | B2* | 10/2012 | Linetsky ........................... 713/2 |
| 8,458,781 | B2 | 6/2013 | Radhakrishnan |
| 2001/0021950 | A1 | 9/2001 | Hawley et al. |
| 2002/0019932 | A1 | 2/2002 | Toh et al. |
| 2002/0019941 | A1 | 2/2002 | Chan et al. |
| 2002/0032742 | A1 | 3/2002 | Anderson |
| 2002/0124176 | A1 | 9/2002 | Epstein |
| 2003/0061496 | A1 | 3/2003 | Ananda |
| 2003/0101348 | A1* | 5/2003 | Russo et al. .................. 713/185 |
| 2003/0177376 | A1 | 9/2003 | Velleggia et al. |
| 2003/0217264 | A1 | 11/2003 | Martin et al. |
| 2004/0172535 | A1* | 9/2004 | Jakobsson et al. ............ 713/168 |
| 2004/0210771 | A1 | 10/2004 | Wood et al. |
| 2005/0081037 | A1* | 4/2005 | Kumagai et al. .............. 713/175 |
| 2005/0138433 | A1* | 6/2005 | Linetsky ....................... 713/202 |
| 2005/0254514 | A1 | 11/2005 | Lynn |
| 2006/0059548 | A1* | 3/2006 | Hildre et al. ....................... 726/9 |
| 2006/0123472 | A1 | 6/2006 | Schmidt et al. |
| 2006/0206931 | A1 | 9/2006 | Dillaway et al. |
| 2007/0198678 | A1 | 8/2007 | Dieberger et al. |
| 2008/0120699 | A1 | 5/2008 | Spear |
| 2008/0148339 | A1 | 6/2008 | Hill et al. |
| 2008/0189788 | A1* | 8/2008 | Bahl ............................... 726/25 |
| 2008/0235781 | A1 | 9/2008 | Sucher et al. |
| 2008/0244747 | A1* | 10/2008 | Gleichauf et al. ............. 726/25 |
| 2008/0263662 | A1 | 10/2008 | Cheng et al. |
| 2009/0024663 | A1* | 1/2009 | McGovern ................. 707/104.1 |
| 2009/0106557 | A1* | 4/2009 | Leonard ....................... 713/179 |
| 2009/0144248 | A1 | 6/2009 | Treadgold et al. |
| 2009/0210942 | A1 | 8/2009 | Abel |
| 2009/0300711 | A1 | 12/2009 | Tokutani et al. |
| 2009/0300744 | A1 | 12/2009 | Guo et al. |
| 2010/0115591 | A1 | 5/2010 | Kane-Esrig |
| 2010/0199089 | A1 | 8/2010 | Vysogorets et al. |
| 2011/0055913 | A1 | 3/2011 | Wong |
| 2011/0126275 | A1 | 5/2011 | Anderson et al. |
| 2011/0213807 | A1 | 9/2011 | Mattsson |
| 2011/0314533 | A1 | 12/2011 | Austin et al. |
| 2012/0005740 | A1* | 1/2012 | Wurth .............................. 726/9 |
| 2012/0060207 | A1 | 3/2012 | Mardikar et al. |
| 2012/0084869 | A1 | 4/2012 | Bilaney et al. |
| 2012/0089682 | A1 | 4/2012 | Wu et al. |
| 2012/0110318 | A1* | 5/2012 | Stone ............................ 713/150 |
| 2012/0144501 | A1 | 6/2012 | Vangpat et al. |
| 2012/0256725 | A1* | 10/2012 | Hayashi ....................... 340/5.81 |

FOREIGN PATENT DOCUMENTS

| | | |
|---|---|---|
| WO | PCT/US12/50227 | 8/2012 |
| WO | PCT/US12/50233 | 8/2012 |
| WO | PCT/US12/50237 | 8/2012 |
| WO | PCT/US12/50521 | 8/2012 |
| WO | PCT/US12/50537 | 8/2012 |
| WO | PCT/US12/50541 | 8/2012 |
| WO | PCT/US12/50547 | 8/2012 |
| WO | PCT/US12/50560 | 8/2012 |

OTHER PUBLICATIONS

Patent Pending U.S. Appl. No. 13/209,935 entitled *Method and Apparatus for Token-Based Container Chaining* in the name of Rakesh Radhakrishnan; 126 total pages, filed Aug. 15, 2011.
Patent Pending U.S. Appl. No. 13/210,075 entitled *Method and Apparatus for Token-Based Attribute Abstraction* in the name of Rakesh Radhakrishnan; 126 total pages, filed Aug. 15, 2011.
Patent Pending U.S. Appl. No. 13/210,139 entitled *Method and Apparatus for Token-Based Attribute Aggregation* in the name of Rakesh Radhakrishnan; 126 total pages, filed Aug. 15, 2011.
Patent Pending U.S. Appl. No. 13/210,120 entitled *Method and Apparatus for Token-Based Token Termination* in the name of Rakesh Radhakrishnan, et al.; 126 total pages, filed Aug. 15, 2011.
Patent Pending U.S. Appl. No. 13/210,222 entitled *Method and Apparatus for Token-Based Packet Prioritization* in the name of Rakesh Radhakrishnan, et al.; 126 total pages, filed Aug. 15, 2011.
Patent Pending U.S. Appl. No. 13/210,101 entitled *Method and Apparatus for Making Token-Based Access Decisions* in the name of Rakesh Radhakrishnan; 126 total pages, filed Aug. 15, 2011.
Patent Pending U.S. Appl. No. 13/210,167 entitled *Method and Apparatus for Token-Based Virtual Machine Recycling* in the name of Rakesh Radhakrishnan, et al.; 126 total pages, filed Aug. 15, 2011.
Patent Pending U.S. Appl. No. 13/210,113 entitled *Method and Apparatus for Token-Based Context Caching* in the name of Rakesh Radhakrishnan, et al.; 126 total pages, filed Aug. 15, 2011.
Patent Pending U.S. Appl. No. 13/210,145 entitled *Method and Apparatus for Token-Based Real-Time Risk Updating* in the name of Rakesh Radhakrishnan, et al.; 129 total pages, filed Aug. 15, 2011.
Patent Pending U.S. Appl. No. 13/210,213 entitled *Method and Apparatus for Token-Based Access of Related Resources* in the name of Rakesh Radhakrishnan, et al.; 126 total pages, filed Aug. 15, 2011.
Patent Pending U.S. Appl. No. 13/210,220 entitled *Method and Apparatus for Token-Based Tamper Detection* in the name of Rakesh Radhakrishnan, et al.; 126 total pages, filed Aug. 15, 2011.
Patent Pending U.S. Appl. No. 13/210,277 entitled *Method and Apparatus for Token-Based Reassignment of Privileges* in the name of Rakesh Radhakrishnan, et al.; 126 total pages, filed Aug. 15, 2011.
Patent Pending U.S. Appl. No. 13/210,246 entitled *Method and Apparatus for Token-Based Combining of Authentication Methods* in the name of Rakesh Radhakrishnan, et al.; 126 total pages, filed Aug. 15, 2011.
Patent Pending U.S. Appl. No. 13/210,262 entitled *Method and Apparatus for Token-Based Combining of Risk Ratings* in the name of Rakesh Radhakrishnan, et al.; 126 total pages, filed Aug. 15, 2011.
Patent Pending U.S. Appl. No. 13/210,276 entitled *Method and Apparatus for Token-Based Transaction Tagging* in the name of Rakesh Radhakrishnan, et al.; 126 total pages, filed Aug. 15, 2011.
Patent Pending U.S. Appl. No. 13/210,289 entitled *Method and Apparatus for Token-Based Re-Authentication* in the name of Rakesh Radhakrishnan, et al.; 126 total pages, filed Aug. 15, 2011.
U.S. Appl. No. 13/479,482, filed May 24, 2012, Radhakrishnan.
U.S. Appl. No. 13/479,489, filed May 24, 2012, Radhakrishnan.
U.S. Appl. No. 13/479,464, filed May 24, 2012, Radhakrishnan.
U.S. Appl. No. 13/479,516, filed May 24, 2012, Radhakrishnan.
U.S. Appl. No. 13/479,509, filed May 24, 2012, Radhakrishnan.
U.S. Appl. No. 13/479,560, filed May 24, 2012, Radhakrishnan.
U.S. Appl. No. 13/479,698, filed May 24, 2012, Radhakrishnan.
U.S. Appl. No. 13/479,498, filed May 24, 2012, Radhakrishnan.
U.S. Appl. No. 13/479,580, filed May 24, 2012, Radhakrishnan.
U.S. Appl. No. 13/479,667, filed May 24, 2012, Radhakrishnan.
U.S. Appl. No. 13/479,619, filed May 24, 2012, Radhakrishnan.
U.S. Appl. No. 13/479,616, filed May 24, 2012, Radhakrishnan.
U.S. Appl. No. 13/479,633, filed May 24, 2012, Radhakrishnan.
U.S. Appl. No. 13/479,491, filed May 24, 2012, Radhakrishnan.
U.S. Appl. No. 13/479,533, filed May 24, 2012, Radhakrishnan.
U.S. Appl. No. 13/479,554, filed May 24, 2012, Radhakrishnan.
U.S. Appl. No. 13/479,462, filed May 24, 2012, Radhakrishnan.
U.S. Appl. No. 13/479,452, filed May 24, 2012, Radhakrishnan.
U.S. Appl. No. 13/479,454, filed May 24, 2012, Radhakrishnan.
U.S. Appl. No. 13/479,480, filed May 24, 2012, Radhakrishnan.
Patent Cooperation Treaty, PCT/US12/50547, Notification of Transmittal of the International Search Report and the Written Opinion of the International Searching Authority, or the Declaration, mailed Oct. 18, 2012.

(56) References Cited

OTHER PUBLICATIONS

Patent Cooperation Treaty, PCT/US 12/50547, Notification of Transmittal of the International Search Report and the Written Opinion of the International Searching Authority, or the Declaration, mailed Dec. 13, 2012.

Pau-Chen Cheng et al., "Fuzzy Multi-Level Security: An Experiment on Quantified Risk Adaptive Access Control," Security, and Privacy, 2007, SP'07, IEEE Symposium pp. 222-230, May 20-23, 2007.

F. Pagano, D. Pagano; "Using In-Memory Encrypted Databases on the Cloud", 2011 IEEE, Sep. 6-8, 2011; 1st International Workshop on Securing Services on the Cloud (IWSSC) pp. 30-37.

\* cited by examiner

METHOD AND APPARATUS FOR TOKEN-BASED CONDITIONING

TECHNICAL FIELD

This disclosure relates generally to tokenization and, more specifically, to conditioning.

BACKGROUND

A security system may control a user's access to a resource. To gain access to the resource, the user may provide the security system with credentials, such as a user ID and a password. The security system may examine these credentials and various other factors such as, for example, factors associated with the user, the user's device, and the network environment in deciding whether to grant or deny access to the user. The security system may also perform several other functions related to the user's access to the resource.

SUMMARY OF THE DISCLOSURE

According to one embodiment, an apparatus may store a plurality of tokens indicating a user is requesting access to a resource over a network. The apparatus may determine a condition associated with accessing the resource based on the plurality of tokens. The condition may be determined in addition to a determination to grant or deny access to the resource. The condition may include an obligation to be fulfilled and a message providing instruction regarding how to fulfill the obligation. The apparatus may generate a decision token representing the condition, and communicate the decision token to a resource provider to facilitate enforcement of the condition.

Certain embodiments may provide one or more technical advantages. A technical advantage of one embodiment includes making more robust access decisions. Certain embodiments of the invention may include none, some, or all of the above technical advantages. One or more other technical advantages may be readily apparent to one skilled in the art from the figures, descriptions, and claims included herein.

BRIEF DESCRIPTION OF THE FIGURES

For a more complete understanding of the present invention and its features and advantages, reference is now made to the following description, taken in conjunction with the accompanying drawings, in which.

DETAILED DESCRIPTION OF THE FIGURES

Embodiments of the present invention and its advantages are best understood by referring to FIGS. 1 through 36, like numerals being used for like and corresponding parts of the various drawings.

Figure 1:
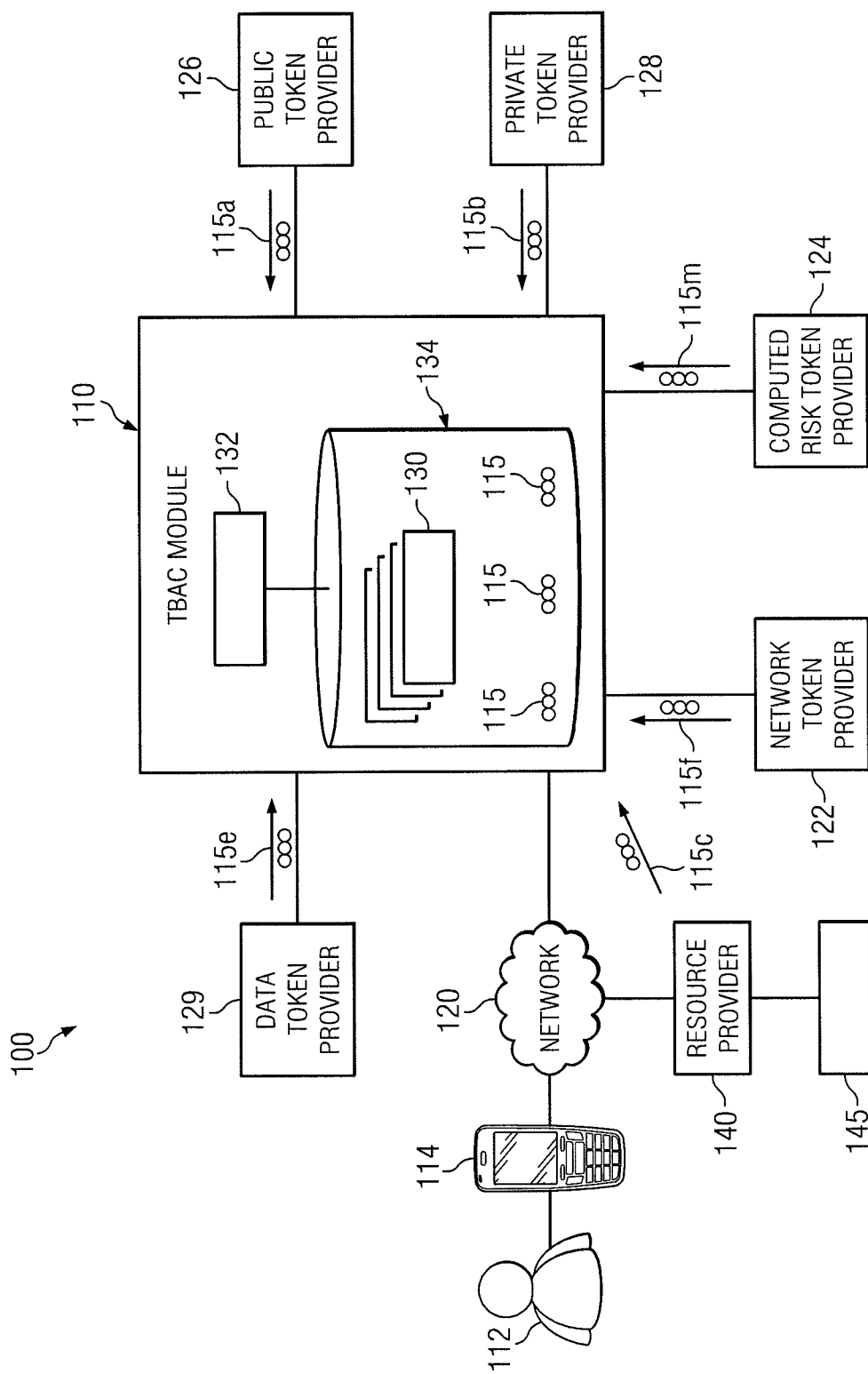
FIG. 1 illustrates a system for controlling access to a resource.

FIG. 1 illustrates a system 100 for controlling access to a resource 145. As provided in FIG. 1, system 100 may include a device 114, a network 120, a TBAC module 110, a resource provider 140, a network token provider 122, a computed risk token provider 124, a public token provider 126, and a private token provider 128. Device 114, resource provider 140, and TBAC module 110 may be coupled to network 120. In general, TBAC module 110 may use tokens 115 to control access by a user 112 to a resource 145 provided by resource provider 140. When user 112 uses device 114 to request a resource 145 from resource provider 140, TBAC module 110 may intercept the request and determine if user 112 should be granted access to the resource 145. TBAC module 110 may make this determination by examining tokens 115 from various token providers. Tokens 115 may provide TBAC module 110 with information associated with user 112, device 114, and network 120. After examining tokens 115, TBAC module 110 may grant access, deny access or condition access to the resource 145. Although this disclosure describes system 100 including specific elements, this disclosure contemplates system 100 including any suitable elements to perform the described operations of system 100. For example, system 100 may include more token providers than the ones listed above. System 100 may also operate across several networks 120.

In particular embodiments, system 100 may be operable to make token-based access decisions in lieu of attribute-based access decisions. For example, system 100 may examine and process tokens 115 in determining whether to grant a user 112 access to a resource 145. System 100 may also communicate and receive communications in the form of tokens 115. In particular embodiments, tokens 115 may represent a plurality of properties, qualities, or features, also known as attributes, belonging to a user 112, a device 114, a network 120, or a resource 145. A token 115 may represent hundreds or even thousands of attributes. Although this disclosure describes tokens 115 representing attributes of particular elements, this disclosure contemplates tokens 115 representing attributes of any element of system 100. In particular embodiments, tokens 115 may also represent a plurality of other tokens 115. In this manner, system 100 may use tokens 115 to communication information about attributes and other tokens 115.

Tokens 115 may be generated by TBAC module 110 and the various token providers, such as for example, the public token provider 126. Each token 115 may have a type that depends upon the source of the token 115. As an example and not by way of limitation, token 115 may be a public token 115a, private token 115b, resource token 115c, risk token 115m, data token 115e, or network token 115f pursuant to the particular token provider that generated the token 115. Although this disclosure describes token 115 being of particular types, this disclosure contemplates tokens 115 being of any suitable type to perform the operations of system 100. Specific token types will be discussed further below. Because system 100 is a token-based system, system 100 may process a plurality of attributes and tokens 115 in the form of a token 115 rather than separately processing the individual attributes or tokens 115. In this manner, system 100 may make more efficient and quicker access decisions.

System 100 may include a user 112 and device 114. As an example and not by way of limitation, device 114 may be a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 100. Device 114 may also include a user interface, such as a display, a microphone, keypad, or other appropriate terminal equipment usable by user 112. In particular embodiments, device 114 may be configured to request and consume resources 145 provided by resource provider 140. In some embodiments, an application executed by device 114 may request and consume the resource 145. Although this disclosure describes device 114 with respect to particular types of devices, this disclosure contemplates device 114 being any suitable device.

In particular embodiments, device 114 may be operable to send information to identify device 114 to other system 100 components. As an example and not by way of limitation, device 114 may send a MAC address, IP address, and/or device name to identify device 114 to system 100 components. Although this disclosure describes device 114 sending particular types of information used to identify device 114, this disclosure contemplates device 114 sending any suitable information used to identify device 114. In particular embodiments, device 114 may be operable to send information to verify device 114 is compliant to consume a requested resource 145. As an example and not by way of limitation, device 114 may send an OS version, firmware version, and/or operating speed. Although this disclosure describes device 114 sending particular types of information used to verify the compliance of device 114, this disclosure contemplates device 114 sending any suitable information used to verify the compliance of device 114.

User 112 may use device 114 to send information to identify or authenticate user 112 to other system 100 components. As an example and not by way of limitation, user 112 may send a user ID and/or a password. Although this disclosure describes user 112 using device 114 to send particular types of information used to identify user 112, this disclosure contemplates user 112 using device 114 to send any suitable information used to identify user 112.

System 100 includes network 120. Device 114 may communicate with TBAC module 110 and resource provider 140 through network 120. This disclosure contemplates any suitable network 120 operable to facilitate communication between the components of system 100, such as device 114 and TBAC module 110. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 includes resource provider 140. Resource provider 140 may be operable to provide resources 145 to be consumed by device 114. As an example and not by way of limitation, resource provider 140 may provide device 114 an instance of an application from a cloud. As another example, resource provider 140 may provide computing power and send the results of a computation to device 114. Resource 145 may also be, for example, a service, an application, or a virtual machine. In particular embodiments, resource provider 140 may be operable to send resource tokens 115c to TBAC module 110. Resource tokens 115c may identify the types of resources 145 provided by resource provider 140. Resource tokens 115c may also identify the types of resources 145 requested by device 114. As an example and not by way of limitation, a particular resource token 115c may indicate that resource provider 140 has been requested to provide a financial application to device 114. Resource provider 140 may further include a policy enforcement point. In particular embodiments, the policy enforcement point may restrict or exclude user 112 from accessing a resource 145 until TBAC module 110 grants access to user 112.

System 100 may include public token provider 126, network token provider 122, computed risk token provider 124, private token provider 128, and data token provider 129. These token providers may provide TBAC module 110 with particular types of tokens 115. Public token provider 126 may provide public tokens 115a (standardized and non-standardized), such as for example, Kerberos and SAML tokens. Network token provider 122 may provide network tokens 115f used to determine the status, vulnerability, congestion, etc. of network 120. Private token provider 128 may provide private tokens 115b, such as for example, custom tokens and private key tokens. Data token provider 129 may provide data tokens 115e, such as for example, tokens 115 representing social security numbers, dates, or email addresses. Computed risk token provider 124 may calculate risk tokens 115m indicating the risk associated with granting user 112 and/or device 114 access to a requested resource 145 over network 120. When an element of device 114 or network 120 changes, computed risk token provider 124 may update the risk token 115m associated with granting access to resource 145.

Each token 115 may represent a set of attributes that describe user 112, device 114, network 120, or an action or set of actions performed by user 112. It may take hundreds or thousands of attributes to fully describe user 112, device 114, network 120, and a set of actions performed by user 112. Because of the large number of attributes used, it may be faster and more efficient to examine tokens 115, that embody or represent a set or group of attributes, rather than the individual attributes when making a determination of whether to grant or deny access to a resource or service. In particular embodiments, system 100 may provide more efficient access control because system 100 makes access decisions based on tokens 115 rather than attributes. Because an access decision may depend upon thousands of attributes, the access decision may be quickened if system 100 examined tokens 115 that were abstracted from groups of attributes. By examining tokens 115 rather than attributes, TBAC module 110 may focus on processing access rules rather than identifying attributes and attribute relationships.

When particular changes occur in user 112, device 114, network 120, or resource provider 140, the various token providers, device 114, or resource provider 140 may generate and send a new token 115 to TBAC module 110. The new token 115 may represent the state of user 112, device 114, network 120, or resource provider 140 after the change. The new token 115 may trigger TBAC module 110 to perform a particular process or action in response to the new state. As an example and not by way of limitation, if user 112 attaches a peripheral device, such as a USB drive, to device 114, then device 114 may generate and send a new token 115 to TBAC module 110 to indicate the presence of the peripheral device, and computed risk token provider 124 may calculate and send TBAC module 110 a new risk token 115g taking into account the presence of the peripheral device. In response, TBAC module 110 may produce an error or terminate the session if the new risk token 115g indicates the peripheral device presents an unacceptable risk.

In particular embodiments, system 100 may include TBAC module 110. TBAC module 110 may include a processor 132 coupled to a memory 134. TBAC module 110 may be coupled to and may receive tokens 115 from public token provider 126, network token provider 122, computed risk token provider 124, and private token provider 128. TBAC module 110 may examine tokens 115 from the various token providers to determine if user 112 and device 114 should be granted access to a resource 145 or service.

TBAC module 110 may include memory 134. Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices. Memory 134 may store tokens 115 and any relationships amongst the tokens 115. In particular embodiments, memory 134 may further store sets of token-based rules 130. Rules 130 may direct how TBAC module 110 responds to a particular set of received tokens 115.

Memory 134 may store four particular sets of token-based rules 130, each corresponding to a particular operation of TBAC module 110. The first set of rules 130 is the container chaining rules discussed with respect to FIGS. 2 and 3. The second set of rules 130 is the attribute aggregation and assimilation rules discussed with respect to FIGS. 4 and 5. The third set of rules 130 is the attribute abstraction rules discussed with respect to FIGS. 6 and 7. The fourth set of rules 130 is the tabular trust and transaction rules discussed with respect to FIGS. 8-10. Each set of rules 130 may facilitate a function of the TBAC module 110. For example, the tabular trust and transaction rules may facilitate the grant or denial of access to a resource 145 by TBAC module 110.

TBAC module 110 may include processor 132. Processor 132 may control the operation and administration of TBAC module 110 by processing information received from network 120 and memory 134. Processor 132 may include any hardware and/or software that operates to control and process information. For example, processor 132 may examine a set of tokens 115 and apply a token-based rule 130 associated with the set of tokens 115. Processor 132 may be a programmable logic device, a microcontroller, a microprocessor, any suitable processing device, or any suitable combination of the preceding.

In operation, TBAC module 110 may perform four primary functions: chaining containers, aggregating attributes, abstracting attributes, and making access decisions. In chaining containers, TBAC module 110 may examine a set of tokens 115 to determine if a device 114 is capable of consuming a requested resource 145. This function will be discussed further with respect to FIGS. 2 and 3. In aggregating attributes, TBAC module 110 may retrieve, as tokens 115, the attributes required to grant access to a particular resource 145. This function will be discussed further with respect to FIGS. 4 and 5. In abstracting attributes, TBAC module 110 may communicate a plurality of tokens 115 to be used in the computing of a risk token 115m. This function will be discussed further with respect to FIGS. 6 and 7. In making an access decision, TBAC module 110 may examine a plurality of tokens 115 to determine whether to grant access, deny access, or condition access to a resource 145. This function will be discussed further with respect to FIGS. 8-10.

In addition, TBAC module 110 may perform four other categories of functions as described in this disclosure. The first category of functions pertains to user 112: re-authentication, combining authentication methods, reassigning privileges, and packet prioritization. During re-authentication, TBAC module 110 may prompt user 112 for a one-time password generated using the personal information of the user 112. This function will be discussed further with respect to FIGS. 11 and 12. During combining authentication methods, TBAC module 110 may examine multiple authentication methods to determine if a particular combination of authentication methods leads to the assignment of a privilege to user 112. This function will be discussed further with respect to FIGS. 13 and 14. During reassigning privileges, TBAC module 110 may detect a change that poses a risk associated with granting the user 112 a certain privilege, and may update the privileges accordingly. This function will be further discussed with respect to FIGS. 15 and 16. During packet prioritization, TBAC module 110 may prioritize the packets of a high priority user 112 over the packets of users 112 with a lower priority. This function will be further discussed with respect to FIGS. 17 and 18.

The second category of functions pertains to access decisions: conditioning, accessing related resources, real-time risk updating, combining risk ratings, and transaction tagging. During conditioning, TBAC module 110 may determine any conditions associated with an access decision, and may communicate the conditions. This function will be further discussed with respect to FIGS. 19 and 20. During accessing related resources, TBAC module 110 may determine if a user 112 may access any resources 145 related to a requested resource 145. This function will be further discussed with respect to FIGS. 21 and 22. During real-time risk updating, TBAC module 110 may update the risk associated with granting a user 112 or device 114 access to a resource 145 in real-time, even as the device 114 may be consuming the resource 145. This function will be discussed further with respect to FIGS. 23 and 24. During combining risk ratings, TBAC module 110 may examine multiple risk ratings associated with granting access to various resources to determine a composite risk associated with user 112 and device 114. This function will be discussed further with respect to FIGS. 25 and 26. During transaction tagging, TBAC module 110 may detect suspicious transactions and tag them for monitoring and isolation. This function will be discussed further with respect to FIGS. 27 and 28.

The third category of functions pertains to devices 114 and token providers: context caching and virtual machine recycling. During context caching, an attribute cache may be cleansed and updated based on tokens 115 involved in a risk computation. This function will be discussed further with respect to FIGS. 29 and 30. During VM recycling, TBAC module 110 may facilitate the recycling of stale virtual machines. This function will be discussed further with respect to FIGS. 31 and 32.

The fourth category of functions pertains to tokens 115: token termination and tamper detection. During token termination, TBAC module 110 may terminate and initialize tokens 115 for particular resources based on risk. This function will be discussed further with respect to FIGS. 33 and 34. During tamper detection, TBAC module 110 may detect if a token 115 has been tampered, and if so, may re-generate that token 115. This function will be discussed further with respect to FIGS. 35 and 36. Although particular functions have been previewed above in conjunction with particular figures in order to organize the subject matter for the reader, it should be understood that the present disclosure contemplates any suitable number and combination of components and functions regardless of any specific reference to the figures.

The functions of the TBAC module 110 described herein may be performed by executing software stored in one or more non-transitory storage media, such as a computer-readable medium or any other suitable tangible medium. In particular embodiments, TBAC module 110 or any other suitable component such as, for example, processor 132, may execute software stored in the one or more storage media to perform any of the functions of the TBAC module 110 described herein.

In particular embodiments, because TBAC module 110 communicates and processes tokens 115 rather than attributes and because TBAC module 110 operates on multiple types of tokens 115 from different sources, rather than only one type of token (for example, a subject token 115$b$), TBAC module 110 may make quicker and more efficient decisions with more granularity and particularity as to user 112, device 114, network 120, and the requested resource 145. TBAC module 110 may consider a large number of attributes and tokens 115 by examining only a few tokens 115. This may reduce the processing time and memory profile associated with any particular operation. Further advantages may be readily apparent from the present disclosure.

Figure 2:
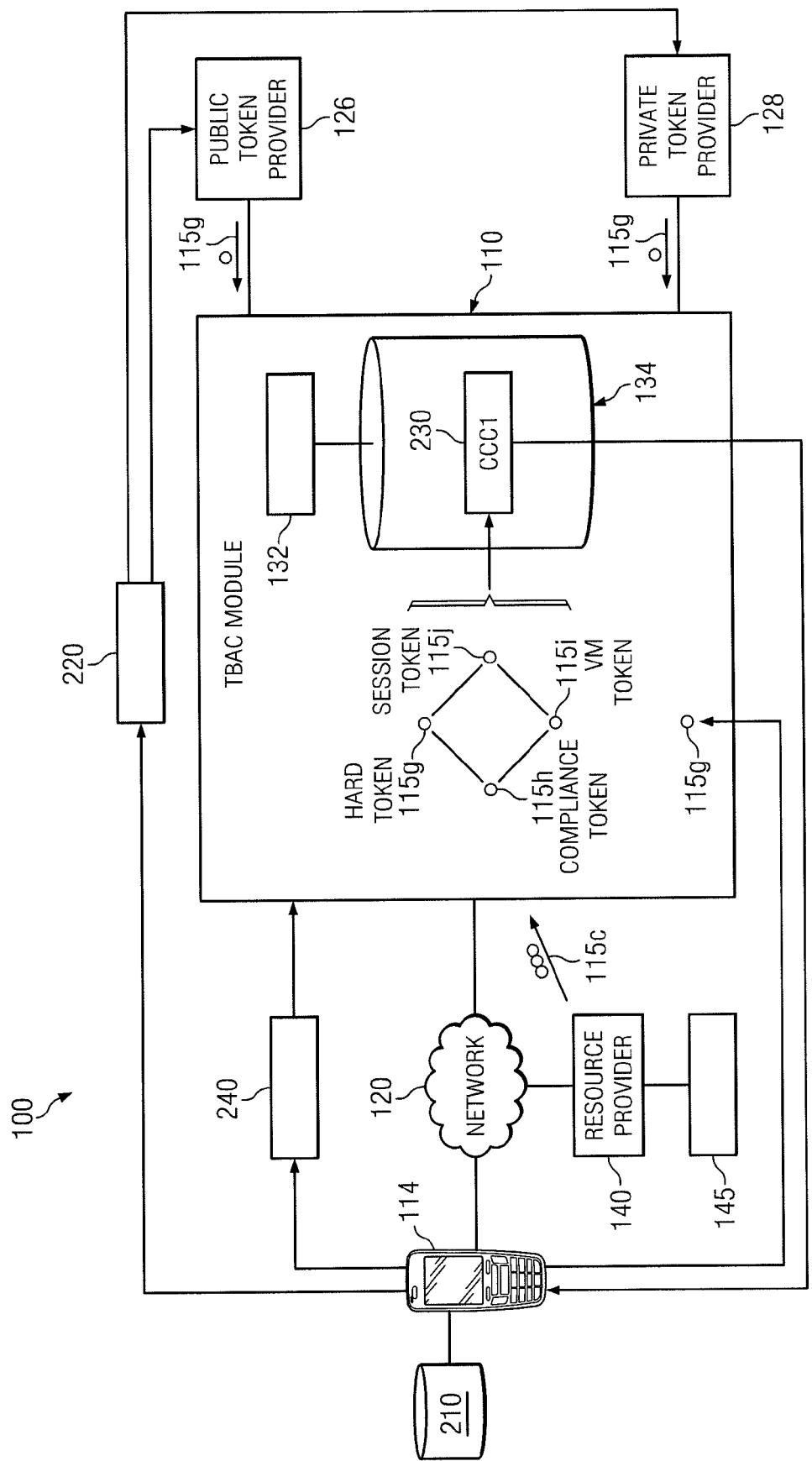
FIG. 2 illustrates the system of FIG. 1 chaining a container.
Figure 3:
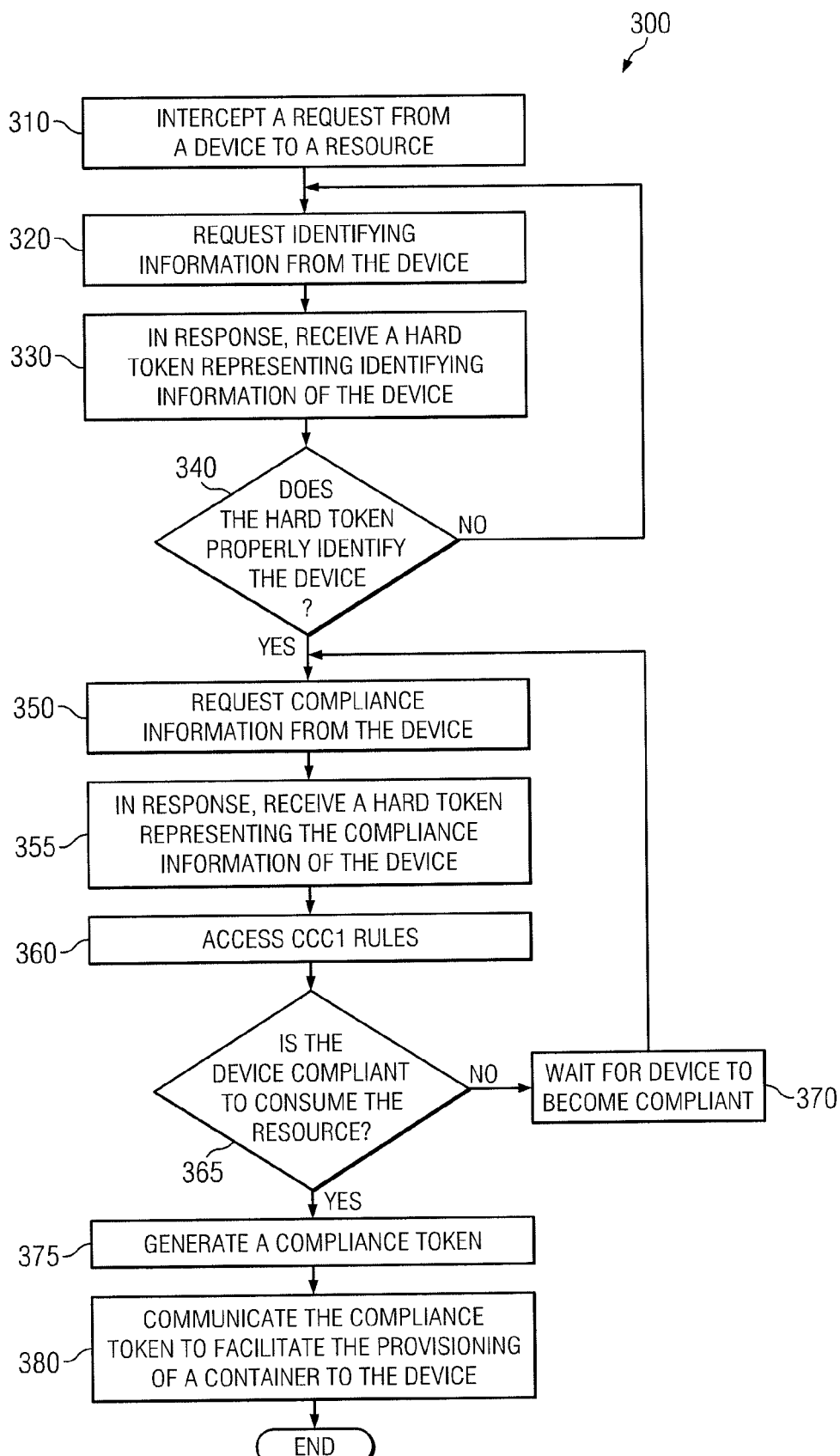
FIG. 3 is a flowchart illustrating a method of chaining a container using the system of FIG. 1.

FIGS. 2 and 3 illustrate how system 100 may perform the container chaining function to prepare a device 114 to consume a resource 145. Prior to granting device 114 access to the resource 145, device 114 is provisioned with an appropriate container 210 that is capable of facilitating access to and consumption of the resource 145. For example, the device 114 may be provisioned a container 210 that includes a virtual machine that can be used to consume the resource 145. Prior to provisioning such a container 210, however, system 100 ensures that the device 114 is compliant, among other things. This process of checking the compliance of the device 114 and subsequently provisioning a container 210 to the device 114 is referred to as container chaining and will be described in greater detail with respect to FIGS. 2 and 3.

When system 100 receives an initial request 240 from device 114 for access to a particular resource 145, system 100 may first identify device 114 and then verify that device 114 is compliant for consuming the requested resource 145. By identifying device 114 and verifying its compliance, system 100 may reduce the chances of granting device 114 access to a resource 145 it cannot consume. For example, if device 114 contains old versions of firmware or obsolete hardware, it may not be desirable to grant device 114 access to a resource 145 that requires updated firmware or to a resource 145 that requires fast processing speeds. After system 100 identifies device 114 and verifies that device 114 is compliant, system 100 may provision a container 210 to device 114. Container 210 may facilitate access to and consumption of the resource 145. In particular embodiments, system 100 may use tokens 115 to perform the container chaining function thereby increasing the speed and efficiency at which system 100 may perform the function.

FIG. 2 illustrates the system 100 of FIG. 1 chaining a container 210. As provided in FIG. 2, TBAC module 110 may direct the container chaining process. The first task is for TBAC module 110 to identify device 114. After device 114 requests a resource 145, represented by resource token 115$c$, from resource provider 140, TBAC module 110 may intercept the request 240 and request device 114 to identify itself. In response, device 114 may send identifying information 220 to a public token provider 126 or to a private token provider 128. As an example and not by way of limitation, device 114 may send a MAC address, an IP address, and/or a device name. Public token provider 126 or private token provider 128 may provide TBAC module 110 with a hard token 115$g$ that represents the identifying information 220 sent by device 114. Although this disclosure describes hard token 115$g$ representing particular information 220 used to identify device 114, this disclosure contemplates hard token 115$g$ representing any suitable information 220 that identifies device 114, such as for example, information from Layer 2 of the Open Systems Interconnection (OSI) stack. Although this disclosure describes a singular hard token 115g representing identification information of device 114, this disclosure contemplates any number and combination of hard tokens 115g representing the identification information 220. Resource provider 140 may further send to TBAC module 110 resource token 115c representing resource 145. Although this disclosure describes a singular resource token 115c representing resource 145, this disclosure contemplates any number and combination of resource tokens 115c representing resource 145.

After TBAC module 110 identifies device 114, TBAC module 110 may verify the compliance of device 114 to reduce the chances of granting device 114 access to a resource 145 that device 114 cannot consume. TBAC module 110 may use container chaining (CCC1) rules 230 stored in memory 134 to facilitate verifying the compliance of device 114. TBAC module 110 may use hard token 115g and resource token 115c to access CCC1 rules 230. By using CCC1 rules 230, TBAC module 110 may verify the compliance of device 114 to consume the requested resource 145 and may facilitate the provisioning of container 210 to device 114. As an example and not by way of limitation, a particular CCC1 rule 230 may specify certain compliance criteria in order for a device 114 identified by hard token 115g to consume the resource 145 associated with resource token 115c. For example, CCC1 rule 230 may specify that device 114 contain particular versions of firmware or operating system, or that device 114 meet particular hardware requirements. TBAC module 110 may determine the particular CCC1 rule 230 using hard token 115g and resource token 115c. TBAC module 110 may determine the compliance criteria from the determined CCC1 rule 230. In particular embodiments, TBAC module 110 may request and in response, receive another hard token 115g representing the compliance information of device 114, and TBAC module 110 may verify device 114 is compliant by comparing the compliance information against the determined compliance criteria. As an example and not by way of limitation, a particular CCC1 rule 230 may specify that a device 114 should be operating a particular version of firmware in order to consume the resource 145. TBAC module 110 may receive another hard token 115g representing the firmware version of the device 114. TBAC module 110 may then verify that device 114 contains a valid version of firmware by comparing the firmware version of device 114 with the particular firmware version specified by CCC1 rule 230. In particular embodiments, TBAC module 110 may quarantine device 114 until device 114 verifies that it is compliant or capable of consuming the requested resource 145 pursuant to CCC1 rule 230. After verifying that device 114 is compliant, TBAC module 110 may generate or receive a compliance token 115h. TBAC module 110 may then correlate hard token 115g and compliance token 115h in order to associate device 114 with its compliance information.

After device 114 has been deemed compliant, TBAC module 110 may communicate the compliance token 115h to facilitate the provisioning of container 210 to device 114. Container 210 may facilitate the consumption of the resource 145. In particular embodiments, container 210 may include a virtual machine operable to execute an application that consumes the requested resource 145. The virtual machine may be an application that executes on device 114 to simulate the operation of another device or a cloud resource. After device 114 has been provisioned with container 210, TBAC module 110 may receive a virtual machine (VM) token 115i. TBAC module 110 may correlate VM token 215c with hard token 115g and compliance token 115h so that information associated with container 210 may be associated with device 114.

In particular embodiments, TBAC module 110 may generate and correlate a session token 115j with hard token 115g, compliance token 115h, and VM token 115i in order to associate device 114 and container 210 to a session. Resource token 115c may also be associated with session token 115j. Session token 115j may represent the session. In particular embodiments, the session may facilitate access by device 114 to the resource 145. After correlating hard token 115g, compliance token 115h, VM token 115i, and session token 115j, any changes that occur to device 114 or to container 210 may alter or terminate the session. As an example and not by way of limitation, if a virus or malware is detected on device 114, TBAC module 110 may detect a new or altered token 115 associated with device 114 and terminate the session associated with session token 115j. Upon termination of the session, container 210 may be released. As another example and not by way of limitation, if a peripheral device is attached to device 114, TBAC module 110 may detect a token 115 associated with the peripheral device, then TBAC module 110 may pause the session. TBAC module 110 may recheck the compliance of device 114 (i.e., to check if device 114 is allowed to consume the requested resource 145 when device 114 has a peripheral device attached). If device 114 is compliant, TBAC module 110 may continue the session associated with session token 115j. In particular embodiments, TBAC module 110 may communicate to device 114, by way of tokens 115, that a session has been terminated or paused.

In particular embodiments, TBAC module 110 may perform the container chaining function to verify that a device 114 is compliant to reduce the chances of granting device 114 access to a resource 145 that it cannot consume. Furthermore, verifying compliance may make it more probable that device 114 may consume the resource 145 at an acceptable pace. As an example and not by way of limitation, if device 114 included obsolete hardware, TBAC module 110 may deny access because granting access may lead to slow execution. In particular embodiments, because TBAC module 110 uses tokens 115 rather than attributes in performing the container chaining function, TBAC module 110 may quickly and efficiently verify that device 114 is compliant.

Although this disclosure describes TBAC module 110 performing certain actions with respect to FIG. 2, this disclosure contemplates the processor 132 and the memory 134 of the TBAC module 110 performing these actions. The illustration of system 100 in FIG. 2 does not specifically illustrate all of the elements from the illustration of system 100 in FIG. 1 so that particular aspects of system 100 may be emphasized. However, system 100 of FIG. 2 includes all the elements of system 100 in FIG. 1.

FIG. 3 is a flowchart illustrating a method 300 of chaining a container 210 using the system 100 of FIG. 1. TBAC module 110 may perform method 300. As provided in FIG. 3, TBAC module 110 may begin by intercepting a request 240 from a device 114 to a resource 145 in step 310. In response, TBAC module 110 may proceed to identify device 114. To identify device 114, TBAC module 110 may request identifying information 220 from the device 114 in step 320. Identifying information 220 may be a MAC address, an IP address, a device name, or any suitable information used to identify the device 114. In response to the request, TBAC module 110 may receive a hard token 115g in step 330. Hard token 115g may represent identifying information 220 of the device 114. In step 340, TBAC module 110 may determine if the hard token 115g properly identifies the device 114. If the hard token 115g does not properly identify the device 114, TBAC module 110 may return to step 320 to request identifying information 220 from the device 114. If the hard token 115g does properly identify the device 114, TBAC module 110 may consider device 114 identified and continue to verify the compliance of device 114.

TBAC module 110 may verify that device 114 is compliant to consume the resource. By verifying that device 114 is compliant, TBAC module 110 may reduce the chances of granting access to a resource 145 that device 114 cannot consume. TBAC module 110 may begin verifying compliance in step 350 by requesting compliance information from the device 114. Compliance information may indicate whether the device 114 is capable of consuming the requested resource 145. In response to the request, TBAC module 110 may receive a hard token 115g representing the compliance information of the device 114 in step 355. TBAC module 110 may then access CCC1 rules 230 in step 360 to compare the compliance information of the device 114 against compliance criteria specified by a particular CCC1 rule 230. In step 365, TBAC module 110 may determine, based on the CCC1 rule 230, whether the device 114 is compliant to consume the resource 145. If the device 114 is not compliant, TBAC module 110 may move to step 370 by waiting for the device 114 to become compliant. As an example and not by way of limitation, device 114 may be incompliant because the firmware in device 114 needs to be updated. TBAC module 110 may wait for device 114 to update its firmware before proceeding to the next step. If the device 114 becomes compliant, TBAC module 110 may return to step 350 and request compliance information from the device 114.

If the device 114 is compliant for the requested resource 145, TBAC module 110 may generate a compliance token 115h in step 375. The compliance token 115h may represent the compliance of device 114. TBAC module 110 may then conclude by communicating the compliance token 115h to facilitate the provisioning of a container 210 to the device 114 in step 380. In particular embodiments, the container 210 may facilitate access by the device 114 to the resource 145.

In particular embodiments, correlating hard tokens 115g, compliance tokens 115h, VM tokens 115i, resource tokens 115c, and session token 115j, may provide more efficient handling of the identification and verification of device 114. Rather than examining thousands of attributes used to identify device 114 and the requested resource 145, TBAC module 110 may examine session token 115j and the tokens 115 correlated with it to discover the state of device 114 and container 210. By following method 300, TBAC module 110 may more efficiently identify and verify device 114 for consuming the requested resource 145.

Figure 4:
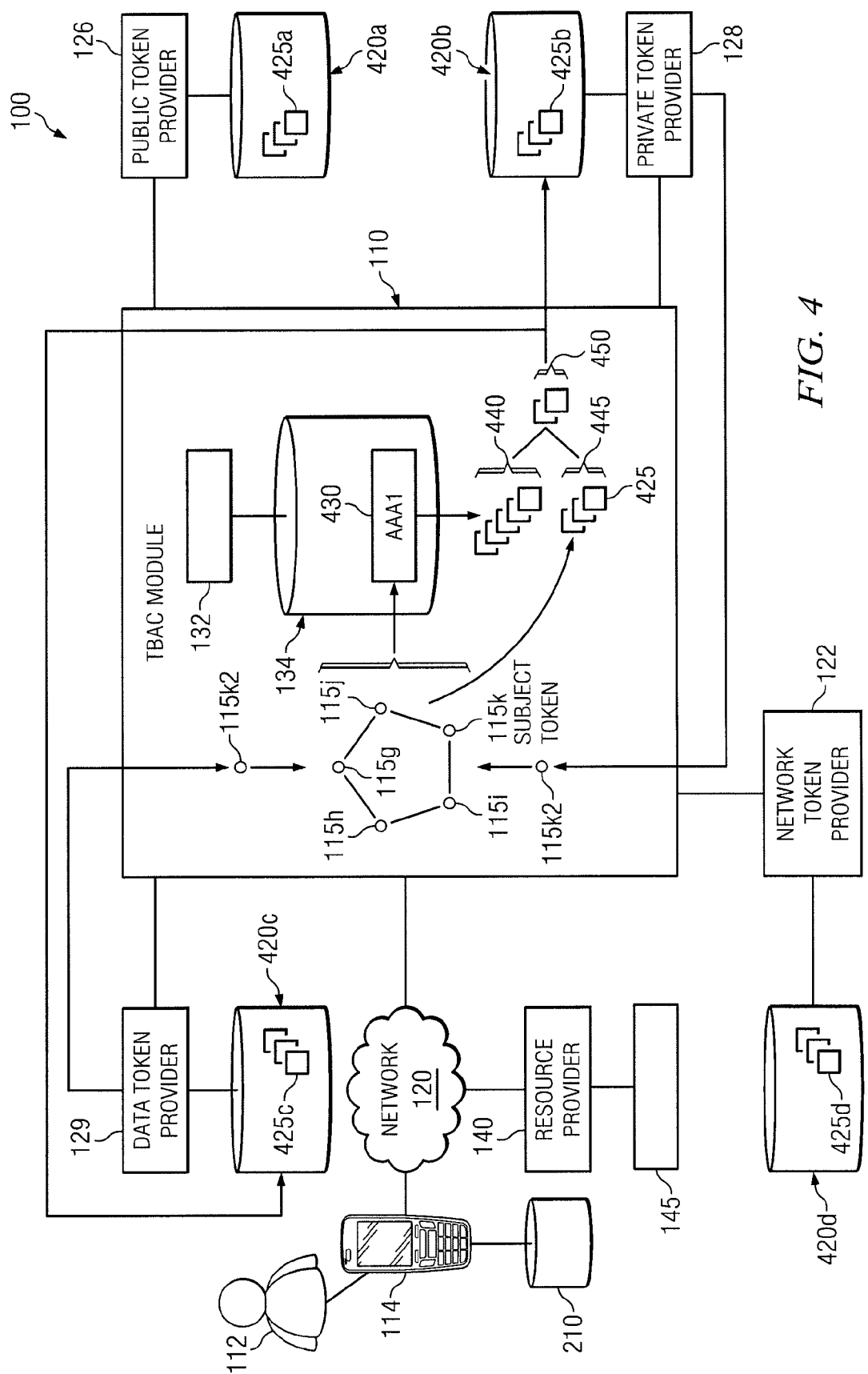
FIG. 4 illustrates the system of FIG. 1 aggregating attributes.
Figure 5:
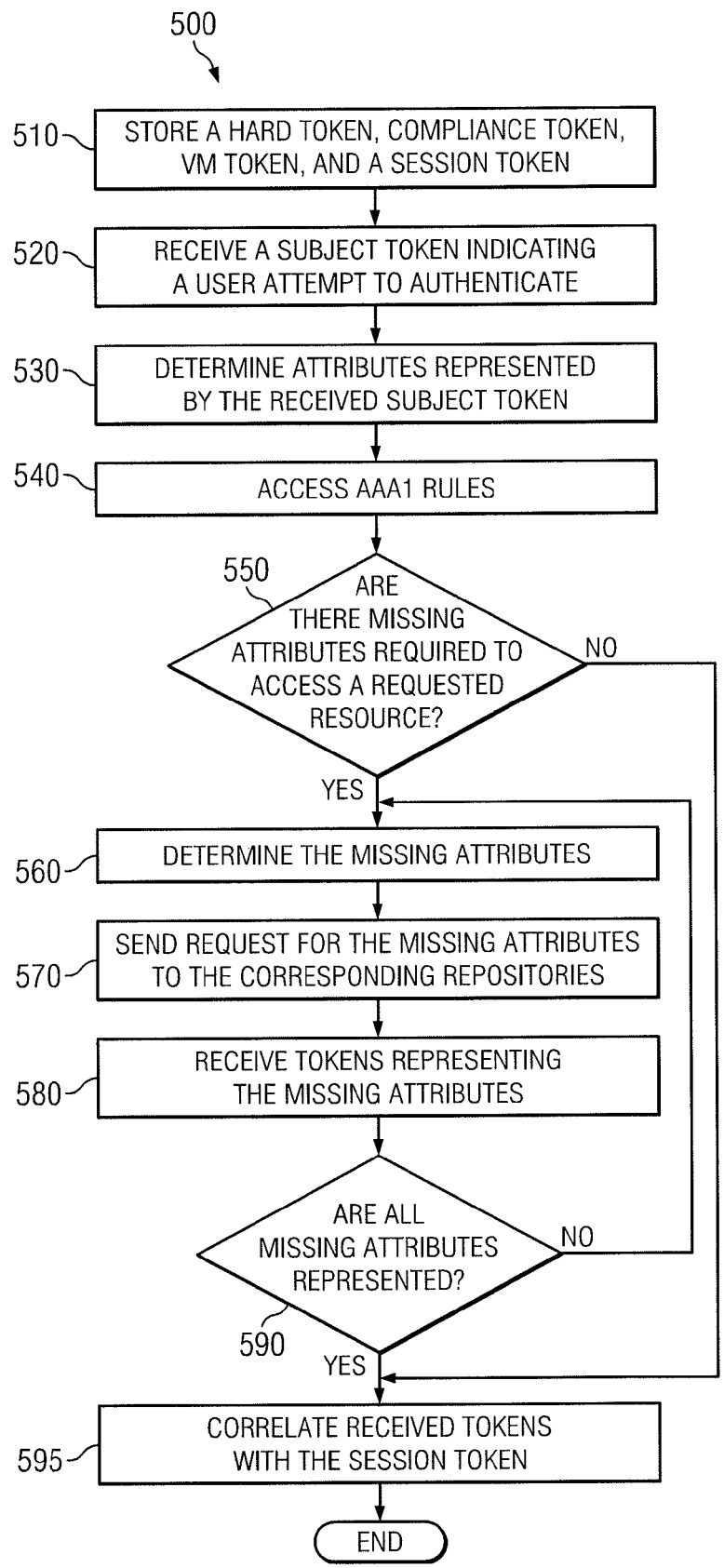
FIG. 5 is a flowchart illustrating a method of aggregating attributes using the system of FIG. 1.

FIGS. 4 and 5 illustrate how system 100 may perform the attribute aggregation function. In general, user 112 may be authenticated in order to access resource 112. During the authentication process, various properties, qualities, or features of user 112 may be examined. These properties, qualities, or features may be known as attributes 425. However, there may be thousands or millions of available attributes 425 that describe user 112, and resource 145 may not require all available attributes 425 be examined to grant access. If all available attributes 425 were considered, the authentication process may be slow and inefficient. The process by which TBAC module 110 determines and retrieves only those attributes 425 required to grant access to the resource 145 is known as attribute aggregation and is discussed in more detail with respect to FIGS. 4 and 5.

User 112 may begin the authentication process by providing authentication information, such as, for example, a user ID and a password, to gain access to a requested resource 145. TBAC module 110 may receive a subject token 115k from the various token providers that represents the authentication information provided by user 112. However, resource provider 140 may require extra layers of authentication or extra authentication information associated with user 112 before resource provider 140 grants access to the requested resource 145. These extra layers of authentication or extra authentication information may be in the form of attributes 425 associated with user 112 stored in repositories 420a-d. One solution would be for TBAC module 110 to retrieve all the attributes 425 associated with user 112 from the repositories 420a-d. However, the resource provider 140 may not require all the attributes 425 associated with user 112 to grant access to the resource 145. As an example and not by way of limitation, resource provider 140 may require the age of the user 112, but not the location of the user 112 to grant access to resource 145. In particular embodiments, TBAC module 110 may determine, from an attribute aggregation (AAA1) rule 430, the set of attributes 440 required by resource provider 140 to grant access to resource 145. In particular embodiments, the set of attributes 440 may not be required to grant access to resource 145, but may be preferred or prioritized in making the determination to grant access to resource 145. TBAC module 110 may then determine from subject token 115k a set of attributes 445 already provided by user 112. TBAC module 110 may then determine, from the set of required attributes 440 and the set of provided attributes 445, a set of attributes 450 that are still missing and request only those attributes 425 from the repositories 420a-d. In particular embodiments, TBAC module 110 may provide faster and more efficient authentication by retrieving only the attributes 425 necessary to access the resource 145.

FIG. 4 illustrates the system 100 of FIG. 1 aggregating attributes 425. As provided in FIG. 4, TBAC module 110 may have correlated hard token 115g, compliance token 115h, and VM token 115i, among others, as appropriate, to session token 115j thus indicating that device 114 has been identified and verified compliant and that a container 210 has been provisioned to device 114 according to the container chaining function described with respect to FIGS. 2 and 3. User 112 may now initiate the authentication process by providing initial attributes, such as for example, initial authentication information to access a resource 145. Resource 145 may be represented by resource token 115c, which may also be sent to and stored in TBAC module 110. In particular embodiments, after the user 112 has provided initial authentication information, such as for example, a user ID and password, in the form of subject token 115k, TBAC module 110 may determine a set of required attributes 440 required to access the requested resource 145. System 100 may then inspect subject token 115k to determine a set of provided attributes 445. System 100 may then compare the set of provided attributes 445 and the set of required attributes 440 to determine a set of missing attributes 450. System 100 may then request the missing attributes from repositories 420a-d. System 100 may then receive at least one more subject token 115k representing the missing attributes from the various token providers, and correlate the at least one more subject token 115k to the session token 115j. In this manner, system 100 may provide a more efficient user authentication scheme by retrieving only the attributes 425 necessary to access the requested resource 145.

TBAC module 110 may determine the set of required attributes 440 using AAA1 rules 430 stored in memory 134. A particular AAA1 rule 430 may indicate a set of required attributes 440 required by resource provider 140 to grant user 112 access to a particular resource 145. In particular embodiments, TBAC module 110 may use a stored token 115, such as the resource token 115c, and the subject token 115k to determine the particular AAA1 rule 430. By using AAA1 rules 430, TBAC module 110 may determine and retrieve only those attributes 440 required to access resource 145. TBAC module 110 may examine the subject token 115k associated with user 112 to determine a set of provided attributes 445. TBAC module 110 may then determine a set of missing attributes 450 by comparing the set of required attributes 440 and the set of provided attributes 445. As an example and not by way of limitation, a particular AAA1 rule 430 may specify that accessing a particular resource 145 requires the time of login and the social security number of the user 112 in addition to the user ID and password of the user 112. However, subject token 115k may represent only the user ID and password of the user 112. In this case, TBAC module 110 may determine that the time of login and the social security number are in the set of missing attributes 450.

After determining the set of missing attributes 450, TBAC module 110 may request the missing attributes 450 from various corresponding repositories 420a-d. Each repository 420a-d may correspond with one of the various token providers. Each repository 420a-d may store attributes 425a-d associated with user 112. As an example and not by way of limitation, data repository 420c may store data attributes 425c associated with user 112 such as a social security number or telephone number. Each repository 420a-d may return, to a corresponding token provider, the attributes 425a-d requested by TBAC module 110. Each token provider may then generate and send a token 115 that represents the returned attributes 425 to TBAC module 110, such as for example, a new subject token 115k2. TBAC module 110 may then correlate the new subject token 115k2 to session token 115j. TBAC module 110 may further store the new subject token 115k2 in memory 134. Using the previous example, TBAC module 110 may determine the time of login and the social security number of the user 112 are in the set of missing attributes 450. TBAC module 110 may then request the time of login and the social security number from the corresponding repositories, such as for example, the data repository 420c. In response, the data repository 420c may return, to the data token provider 129, the social security number of the user. The data token provider 129 may generate a new subject token 115k2 representing the social security number of the user 112, and send the new subject token 115k2 to TBAC module 110. A similar process may be followed by the private repository 420b to return the time of login. In this manner, TBAC module 110 may provide a more efficient authentication scheme by retrieving only the attributes 440 required by resource provider 140 to access the requested resource 145.

Although this disclosure describes TBAC module 110 performing certain actions with respect to FIG. 4, this disclosure contemplates the processor 132 and the memory 134 of the TBAC module 110 performing these actions. The illustration of system 100 in FIG. 4 does not specifically illustrate all of the elements from the illustration of system 100 in FIG. 1 so that particular aspects of system 100 may be emphasized. However, system 100 of FIG. 4 includes all the elements of system 100 in FIG. 1.

FIG. 5 is a flowchart illustrating a method 500 of aggregating attributes 425 using the system 100 of FIG. 1. TBAC module 110 may perform method 500. As provided in FIG. 5, TBAC module 110 may begin by storing a hard token 115g, compliance token 115h, VM token 115i, and a session token 115j, among others, as appropriate, in step 510. These tokens 115 may be correlated and stored pursuant to the process discussed with respect to FIGS. 2 and 3. TBAC module 110 may continue by receiving a subject token 115k indicating a user attempt to authenticate in step 520. The subject token 115k may indicate a user attempt to authenticate by representing certain attributes 425 of the user 112 such as, for example, a user ID and password. TBAC module 110 may continue by determining the attributes 425 represented by the subject tokens 115k in step 530. These attributes 425 may be the set of provided attributes 445. TBAC module 110 may continue by accessing AAA1 rules 430 in step 540. AAA1 rules 430 may specify all the attributes 425 required to access resource 145. These specified attributes 425 may be the set of required attributes 440. In step 550, TBAC module 110 may determine from the set of required attributes 440 and the set of provided attributes 430 if there are missing attributes 450 required to access the requested resource 145. If there are no missing attributes 450, TBAC module 110 may conclude by correlating the subject token 115k to the session token 115j in step 595. However, in particular embodiments, the attributes 425 represented by the subject token 115k may not be sufficient to grant access to a requested resource 145. In that situation, method 500 may determine that there are missing attributes 450 in step 550. Accordingly, TBAC module 110 may determine the missing attributes 450 in step 560.

To retrieve the missing attributes 450, TBAC module 110 may continue by sending a request for the missing attributes 450 to the corresponding repositories 420a-d in step 570. In response to the request, method 500 may receive tokens 115 representing the missing attributes 450 in step 580. In step 590, TBAC module 110 may determine if, according to the AAA1 rules 430, all missing attributes 450 have been represented by the received tokens 115. If not, TBAC module 110 may return to step 560 and request the still missing attributes 450. If all missing attributes 450 have been represented by the received tokens 115, TBAC module 110 may conclude by correlating the received tokens 115 with the session token 115j in step 595. By performing method 500, TBAC module 110 may provide a more efficient authentication scheme by retrieving only the attributes 425 required by resource provider 140 to access the requested resource 145.

In particular embodiments, attribute aggregation allows system 100 to provide a faster and more efficient authentication process by determining and retrieving only the attributes 440 required to access resource 145. Furthermore, because TBAC module 110 processes all the attributes 425 using tokens 115, system 100 may perform the authentication process even faster than if it considered individual attributes 425.

Figure 6:
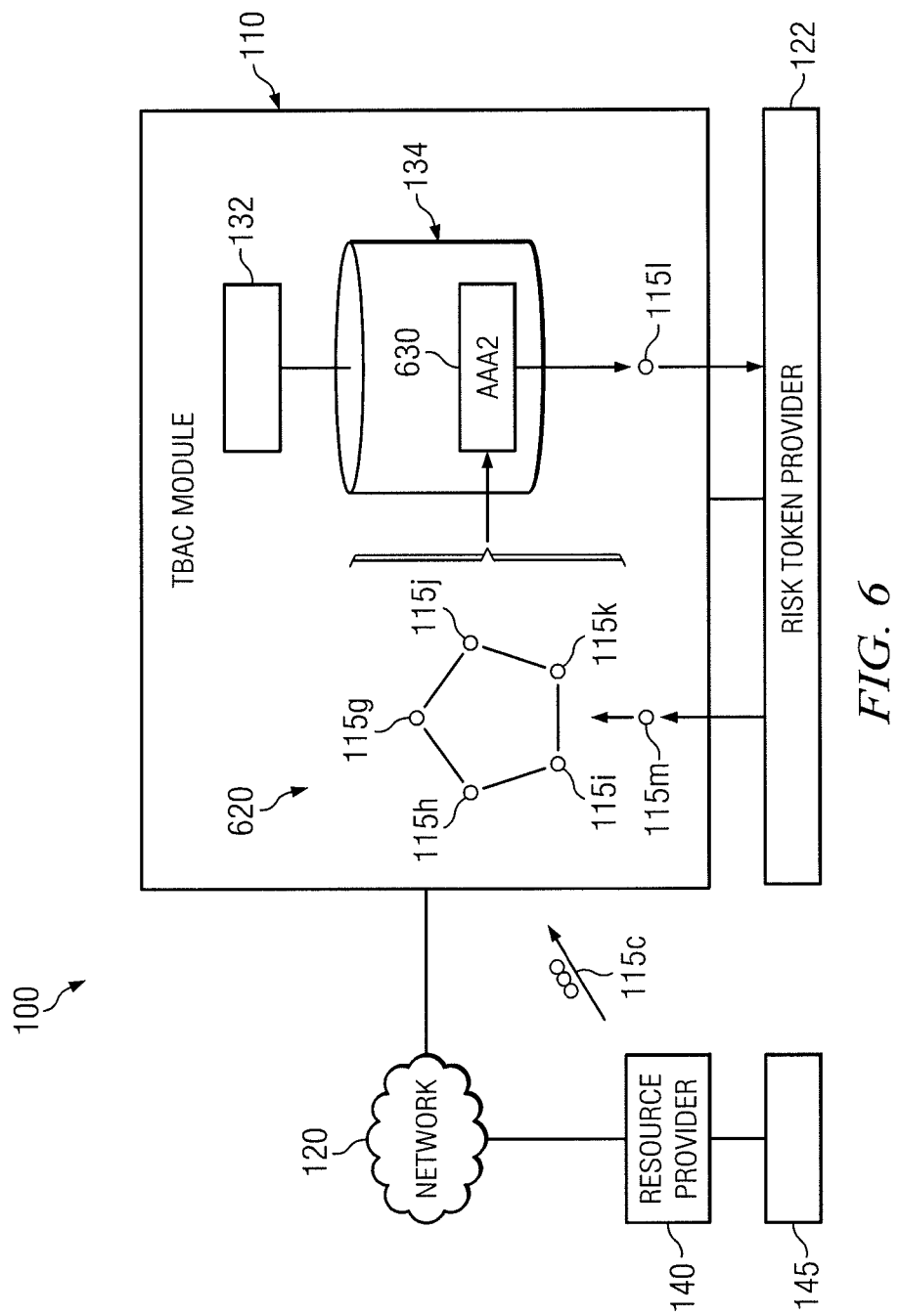
FIG. 6 illustrates the system of FIG. 1 performing attribute abstraction.
Figure 7:
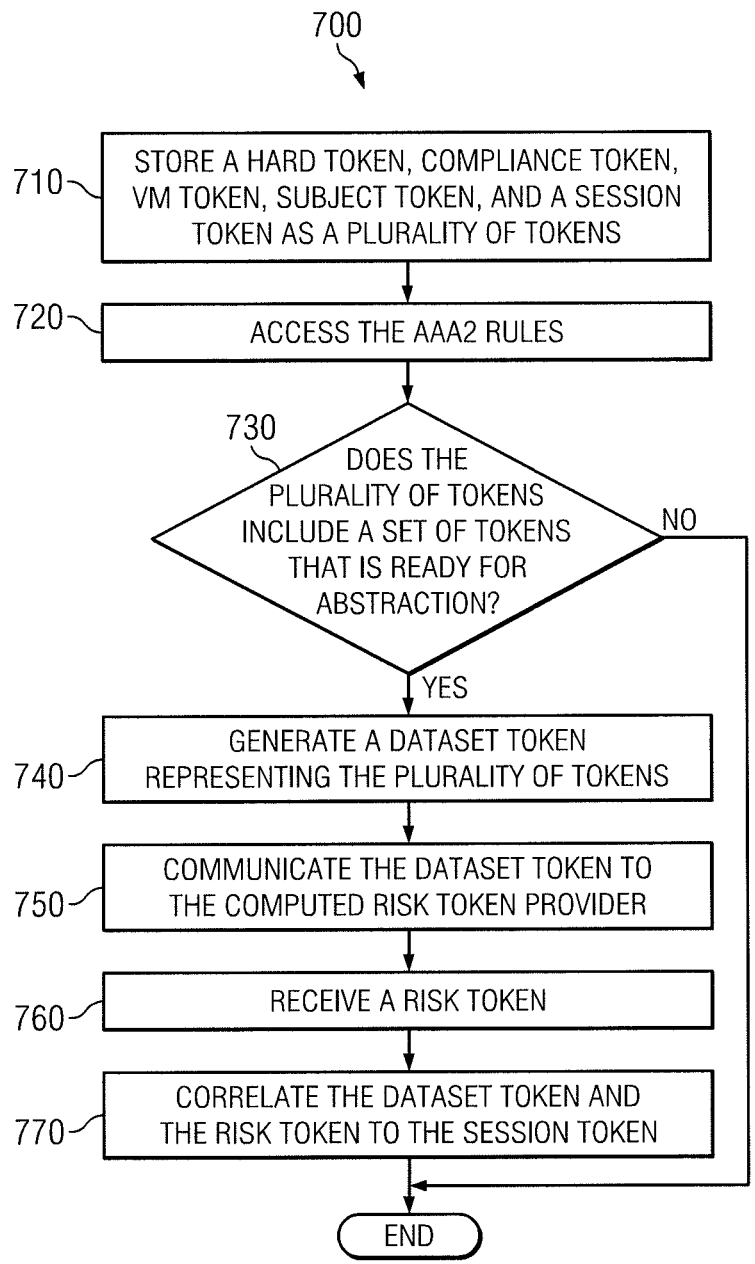
FIG. 7 is a flowchart illustrating a method of performing attribute abstraction using the system of FIG. 1.

FIGS. 6 and 7 illustrate how system 100 may perform the attribute abstraction function. In general, TBAC module 110 may facilitate the generation of new tokens 115 from a particular set of tokens 620, not just attributes 425. Prior to generating the new token 115, TBAC module 110 may determine whether the particular set of tokens 620 is present. If the particular set of tokens 620 is present, TBAC module may communicate the particular set of tokens 620 to a token provider. The token provider may generate the new token 115 that represents a particular aspect of the particular set of tokens 620. This process is known as attribute abstraction, which is discussed further with respect to FIGS. 6 and 7 in the context of generating a risk token 115m. Although this disclosure describes the attribute abstraction function using a particular context, this disclosure contemplates performing the attribute abstraction function in any suitable context.

TBAC module 110 may perform attribute abstraction to facilitate the generation of a risk token 115m. In particular embodiments, TBAC module may determine that a particular set of tokens 620 is ready for abstraction. Then, TBAC module 110 may generate a dataset token 115l representing the set of tokens 620, and communicate the dataset token 115*l* to the computed risk token provider 122. In response, the computed risk token provider 122 may compute and return a risk token 115*m* associated with the set of tokens 620.

FIG. 6 illustrates the system 100 of FIG. 1 performing attribute abstraction. As provided in FIG. 6, TBAC module 110 may store a hard token 115*g*, compliance token 115*h*, VM token 115*i*, and subject token 115*k*, among others, as appropriate. These tokens 115 may be correlated with session token 115*j*, also stored in TBAC module 110. TBAC module 110 may also receive and store resource token 115*c* from resource provider 140. In particular embodiments, resource tokens 115*c* may be correlated with session token 115*j*. In particular embodiments, these tokens 115 may form a set of tokens 620. To perform attribute abstraction, TBAC module 110 may determine whether the set of tokens 620 is ready for abstraction. As an example and not by way of limitation, TBAC module 110 may determine that the set of tokens 620 contains sufficient tokens 115 for a risk token 115*m* to be computed. In response to this determination, TBAC module 110 may communicate information about the set of tokens 620 to facilitate generation of the risk token 115*m*.

In particular embodiments, TBAC module 110 may store attribute abstraction (AAA2) rules 630 in memory 134. AAA2 rules 630 may specify when a particular set of tokens 620 is ready for abstraction. As an example and not by way of limitation, a particular AAA2 rule 630 may specify that a set of tokens 620 is ready for abstraction when the set of tokens 620 includes a subject token 115*k*, a hard token 115*g*, a compliance token 115*h*, a VM token 115*i*, and a session token 115*j*. If the particular set of tokens 620 includes those tokens 115, then TBAC module 110 may generate a dataset token 115*l* that represents the set of tokens 620. In particular embodiments, dataset token 115*l* may be used to communicate information about the set of tokens 620. The information about the set of tokens 620 may be used to perform attribute abstraction.

To complete the attribute abstraction process, TBAC module 110 may communicate the dataset token 115*l* to a token provider. In particular embodiments, TBAC module 110 may communicate the dataset token 115*l* to computed risk token provider 122. In response, computed risk token provider 122 may evaluate the set of tokens 620 represented by dataset token 115*l* and compute a risk associated with the set of tokens 620. As an example and not by way of limitation, the risk may be associated with granting user 112 (associated with subject token 115*k*) and device 114 (associated with hard token 115*g*) access to the resource 145 (associated with resource token 115*c*). Computed risk token provider 122 may generate a risk token 115*m* to represent the computed risk. Computed risk provider 122 may communicate the risk token 115*m* to TBAC module 110. When TBAC module 110 receives the risk token 115*m*, it may correlate it with session token 115*j*. In this manner, TBAC module 110 may perform attribute abstraction by taking a set of tokens 620 and abstracting another token 115, such as a risk token 115*m*, that represents a particular aspect associated with the set of tokens 620. In this example, the aspect is the risk associated with granting a user 112 access to a resource 145 associated with the set of tokens 620.

Although this disclosure describes TBAC module 110 performing certain actions with respect to FIG. 6, this disclosure contemplates the processor 132 and the memory 134 of the TBAC module 110 performing these actions. The illustration of system 100 in FIG. 6 does not specifically illustrate all of the elements from the illustration of system 100 in FIG. 1 so that particular aspects of system 100 may be emphasized. However, system 100 of FIG. 6 includes all the elements of system 100 in FIG. 1.

FIG. 7 is a flowchart illustrating a method 700 of performing attribute abstraction using the system 100 of FIG. 1. TBAC module 110 may perform method 700. TBAC module 110 may begin by storing a hard token 115*g*, compliance token 115*h*, VM token 115*i*, subject token 115*k*, and session token 115*j*, among others, as appropriate, as a plurality of tokens 115 in step 710. In particular embodiments, the plurality of tokens 115 may include a set of tokens 620 that is ready for abstraction. AAA2 rules 630 may be used to determine if the set of tokens 620 is present. In step 720, TBAC module 110 may access the AAA2 rules 630. Based on the AAA2 rules 630, TBAC module 110 may determine in step 730 whether the plurality of tokens 115 include a set of tokens 620 that is ready for abstraction. If the plurality of tokens 115 does not include a set of tokens 620 that is ready for abstraction, TBAC module 110 may conclude.

However, if the plurality of tokens 115 does include a set of tokens 620 that is ready for abstraction, TBAC module 110 may complete the attribute abstraction process. To begin, TBAC module 110 may generate a dataset token 115*l* representing the plurality of tokens 115 in step 740. TBAC module 110 may communicate the dataset token 115*l* to the computed risk token provider 122 in step 750. In response, the computed risk token provider 122 may compute a risk token 115*m*. In step 760, TBAC module 110 may receive the risk token 115*m*. TBAC module 110 may conclude in step 770 by correlating the dataset token 115*l* and the risk token 115*m* to the session token 115*j*.

In particular embodiments, by performing the attribute abstraction function, system 100 may represent information about tokens 115, not just attributes 425, in the form of tokens 115. In this manner, system 100 may make more robust access decisions. Furthermore, by representing information about multiple tokens 115 in a single token 115, such as a risk token 115*m*, system 100 may perform faster and more efficient evaluation of tokens 115.

Figure 8:
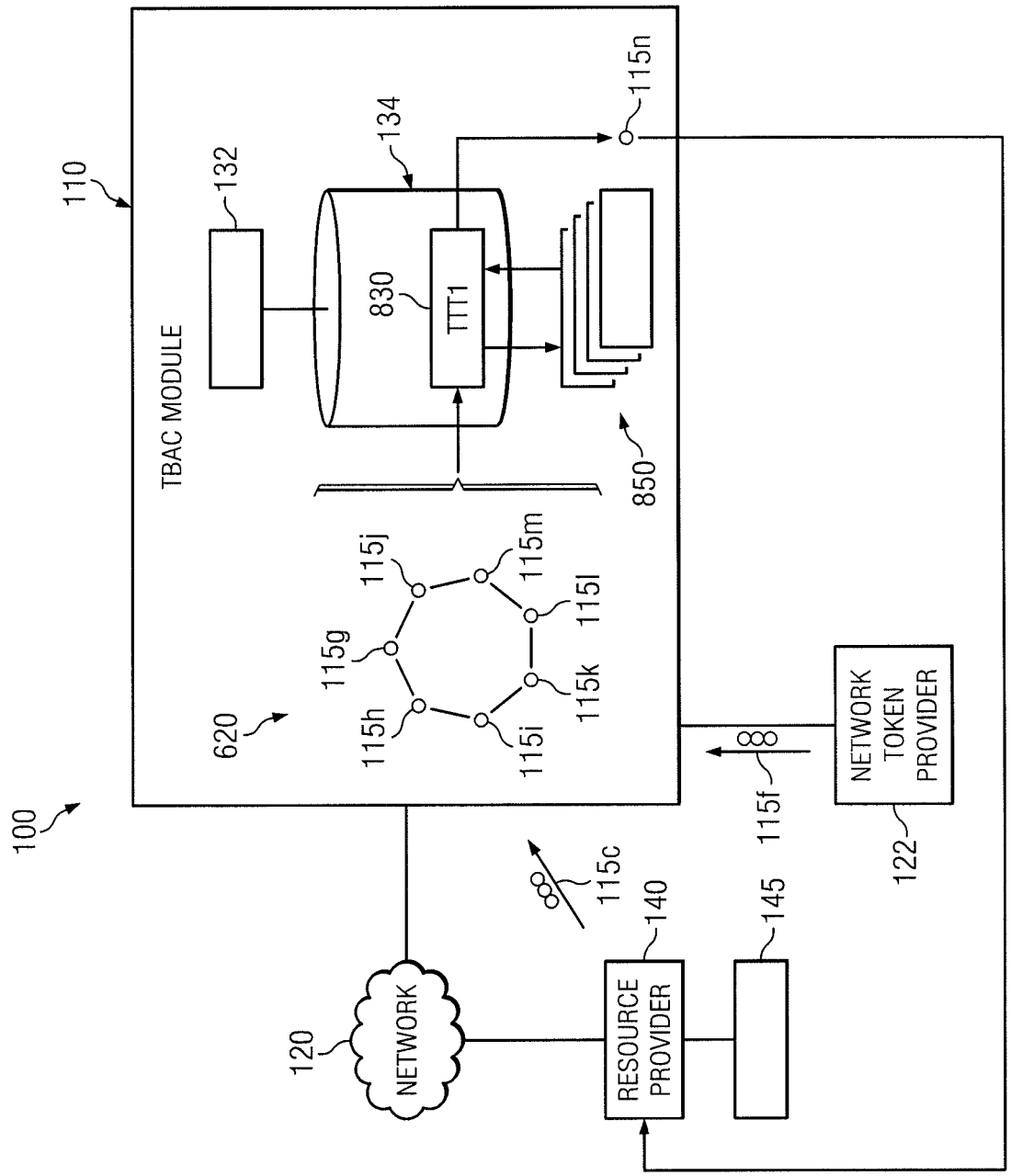
FIG. 8 illustrates the system of FIG. 1 making an access decision.
Figure 9:
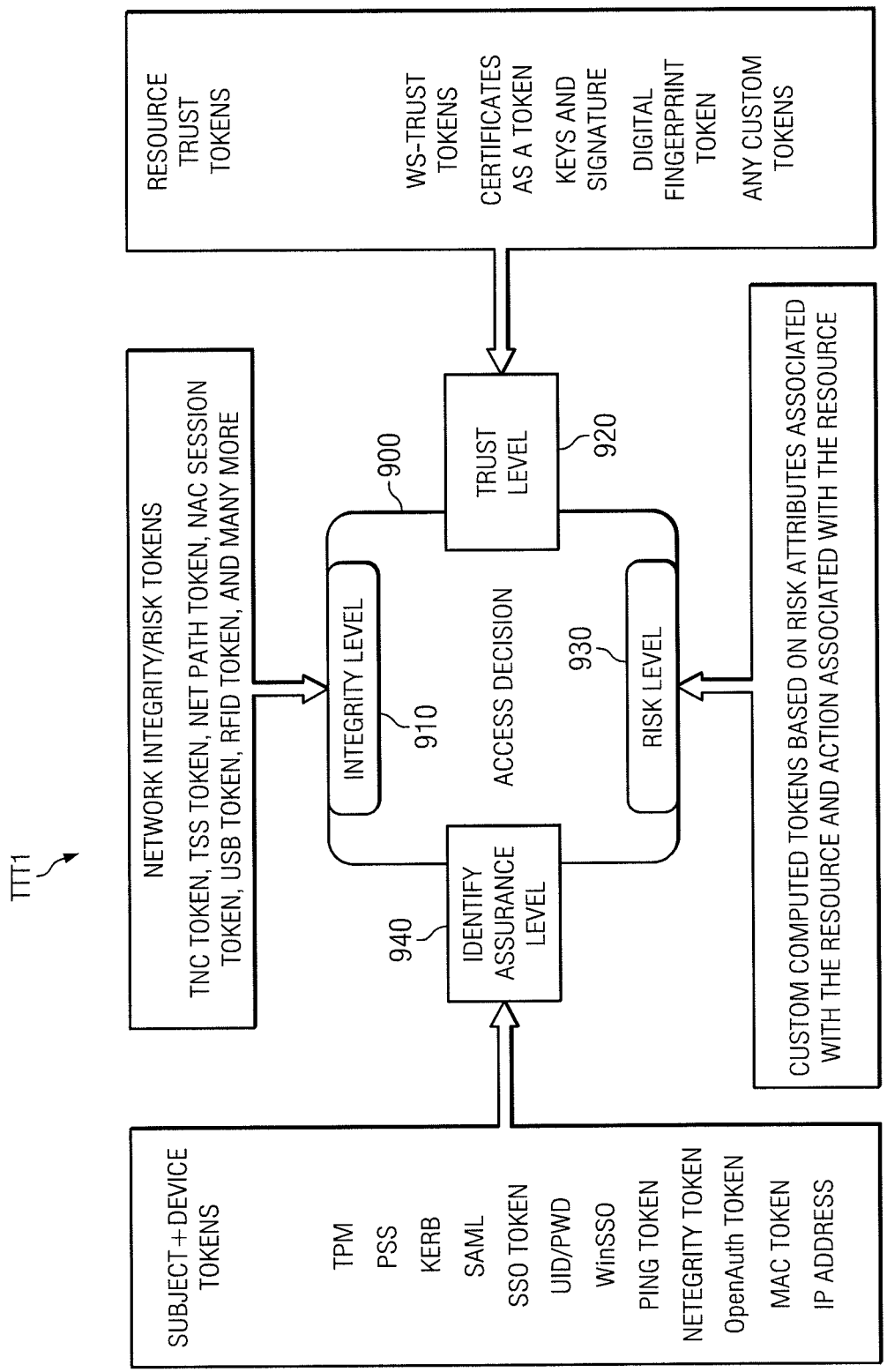
FIG. 9 illustrates the levels determined by the system of FIG. 1 in making an access decision.
Figure 10:
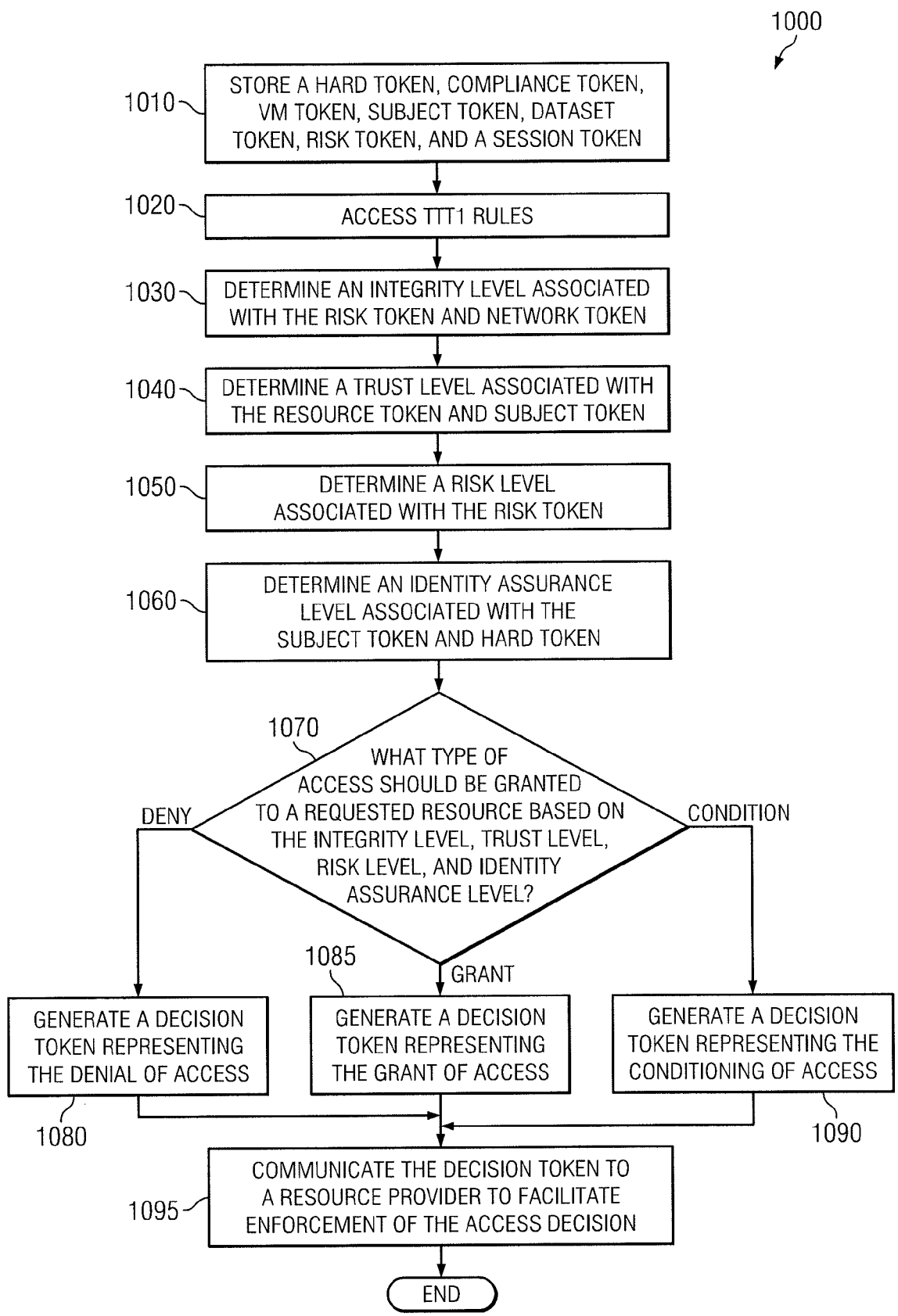
FIG. 10 is a flowchart illustrating a method of making an access decision.

FIGS. 8-10 illustrate how system 100 may make an access decision using tokens 115. In general, TBAC module 110 may determine whether to grant or deny a user 112 access to a resource 145. TBAC module 110 may also determine conditions to granting or denying access. This process of determining whether to grant or deny access and determining any conditions is referred to as making an access decision, which will be discussed further with respect to FIGS. 8-10.

TBAC module 110 may make an access decision by using levels 850 determined by tokens 115. In particular embodiments, TBAC module 110 may use tokens 115 to generate various levels 850 that indicate the security and risks posed by a user 112, a device 114, and/or a network 120. TBAC module 110 may then use these various levels 850 to make a decision to grant, deny, or condition access to the resource 145. TBAC module 110 may further generate a decision token 115*n* representing the decision to grant, deny, or condition access. TBAC module 110 may communicate the decision token 115*n* to facilitate enforcement of the access decision. In particular embodiments, by examining tokens 115 rather than attributes 425 in making an access decision, TBAC module 110 may increase the speed and efficiency of the decision-making process. By examining tokens 115, TBAC module 110 may also lighten the processing load on processor 132 and memory 134 by focusing more on making the access decision rather than on individual attributes 425 and the relationships between the attributes 425.

FIG. 8 illustrates the system 100 of FIG. 1 making an access decision. As provided in FIG. 8, TBAC module 110 may store hard token 115g, compliance token 115h, VM token 115i, subject token 115k, dataset token 115l, and risk token 115m, among others, as appropriate, as a set of tokens 620. TBAC module 110 may also include resource token 115c representing a resource 145 and network token 115f representing network 120 in the set of tokens 620. These tokens 115 may further be correlated with session token 115j pursuant to the functions described with respect to FIGS. 2-7. These tokens 115 may indicate that a user 112 is requesting access to the resource 145 over network 120. In particular embodiments, each token 115 may be associated with a layer in the Open Systems Interconnection (OSI) stack. As an example and not by way of limitation, network token 115f may be associated with Layer 3 of the OSI stack. As another example and not by way of limitation, hard token 115g may be associated with Layer 2 of the OSI stack. By using these tokens 115 in the set of tokens 620, TBAC module 110 may make an access decision when a user 112 requests access to a resource 145.

To make the access decision, TBAC module 110 may use the set of tokens 620 to access tabular trust and transaction (TTT1) rules 830 stored in memory 134. In particular embodiments, TTT1 rules 830 may specify various levels 850 associated with the set of tokens 620. As an example and not by way of limitation, TTT1 rules 830 may specify that risk token 115m may determine a risk level, and that the more risk represented by risk token 115m, the higher the risk level may be. These levels 850 and their association with particular tokens 115 will be described further with respect to FIG. 9. A particular TTT1 rule 830 may also specify an access decision associated with the various levels 850. As an example and not by way of limitation, a particular TTT1 rule 830 may specify that access may be denied if the risk level is above a certain threshold. TBAC module 110 may use a stored token 115, such as for example, the risk token 115m and the resource token 115c to determine a particular TTT1 rule 830. Based on the access decision specified in a particular TTT1 rule 830, TBAC module 110 may make a decision to grant, deny, or condition access to the resource 145. In particular embodiments, TBAC module 110 may then generate a decision token 115n representing an access decision.

In particular embodiments, the decision token 115n may be communicated by system 100 to facilitate enforcement of the access decision. As an example and not by way of limitation, TBAC module 110 may communicate the decision token 115n to the resource provider 140 to facilitate enforcement of the access decision. As another example and not by way of limitation, TBAC module 110 may communicate the decision token 115n to the device 114 to facilitate enforcement of the access decision. After receiving the decision token 115n, resource provider 140 or device 114 may enforce the access decision. If the decision token 115n represents a decision to grant access to the resource 145, then resource provider 140 may grant access to resource 145 after it receives decision token 115n. If decision token 115n represents a decision to deny access, then resource provider 140 may deny access to resource 145. By leveraging tokens 115, TBAC module 110 may make faster and more granular access decisions.

Although this disclosure describes TBAC module 110 performing certain actions with respect to FIG. 8 this disclosure contemplates the processor 132 and the memory 134 of the TBAC module 110 performing these actions. The illustration of system 100 in FIG. 8 does not specifically illustrate all of the elements from the illustration of system 100 in FIG. 1 so that particular aspects of system 100 may be emphasized. However, system 100 of FIG. 8 includes all the elements of system 100 in FIG. 1.

FIG. 9 illustrates the levels 850 determined by the system 100 of FIG. 1 in making an access decision 900. As provided in FIG. 9, access decision 900 may depend upon four types of levels: integrity levels 910, trust levels 920, risk levels 930, and identity assurance levels 940. Each type of level may take on a numerical value within a predefined range such as, for example, 0 to 9, with higher numbers indicating a higher level of integrity, trust, risk, or identity assurance. Each type of level 850 may depend upon particular tokens 115 stored in TBAC module 110. As an example and not by way of limitation, based on TTT1 rule 830, subject token 115k and risk token 115m may indicate a certain identity assurance level 940. In particular embodiments, the numerical value of any particular level 850 may depend upon the OSI layer associated with the particular tokens 115 associated with that level 850. As an example and not by way of limitation, a subject token 115k representing an authentication method from Layer 2 of the OSI stack may influence the identity assurance level 940 more than a subject token 115k representing an authentication method from Layer 7. Following will be a description of the various types of levels 850 and how they may be determined.

Integrity levels 910 may indicate the quality and/or security of network 120. A high integrity level may indicate that network 120 is safe from intrusion by hackers, viruses, or malware. A high integrity level may also indicate that communications over network 120 may not experience jitter or packet loss. In particular embodiments, integrity levels 910 may be determined from network tokens 115f and risk tokens 115m. As an example and not by way of limitation, integrity levels 910 may depend upon a trusted network connect (TNC) token, a netpath token, and/or a network access control (NAC) session token. Although this disclosure describes integrity levels 910 depending on particular tokens 115, this disclosure contemplates integrity levels 910 depending upon any suitable tokens 115. As an example and not by way of limitation, TBAC module 110 may store a TNC token and a netpath token. TTT1 rule 830 may specify that the integrity level 910 is a 6 if a TNC token and a netpath token are present. Based on TTT1 rule 830, TBAC module 110 may determine that the integrity level 910 is a 6 because the TNC token and the netpath token are present. In particular embodiments, when TBAC module 110 receives a network token 115f indicating a change in the network 120, TBAC module 110 may change integrity level 910 accordingly. The changed integrity level 910 may cause user 112 to be denied or granted access to a resource 145.

Trust levels 920 may indicate the level of authentication or security required or presented by resource 145. A high trust level may indicate that resource 145 is a risk-sensitive resource that requires more secure forms of authentication in order to be accessed by user 112. In particular embodiments, trust levels 920 may be determined from resource token 115c and subject token 115k. As an example and not by way of limitation, trust levels 920 may depend upon trust tokens, certificates as tokens, keys and signatures, digital fingerprint tokens, and any custom tokens. As an example and not by way of limitation, TBAC module 110 may store a trust token and a certificate as a token. TTT1 rule 830 may specify that the trust level 920 is a 7 if a trust token and a certificate as a token are present. Based on TTT1 rule 830, TBAC module 110 may determine that the trust level 920 is a 7 because the trust token and the certificate as a token are present. Although this disclosure describes trust level 920 depending upon particular types of tokens, this disclosure contemplates trust level 920 depending upon any suitable types of tokens.

Risk levels 930 may indicate the overall risk associated with granting user 112 and device 114 access to resource 145 over network 120. A higher risk level may indicate that the user 112, device 114, and/or network 120 presents a higher security risk associated with accessing the resource 145. In particular embodiments, a higher risk level 930 may indicate that more secure forms of authentication may be required to access the resource 145. As an example and not by way of limitation, user 112 may gain access to resource 145 despite a high risk level 930 by providing higher levels of user authentication, for example, through biometric scans. Risk levels 930 may be determined from risk tokens 115*m* computed from dataset token 115*l*, as described with respect to FIG. 6. In particular embodiments, risk level 930 may be adjusted. As an example and not by way of limitation, user 112 may lower risk level 930 by securing network 120. Although this disclosure describes risk level 930 depending upon particular types of tokens, this disclosure contemplates risk level 930 depending upon any suitable types of tokens.

Identity assurance level 940 may indicate the strength of authentication presented by user 112 and device 114. A higher identity assurance level 940 may indicate that user 112 has provided more secure forms of authentication. As an example and not by way of limitation, user 112 may raise identity assurance level 940 by performing biometric authentication. In particular embodiments, identity assurance levels 940 may depend upon subject tokens 115*k* and hard tokens 115*g*. As an example and not by way of limitation, identity assurance levels 940 may depend upon Trusted Platform Module (TPM) tokens, Kerberos tokens, Security Assertion Markup Language (SAML) tokens, Single Sign-On (SSO) tokens, win SSO tokens, ping tokens, netegrity tokens, open authentication tokens, MAC tokens, IP address tokens, user ID tokens, and password tokens. As an example and not by way of limitation, TBAC module 110 may store a user ID token and a password token. TTT1 rule 830 may specify that the identity assurance level 940 is a 2 if a user ID token and a password token are present. Based on TTT1 rule 830, TBAC module 110 may determine that the identity assurance level 940 is a 2 because the user ID token and the password token are present. Although this disclosure describes identity assurance levels 940 depending upon particular types of tokens, this disclosure contemplates identity assurance levels 940 depending upon any suitable types of tokens.

In particular embodiments, TBAC module 110 may use the integrity level 910, trust level 920, risk level 930, and identity assurance level 940 to make, based on TTT1 rule 830, an access decision 900. As an example and not by way of limitation, TTT1 rule 830 may indicate that in order to grant access to a resource 145, integrity level 910, trust level 920, and identity assurance level 940 must be at least a 7. If, based on the tokens 115 correlated with session token 115*j*, the integrity level 910 is an 8, the trust level 920 is a 9, and the identity assurance level 940 is a 6, then TBAC module 110 will deny access to the resource 145. If, however, the integrity level 910 is an 8, the trust level 920 is a 9, and the identity assurance level 940 is a 7, then TBAC module 110 will grant access to the resource 145. In particular embodiments, TBAC module 110 may condition access to the resource 145. In such cases, TBAC module 110 may attach conditions to the decision grant or deny access to the resource 145. A more detailed description of conditioning access is provided with respect to FIGS. 19 and 20.

FIG. 10 is a flowchart illustrating a method 1000 of making an access decision 900. TBAC module 110 may perform method 1000. As provided in FIG. 10, TBAC module 110 may begin by storing a hard token 115*g*, compliance token 115*h*, VM token 115*i*, subject token 115*k*, dataset token 115*l*, risk token 115*m*, and a session token 115*j*, among others, as appropriate, in step 1010. TBAC module 110 may continue by accessing the TTT1 rules 830 in step 1020 to determine various levels 850. In step 1030, TBAC module 110 may determine, by the TTT1 rules 830, an integrity level 910 associated with risk token 115*m* and network token 115*f*. TBAC module 110 may continue by determining, by the TTT1 rules 830, a trust level 920 associated with resource token 115*c* and subject token 115*k* in step 1040. In step 1050, TBAC module 110 may determine, by the TTT1 rules 830, a risk level 930 associated with the risk token 115*m* in step 1040. TBAC module 110 may continue by determining, by the TTT1 rules 830, an identity assurance level 940 associated with subject token 115*k* and hard token 115*a* in step 1060. After the various levels 850 have been determined, TBAC module 110 may determine what type of access should be granted to a requested resource 145 based on the integrity level 910, trust level 920, risk level 930, and identity assurance level 940 in step 1070. If TBAC module 110 determines access should be denied, then TBAC module 110 may generate a decision token 115*n* representing the denial of access in step 1080. If access should be granted, then TBAC module 110 may generate a decision token 115*n* representing the grant of access in step 1085. If access should be conditioned, then TBAC module 110 may generate a decision token 115*n* representing the conditioning of access in step 1090. TBAC module 110 may conclude by communicating the decision token 115*n* to a resource provider 140 to facilitate enforcement of the access decision 900 in step 1070.

In particular embodiments, by examining tokens 115 rather than attributes 425 in making an access decision 900, TBAC module 110 may increase the speed and efficiency of the decision-making process. Furthermore, by examining tokens 115, TBAC module 110 may lighten the processing load on processor 132 and memory 134 by focusing more on making the access decision 900 rather than on individual attributes 425 and the relationships between the attributes 425.

Figure 11:
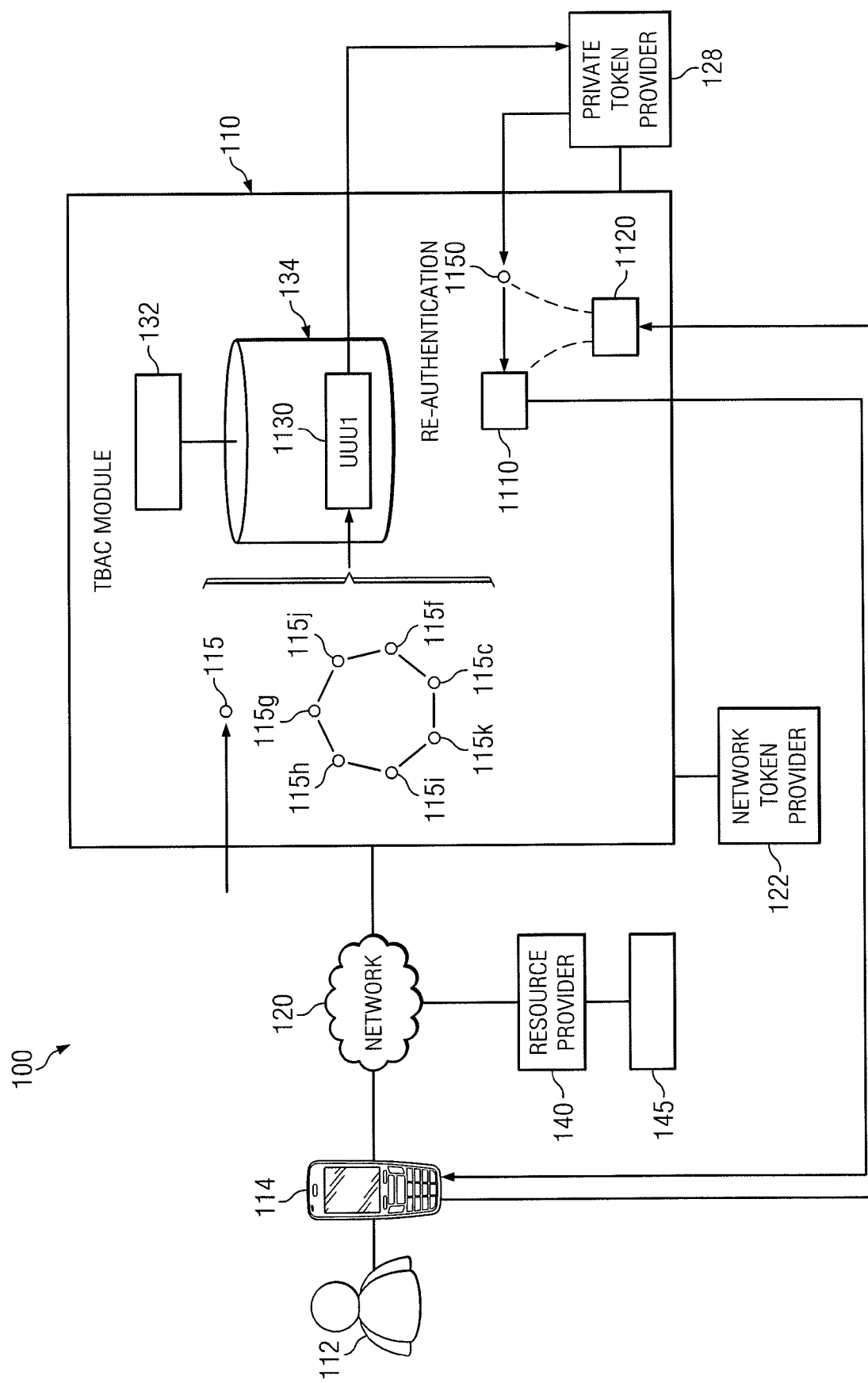
FIG. 11 illustrates the system of FIG. 1 re-authenticating a user.
Figure 12:
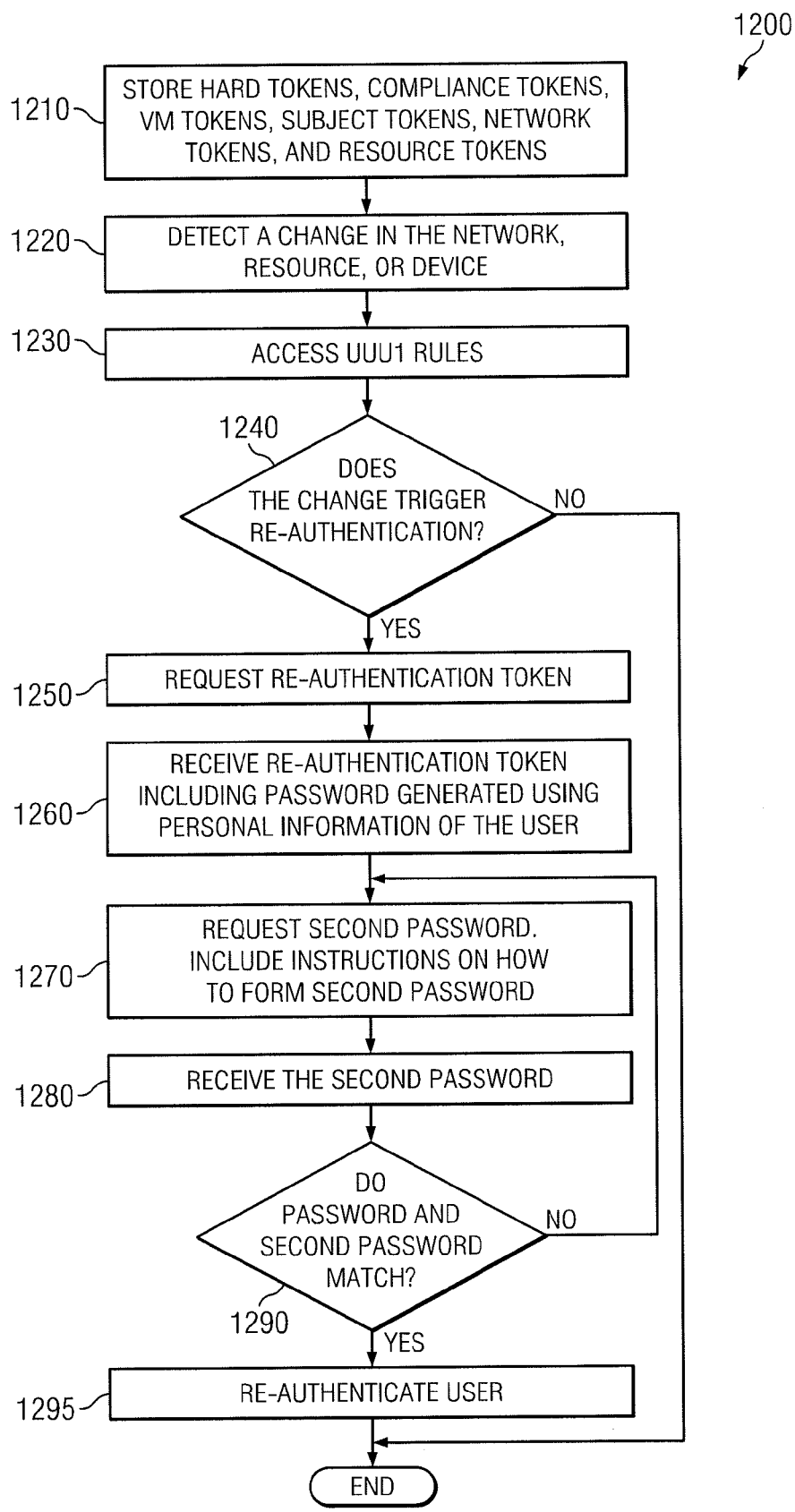
FIG. 12 is a flowchart illustrating a method of re-authenticating a user using the system of FIG. 1.

FIGS. 11 and 12 illustrate system 100 performing the re-authentication function. In general, TBAC module 110 may re-authenticate a user 112 when a change occurs that challenges or puts into question the integrity of the authentication of user 112. TBAC module 110 may determine that the change sufficiently challenges the integrity of the authentication of user 112. In response, TBAC module 110 may block the user 112 from accessing a resource and may request user 112 enter a password to regain access to the resource.

With regards to the re-authentication process, TBAC module 110 may request the password be a one-time password (that is, a subsequently generated password may not be the same as a previously generated password) generated using the personal information of the user 112. TBAC module 110 may then request user 112 to enter the one-time password. Included in the request 1110 may be a message instructing the user 112 how to form the one-time password. If the user 112 enters the one-time password correctly, then TBAC module 110 may consider the user 112 re-authenticated. This process of determining when a change sufficiently challenges the integrity of the authentication of the user 112 and the subsequent generation and request of a one-time password is referred to as re-authentication, which is discussed further with respect to FIGS. 11 and 12.

FIG. 11 illustrates the system 100 of FIG. 1 re-authenticating a user 112. As provided in FIG. 11, TBAC module 110 may store a plurality of token 115 to indicate that user 112 may be using device 114 to consume resource 145 over network 120. TBAC module 110 may receive a token 115 that indicates a change has occurred in network 120, resource 145, or device 114. As an example and not by way of limitation, token 115 may indicate that traffic over network 120 is experiencing jitter. As another example and not by way of limitation, token 115 may indicate that the access requirements of resource 145 may have changed. Although this disclosure describes token 115 indicating particular changes, this disclosure contemplates token 115 indicating any changes in network 120, resource 145, or device 114.

In response to detecting token 115, TBAC module 110 may access user re-authentication (UUU1) rules 1130 stored in memory 134. In particular embodiments, UUU1 rules 1130 may specify what changes indicated by token 115 trigger re-authentication. If a particular UUU1 rule 1130 specifies that the change indicated by token 115 triggers re-authentication, then TBAC module 110 may begin the re-authentication process. As an example and not by way of limitation, if token 115 indicates that network 120 is experiencing jitter and a particular UUU1 rule 1130 specifies that jitter should trigger the re-authentication process, then TBAC module 110 may initiate the re-authentication process.

TBAC module 110 may initiate the re-authentication process by requesting the generation of a password using the personal information of the user 112. TBAC module 110 may send the request to a token provider such as, for example, the private token provider 128. In response, the token provider may generate the password using personal information of the user 112. As an example and not by way of limitation, in response to the request, private token provider 128 may generate the password by appending the birth year of the user 112 to the last three digits of the social security number of the user 112. Although this disclosure describes the generation of the password using particular types of personal information, this disclosure contemplates the generation of the password using the age of the user 112, the number of children user 112 has, the age of the spouse of user 112, or any other suitable personal information. In particular embodiments, the password may be a one-time password, that is, a subsequently generated password may not be the same as a previously generated password. As an example and not by way of limitation, in response to a second request following the previously described request, private token provider 128 may generate another password that does not use the same information as the previously generated password.

In particular embodiments, after the token provider generates the password, the token provider may generate a re-authentication token 115o that represents the generated password. The token provider may then communicate the re-authentication token 115o to TBAC module 110. TBAC module 110 may use re-authentication token 115o to generate a request for a second password 1110. The request for the second password 1110 may include instructions on how to form the second password. As an example and not by way of limitation, if re-authentication token 115o includes a password that was generated by appending the birth year of the user 112 to the last three digits of the social security number of the user, then the request for the second password may include the message: "Please form the second password by appending your birth year to the last three digits of your social security number." In particular embodiments, TBAC module 110 may communicate the request for the second password 1110 to device 114. User 112 may view the request for the second password 1110 and enter the second password using device 114. Device 114 may send a response 1120 that includes the second password to TBAC module 110. TBAC module 110 may then compare the password represented by re-authentication token 115o and the second password included within the response 1120. If the password and the second password match, TBAC module 110 may consider user 112 re-authenticated. If they do not match, TBAC module 110 may terminate a session represented by session token 115j or TBAC module 110 may resend the request for the second password 1110 to device 114.

Although this disclosure describes TBAC module 110 performing certain actions with respect to FIG. 11, this disclosure contemplates the processor 132 and the memory 134 of the TBAC module 110 performing these actions. The illustration of system 100 in FIG. 11 does not specifically illustrate all of the elements from the illustration of system 100 in FIG. 1 so that particular aspects of system 100 may be emphasized. However, system 100 of FIG. 11 includes all the elements of system 100 in FIG. 1.

FIG. 12 is a flowchart illustrating a method 1200 of re-authenticating a user 112 using the system 100 of FIG. 1. TBAC module 110 may perform method 1200. As provided in FIG. 12, TBAC module 110 may begin by storing a hard token 115g, compliance token 115h, VM token 115i, subject token 115k, network token 115f, and resource token 115c, among others, as appropriate, in step 1210. The hard token 115g may be associated with a device 114. The resource token 115c may be associated with a resource 145. The network token 115f may be associated with a network 120. TBAC module 110 may continue by detecting a change in the network 120, resource 145, or device 114 in step 1220. In particular embodiments, TBAC module 110 may detect a token 115 representing the change. In response, TBAC module 110 may continue by accessing UUU1 rules 1130 in step 1230. In step 1240, TBAC module 110 may determine, based on UUU1 rules 1130, whether the change triggers re-authentication. If not, TBAC module 110 may conclude. If the change does trigger re-authentication, TBAC module 110 may continue to step 1250 to request a re-authentication token 115o.

In step 1260, TBAC module 110 may receive the re-authentication token 1150. In particular embodiments, the re-authentication token 115o may include a password generated using personal information of user 112. The password may be a one-time password. In step 1270, TBAC module 110 may request a second password. In the request for the second password, TBAC module 110 may include instructions on how to form the second password. In step 1280, TBAC module 110 may receive the second password. In step 1290, TBAC module 110 may determine if the password and the second password match. If not, TBAC module 110 may return to step 1270 and request the second password. In particular embodiments, TBAC module 110 may also conclude if the password and second password do not match. If the password and the second password do match, TBAC module 110 may continue to step 1295 to re-authenticate the user 112.

In particular embodiments, because TBAC module 110 uses tokens 115 to detect changes and to administer the re-authentication process, TBAC module 110 may leverage information from numerous sources such as the network 120, resource 145, and device 114 to accurately trigger the re-authentication process. Furthermore, because TBAC module 110 utilizes one-time passwords generated from the personal information of the user 112 during the re-authentication process, TBAC module 110 may provide a more secure re-authentication.

Figure 13:
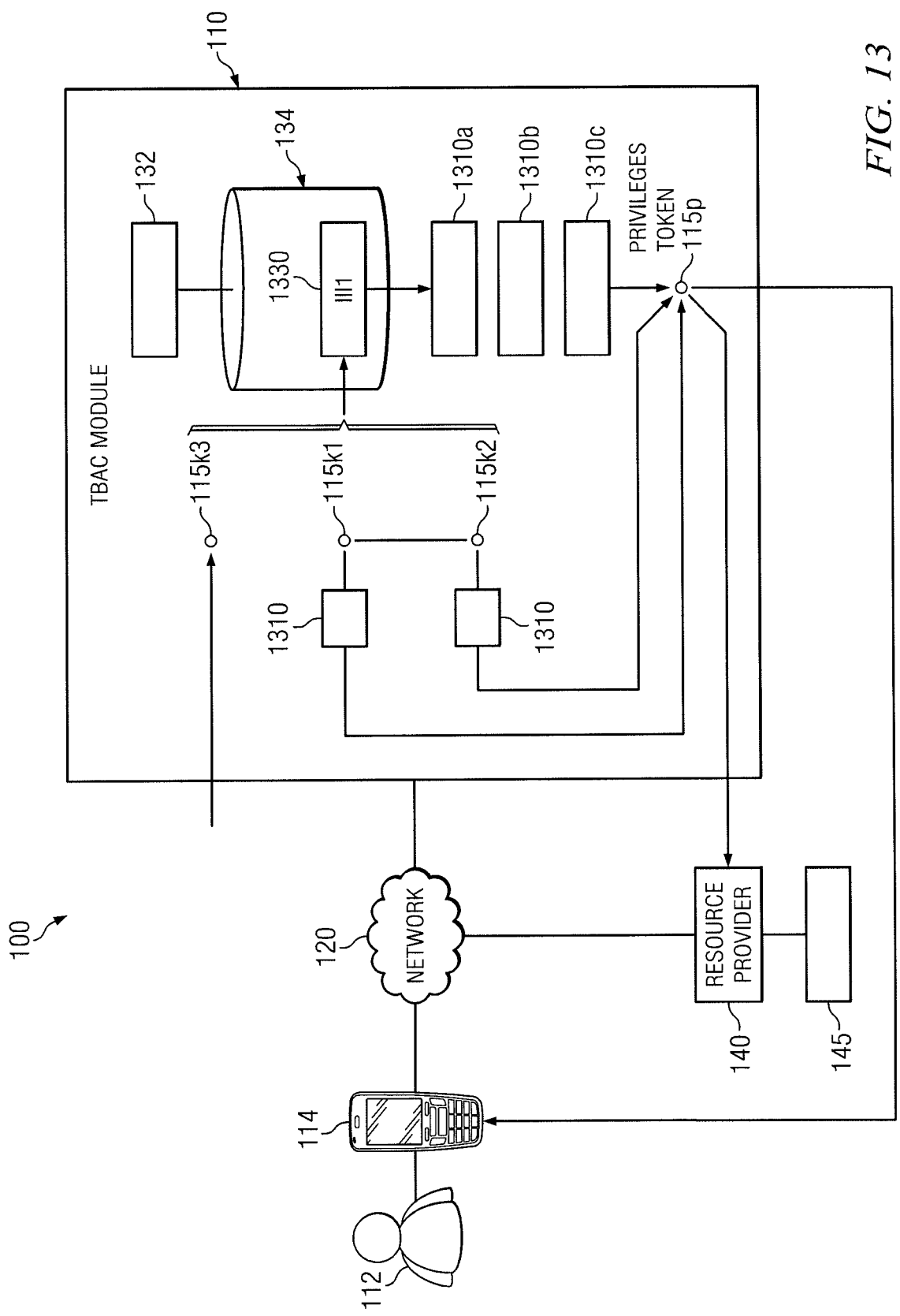
FIG. 13 illustrates the system of FIG. 1 combining authentication methods.
Figure 14:
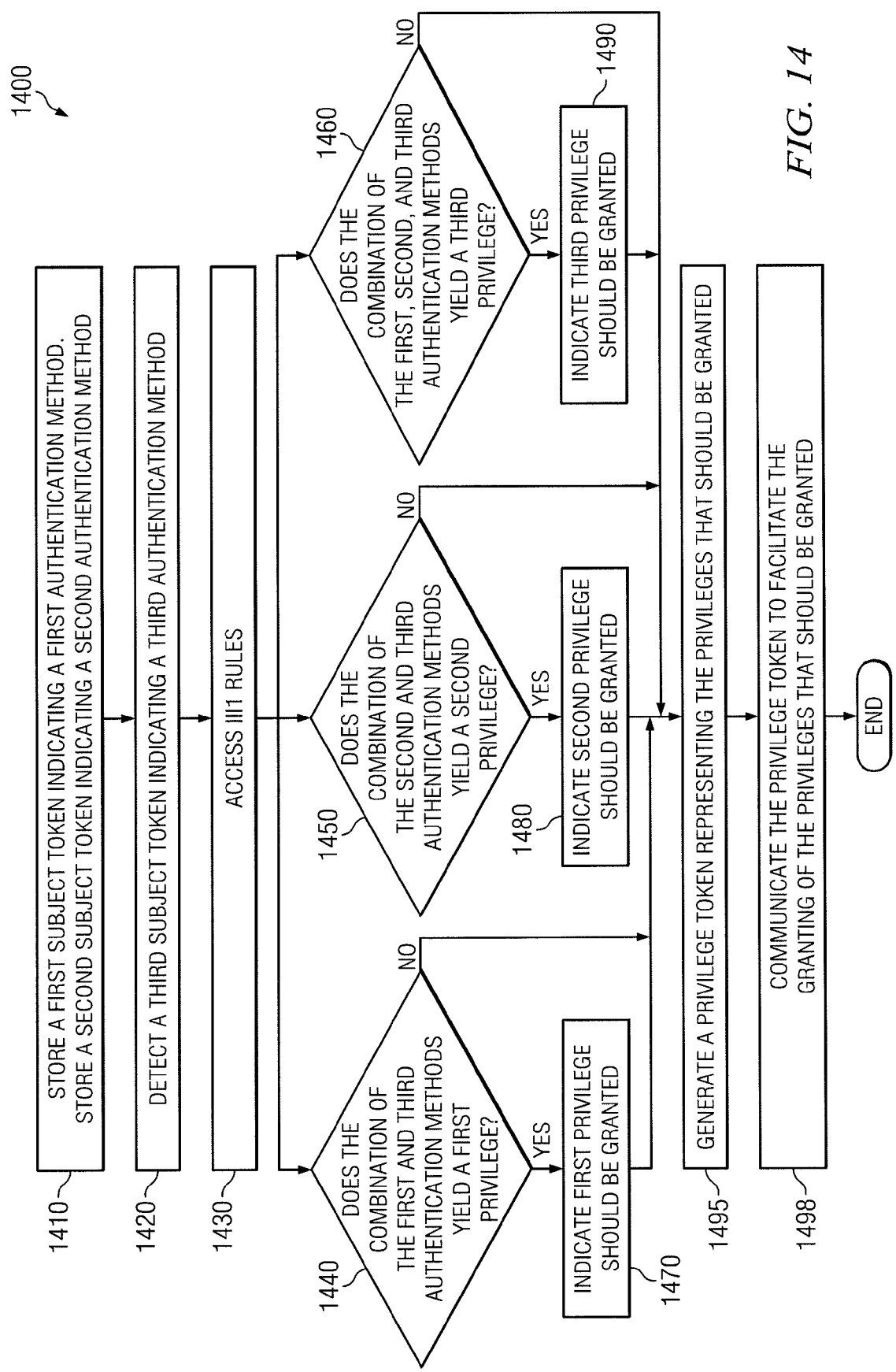
FIG. 14 is a flowchart illustrating a method of combining authentication methods using the system of FIG. 1.

FIGS. 13 and 14 illustrate the system 100 combining authentication methods. In general, a user 112 may perform multiple methods of authentication during any session. For each method of authentication performed, system 100 may grant the user 112 a privilege such as for example, an access right, edit right, or distribution right. System 100 may further grant the user 112 privileges based on combinations of authentication methods performed. The process of determining the particular combinations of authentication methods that yield the granting of privileges is referred to as combining authentication methods, which is discussed further with respect to FIGS. 13 and 14.

In particular embodiments, TBAC module 110 may store multiple subject tokens 115$k$ that indicate a user 112 has performed multiple forms of authentication. Each form of authentication may be associated with the granting of a privilege 1310. TBAC module 110 may examine the multiple subject tokens 115$k$ to determine if particular combinations of the subject tokens 115$k$ may lead to the granting of privileges 1310. If a combination of the subject tokens 115$k$ does lead to the granting of a privilege 1310, TBAC module 110 may generate a privilege token 115$p$ to represent the privilege 1310. Privilege token 115$p$ may then be communicated to facilitate the granting of the privilege 1310.

FIG. 13 illustrates the system 100 of FIG. 1 combining authentication methods. As provided in FIG. 13, TBAC module 110 may store a plurality of subject tokens 115$k$. As an example and not by way of limitation, TBAC module 110 may store a first subject token 115$k$1 and a second subject token 115$k$2. First subject token 115$k$1 may be correlated with second subject token 115$k$2. In particular embodiments, each subject token 115$k$ may indicate a different authentication method as another subject token 115$k$. As an example and not by way of limitation, first subject token 115$k$1 may indicate that user 112 has been authenticated with a user ID and password, and second subject token 115$k$2 may indicate user 112 has been authenticated by providing correct answers to security questions. Because each subject token 115$k$ indicates a particular authentication method, each subject token 115$k$ may indicate a privilege 1310 or a set of privileges 1310 should be granted to user 112 for device 114. A privilege 1310 may grant a user 112 the ability to perform certain operations. As an example and not by way of limitation, a privilege 1310 may grant the user 112 access to a resource, the ability to edit the resource, and/or the ability to terminate the resource. Although this disclosure describes privilege 1310 granting the user 112 specific abilities, this disclosure contemplates privilege 1310 granting the user 112 any suitable ability.

In particular embodiments, TBAC module 110 may detect whether a combination of authentication methods indicated by multiple subject tokens 115$k$ may yield the granting of a privilege 1310. Using the previous example, TBAC module 110 may detect a third subject token 115$k$3 indicating user 112 has performed a third authentication method such as a retina scan. TBAC module 110 may use the first subject token 115$k$1, the second subject token 115$k$2, and the third subject token 115$k$3 to access authentication method combination (III1) rules 1330 stored in memory 134. III1 rules 1330 may specify the combinations of authentication methods that yield the granting of privileges 1310. TBAC module 110 may use III1 rules 1330 to facilitate the granting of privileges 1310.

As an example and not by way of limitation, a particular III1 rule 1330 may specify a privilege 1310 or a set of privileges 1310 to be granted when a particular combination of authentication methods has been performed. Continuing the previous example, a particular III1 rule 1330 may indicate that the combination of the user ID and password authentication indicated by first subject token 115$k$1 and the retina scan authentication method indicated by third subject token 115$k$3 yields the granting of a first privilege 1310$a$. Another III1 rule 1330 may specify that the combination of the security questions authentication method indicated by second subject token 115$k$2 and the retina scan authentication method indicated by third subject token 115$k$3 yields the granting of a second privilege 1310$b$. Yet another III1 rule 1330 may specify that the combination of the user ID and password authentication method indicated by first subject token 115$k$1, the security questions authentication method indicated by second subject token 115$k$2, and the retina scan authentication method indicated by third subject token 115$k$3 yields the granting of a third privilege 1310$c$. Although this disclosure describes particular combinations of subject tokens 115$k$ yielding certain privileges 1310, this disclosure contemplates any combination of any number of subject tokens 115$k$ yielding any number of privileges 1310. TBAC module 110 may use these III1 rules 1330 to facilitate the granting of first privilege 1310$a$, second privilege 1310$b$, and third privilege 1310$c$ to user 112.

To do so, TBAC module 110 may generate a privilege token 115$p$ representing the privileges 1310 granted to user 112. Continuing the previous example, TBAC module 110 may generate a privilege token 115$p$ representing first privilege 1310$a$, second privilege 1310$b$, and third privilege 1310$c$ granted as a result of particular combinations of first subject token 115$k$1, second subject token 115$k$2, and third subject token 115$k$3. Privilege token 115$p$ may also represent other privileges 1310 associated with the individual subject tokens 115$k$.

In particular embodiments, TBAC module 110 may communicate privilege token 115$p$ to facilitate the granting of the privileges 1310 represented by privilege token 115$p$. As an example and not by way of limitation, TBAC module 110 may communicate privilege token 115$p$ to a resource provider 140. In response, the resource provider 140 may grant user 112 first privilege 1310$a$, second privilege 1310$b$, and third privilege 1310$c$ associated with particular combinations of first subject token 115$k$1, second subject token 115$k$2, and third subject token 115$k$3. In particular embodiments, TBAC module 110 may further correlate the privilege token 115$p$ with the subject tokens 115$k$.

Although this disclosure describes TBAC module 110 performing certain actions with respect to FIG. 13, this disclosure contemplates the processor 132 and the memory 134 of the TBAC module 110 performing these actions. The illustration of system 100 in FIG. 13 does not specifically illustrate all of the elements from the illustration of system 100 in FIG. 1 so that particular aspects of system 100 may be emphasized. However, system 100 of FIG. 13 includes all the elements of system 100 in FIG. 1.

FIG. 14 is a flowchart illustrating a method 1400 of combining authentication methods using the system 100 of FIG. 1. TBAC module 110 may perform method 1400. As provided in FIG. 14, TBAC module 110 may begin by storing a first subject token 115$k$1 indicating a first authentication method and a second subject token 115$k$2 indicating a second authentication method in step 1410. As an example and not by way of limitation, the first authentication method may be a user ID and password and the second authentication method may be providing correct answers to a security question. TBAC module 110 may continue by detecting a third subject token 115$k$3 indicating a third authentication method in step 1420. Continuing the example, the third authentication method may be a retina scan.

TBAC module 110 may determine whether particular combinations of authentication methods lead to the granting of privileges 1310. To begin, TBAC module 110 may access III1 rules 1330 in step 1430. In steps 1440, 1450, and 1460, TBAC module 110 may determine based on III1 rules 1330 whether particular combinations of the first subject token 115k1, the second subject token 115k2, and the third subject token 115k3 yield the granting of particular privileges 1310. In step 1440, TBAC module 110 may determine that the combination of the first and third authentication methods yield the granting of a first privilege 1310a. In step 1450, TBAC module 110 may determine that the combination of the second and third authentication methods yield the granting of a second privilege 1310b. In step 1460, TBAC module 110 may determine the combination of the first, second, and third authentication methods yields the granting of a third privilege 1310c.

If TBAC module 110 determines that the first privilege 1310a, the second privilege 1310b, and/or the third privilege 1310c should be granted in steps 1440, 1450, and 1460, then TBAC module 110 may continue to steps 1470, 1480, and 1490 to indicate the first privilege 1310a, the second privilege 1310b, and/or the third privilege 1310c should be granted. TBAC module 110 may continue to step 1495 to generate a privilege token 115p representing the privileges 1310 that should be granted. TBAC module 110 may conclude at step 1498 by communicating the privilege token 115p to facilitate the granting of the privileges 1310 that should be granted.

In particular embodiments, because TBAC module 110 may examine particular combinations of authentication methods to determine if certain privileges 1310 should be granted, system 100 may provide a more robust process of determining and granting privileges 1310 to a user 112. Furthermore, because TBAC module 110 examines tokens 115 rather than attributes 425 to determine the granting of privileges 1310, TBAC module 110 may provide a faster and more efficient process of determining and granting privileges.

Figure 15:
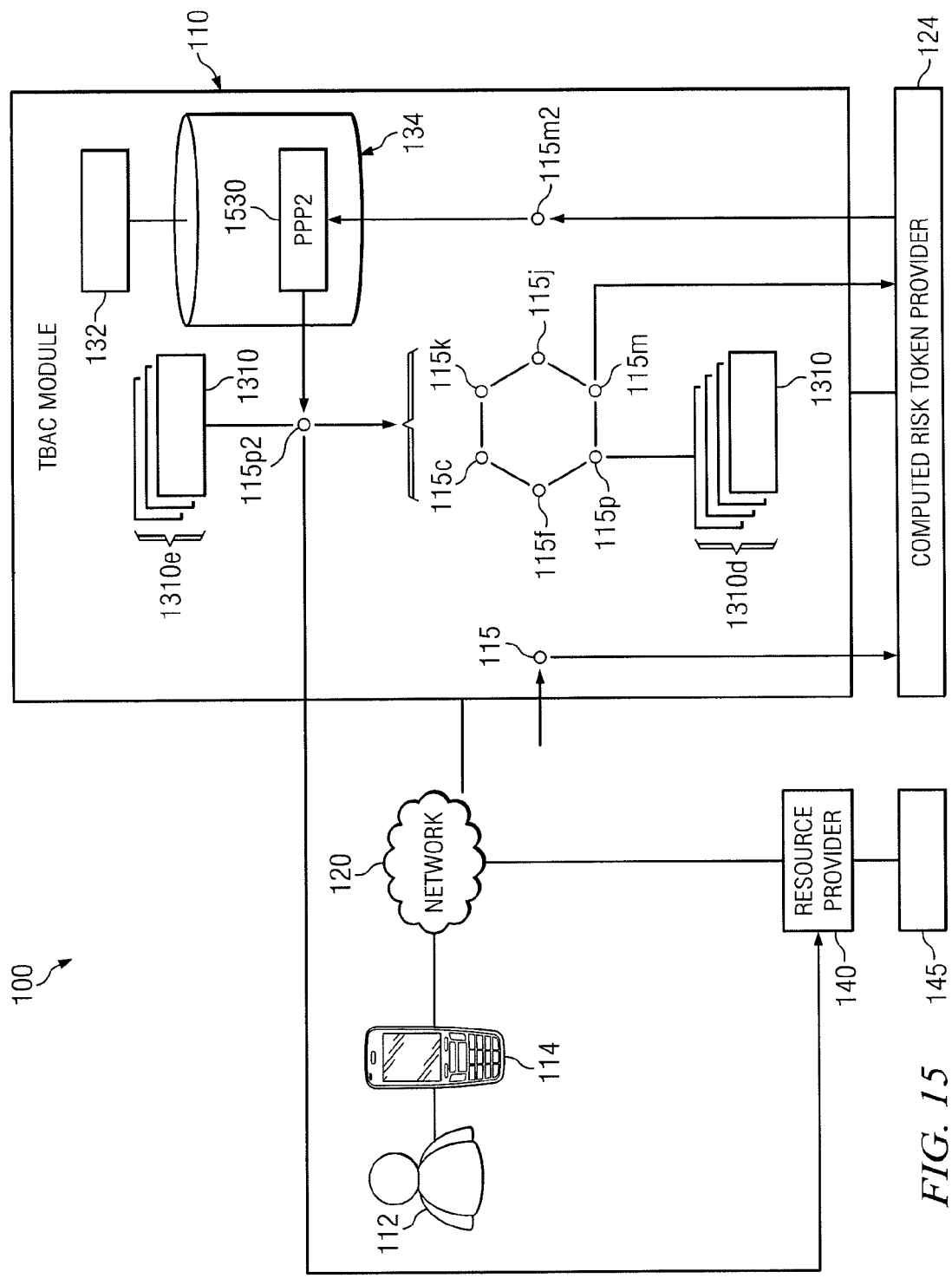
FIG. 15 illustrates the system of FIG. 1 reassigning privileges.
Figure 16:
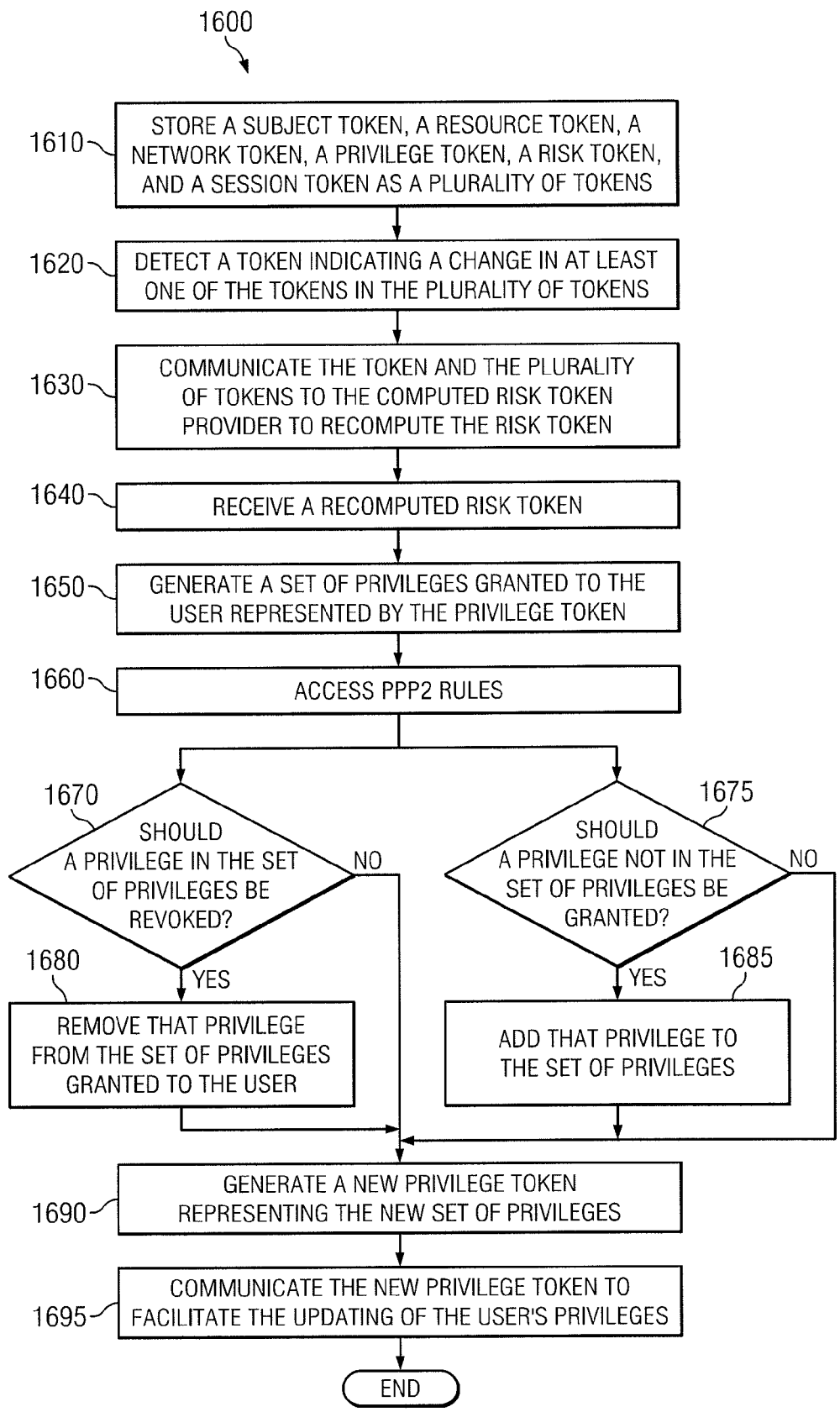
FIG. 16 is a flowchart illustrating a method of reassigning privileges using the system of FIG. 1.

FIGS. 15 and 16 illustrate system 100 reassigning privileges 1310. In general, a user 112 may be granted a privilege 1310 or set of privileges 1310, and these privileges 1310 may define what actions the user 112 may perform while accessing a resource 145. However, for security reasons, when changes occur in the system 100, the user 112 may be denied certain privileges 1310 based on those changes. The process of detecting a change and determining which privileges 1310 to deny or grant is referred to as reassigning privileges, which is discussed further with respect to FIGS. 15 and 16.

TBAC module 110 may be facilitating access by a user 112 to resource 145 over a network 120. User 112 may have been granted a privilege 1310 associated with accessing resource 145. However, when TBAC module 110 detects a change, for example in the network 120 or resource 145, it may not be safe for the user 112 to continue having the privilege 1310. TBAC module 110 may determine, based on the change, if the privilege 1310 should be denied. If the privilege should be denied, TBAC module 110 may generate a token 115 that, when communicated, may facilitate the denial of privilege 1310.

FIG. 15 illustrates the system 100 of FIG. 1 reassigning privileges 1310. As provided in FIG. 15, TBAC module 110 may store a subject token 115k, resource token 115c, network token 115f, risk token 115m, and privilege token 115p, among others, as appropriate. These tokens 115 may be correlated with a session token 115j to indicate that user 112 may be accessing a resource 145 through a session. Furthermore, resource token 115p may represent a set of privileges 1310 granted to user 112. Each privilege 1310 in the set of privileges 1310d may grant user 112 a certain ability while device 114 consumes resource 145. As an example and not by way of limitation, a privilege 1310 in the set of privileges 1310d may grant user 112 the ability to edit resource 145.

TBAC module 110 may be monitoring the session while user 112 is accessing resource 145. In particular embodiments, TBAC module 110 may receive a token 115 that indicates a change has occurred in system 100. This change may correspond to a change in any of the tokens 115 stored in TBAC module 110, and may affect the privileges 1310 granted to user 112. TBAC module 110 may determine the effect of the change on the set of privileges 1310d and facilitate the revoking and granting of privileges 1310 to user 112 pursuant to the privilege reassignment process.

TBAC module 110 may initiate the privilege reassignment process by communicating token 115 and risk token 115m to the computed risk token provider 124. In response, computed risk token provider 124 may recompute risk token 115m based on the change represented by token 115 to produce a recomputed risk token 115m2. Computed risk token provider 124 may communicate the recomputed risk token 115m2 to TBAC module 110.

TBAC module 110 may use the recomputed risk token 115m2 to facilitate the revoking and granting of privileges 1310. TBAC module 110 may use recomputed risk token 115m2 to access privilege reassignment (PPP2) rules 1530 stored in memory 134 to determine the privileges 1310 from the set of privileges 1310d that should be revoked and granted based on the risk associated with the change indicated by token 115. As an example and not by way of limitation, a particular PPP2 rule 1530 may specify that, based on the change, a privilege 1310 to edit resource 145 may be revoked and a privilege 1310 to email the resource 145 may be granted. TBAC module 110 may add to the set of privileges 1310d the privileges 1310 that should be granted, and remove from the set of privileges 1310d the privileges 1310 that should be revoked. Continuing the previous example, based on the particular PPP2 rule, TBAC module 110 may remove from the set of privileges 1310d the privilege 1310 to edit resource 145 and add to the set of privileges 1310d the privilege to email the resource 145.

TBAC module 110 may add and remove privileges 1310 from the set of privileges 1310d to form a new set of privileges 1310e. TBAC module 110 may generate a new privilege token 115p2 to represent the new set of privileges 1310e. TBAC module 110 may then communicate the new privilege token 115p2 to facilitate the reassignment of the new privileges 1310e to user 112. In particular embodiments, TBAC module 110 may communicate the new privilege token 115p2 to resource provider 140 to facilitate the granting and revoking of privileges 1310. In response, resource provider 140 may revoke the privileges 1310 that should be revoked and grant the privileges 1310 that should be granted. In this manner, TBAC module 110 may use tokens 115 to reassign privileges 1310 to user 112 during runtime. In particular embodiments, TBAC module 110 may further use recomputed risk token 115m2 to make an access decision 900 following the process discussed with respect to FIGS. 8-10.

Although this disclosure describes TBAC module 110 performing certain actions with respect to FIG. 15, this disclosure contemplates the processor 132 and the memory 134 of the TBAC module 110 performing these actions. The illustration of system 100 in FIG. 15 does not specifically illustrate all of the elements from the illustration of system 100 in FIG. 1 so that particular aspects of system 100 may be emphasized. However, system 100 of FIG. 15 includes all the elements of system 100 in FIG. 1.

FIG. 16 is a flowchart illustrating a method 1600 of reassigning privileges 1310 using the system 100 of FIG. 1. TBAC module 110 may perform method 1600. TBAC module 110 may begin by storing a subject token 115k, a resource token 115c, a network token 115f, a privilege token 115p, a risk token 115m, and a session token 115j, among others, as appropriate, as a plurality of tokens 115 in step 1610. In step 1620, TBAC module 110 may detect a token 115 indicating a change in at least one of the tokens 115 in the plurality of tokens 115. In response, TBAC module 110 may communicate the token 115 and the plurality of tokens 115 to the computed risk token provider 124 to recompute the risk token 115m in step 1630. TBAC module 110 may receive a recomputed risk token 115m2 in step 1640.

TBAC module 110 may begin reassigning privileges using the recomputed risk token 115m2. To begin, TBAC module 110 may generate a set of privileges 1310d granted to the user 112 represented by the privilege token 115p in step 1650. In step 1660, TBAC module 110 may access PPP2 rules 1530. In particular embodiments, TBAC module 110 may use the recomputed risk token 115m2 to access PPP2 rules 1530 to determine which privileges 1310 should be added to and removed from the set of privileges 1310d. In step 1670, TBAC module 110 may determine which privileges 1310 in the set of privileges 1310d should be revoked. In step 1680, TBAC module 110 may remove the privileges 1310 from the set of privileges 1310d that should be revoked. In step 1675, TBAC module 110 may determine which privileges 1310 not in the set of privileges 1310d should be granted. In step 1685, TBAC module 110 may add the privileges 1310 to the set of privileges 1310d that should be granted. By adding and removing privileges 1310, TBAC module 110 will produce a new set of privileges 1310e. TBAC module 110 may continue by generating a new privilege token 115p2 representing the new set of privileges 1310e. TBAC module 110 may conclude by communicating the new privilege token 115p2 to facilitate the updating of the privileges 1310 of the user 112.

In particular embodiments, because system 100 may detect when a privilege 1310 should be denied while user 112 is accessing resource 145, system 100 may provide a more robust and dynamic privileging process. Furthermore, because TBAC module 110 uses tokens 115 to reassign privileges, system 100 may perform privilege reassignment faster and more efficiently.

Figure 17:
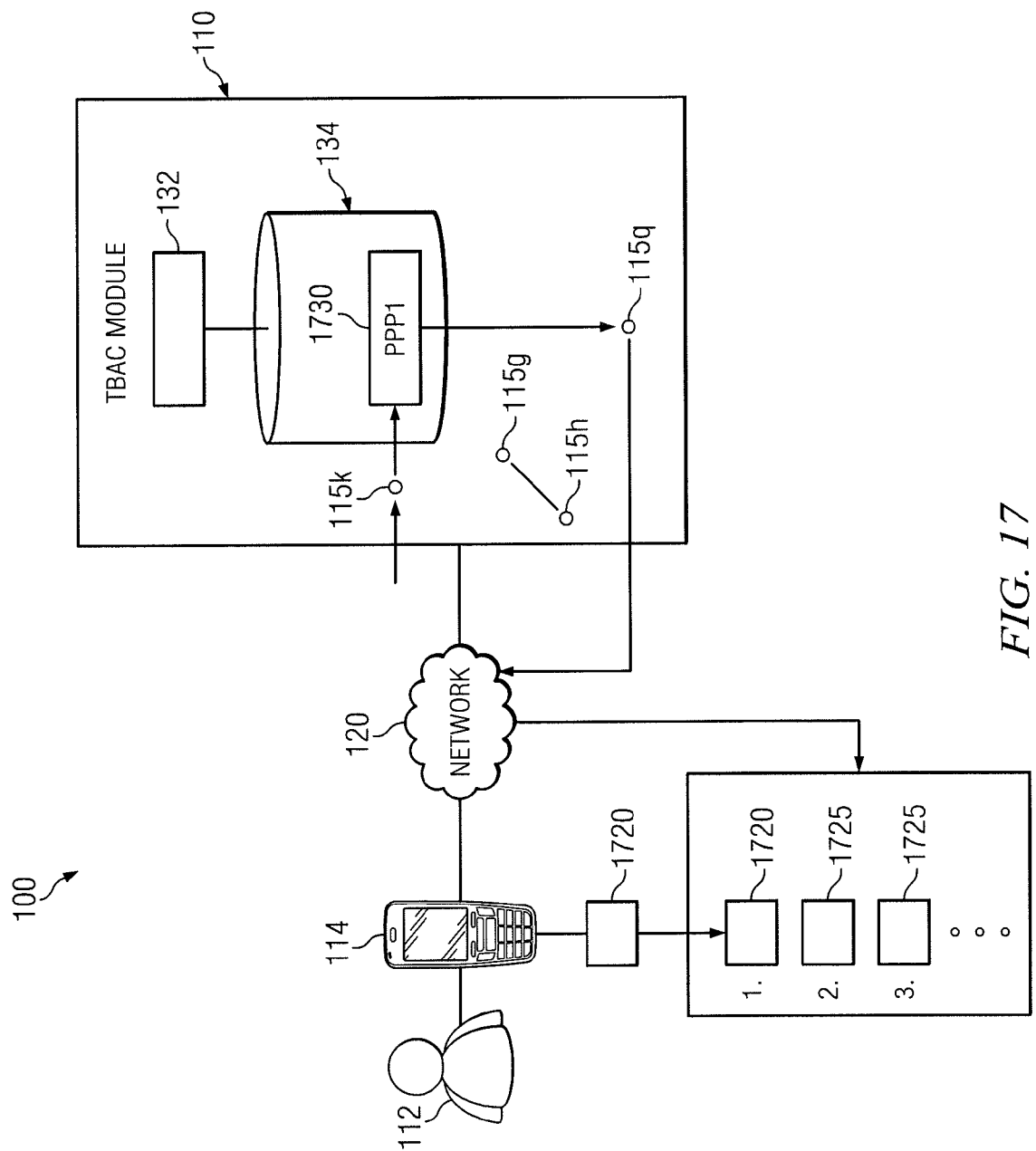
FIG. 17 illustrates the system of FIG. 1 prioritizing packets.
Figure 18:
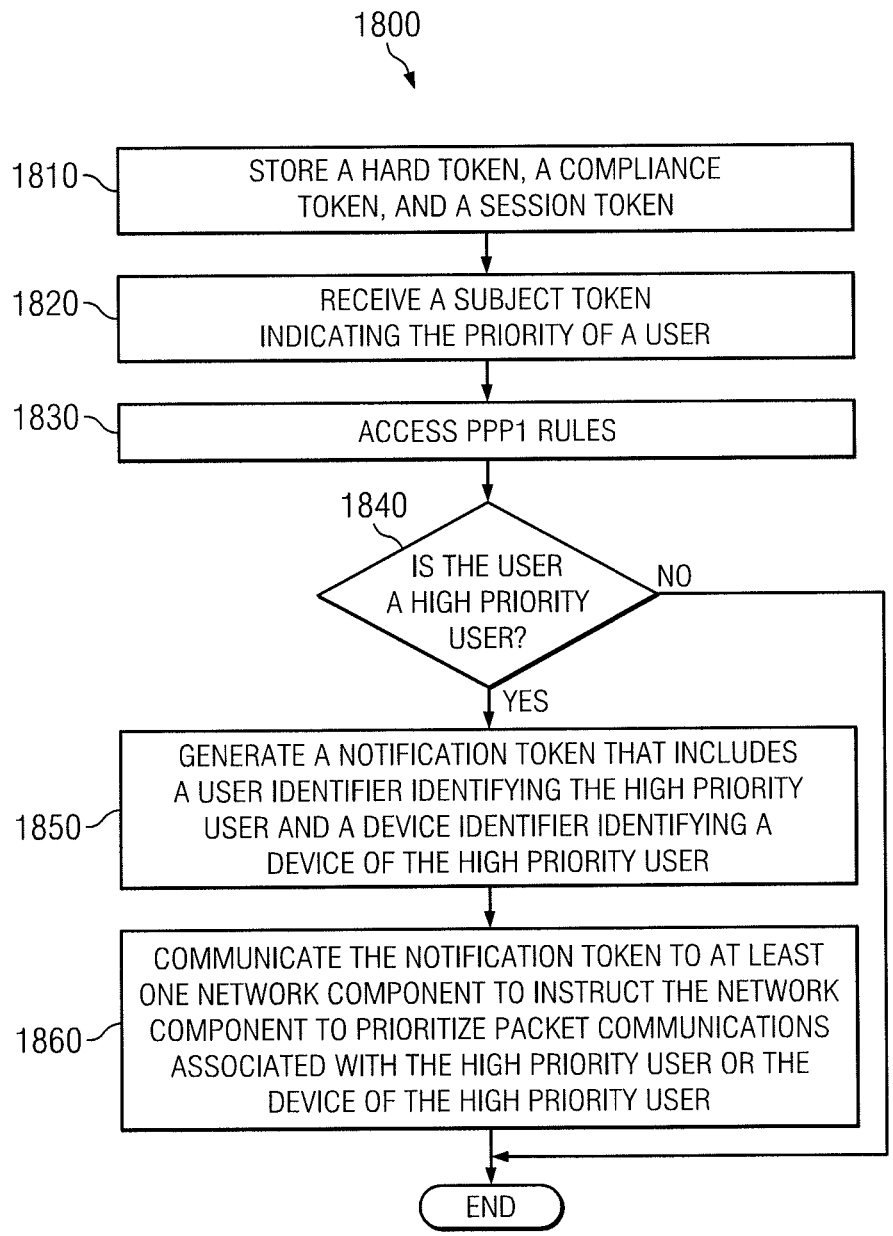
FIG. 18 is a flowchart illustrating a method of prioritizing packets using the system of FIG. 1.

FIGS. 17 and 18 illustrate system 100 performing packet prioritization. In general, some users 112 of system 100 may be more important than other users 112. It may be desirable to prioritize the tasks of the important users 112 over the tasks of the other users 112. To accomplish this, system 100 may prioritize packets 1725 by processing the network packets 1720 of the important users 112 before the network packets 1725 of the other users 112. The process of determining a user 112 is important and prioritizing the packets of the important user 112 is referred to as packet prioritization, which is discussed further with respect to FIGS. 19 and 20.

TBAC module 110 may facilitate access by a user 112 to a resource 145. TBAC module 110 may determine that user 112 is a high priority user and should have his packets processed before the packets of other users 112. TBAC module 110 may generate a token 115 to indicate that user 112 is a high priority user. TBAC module 110 may communicate the token 115 to facilitate the prioritization of the packets of user 112.

FIG. 17 illustrates the system 100 of FIG. 1 prioritizing packets 1725. As provided in FIG. 17, TBAC module 110 may store a hard token 115g (that may include a device identifier that identifies a device 114) and a compliance token 115h to indicate that device 114 is capable of consuming a resource 145. In particular embodiments, TBAC module 110 may receive a subject token 115k indicating the priority of user 112. As an example and not by way of limitation, subject token 115k may include a user identifier that indicates that user 112 is a high priority user. In particular embodiments, subject token 115k may be correlated with hard token 115g to associate the high priority user 112 with device 114. As an example and not by way of limitation, correlating the hard token 115g with the subject token 115k may indicate that the device 114 is being used by the high priority user 112.

TBAC module 110 may use subject token 115k to access packet prioritization (PPP1) rules 1730 stored in memory 134 to determine the priority of user 112. As an example and not by way of limitation, a particular PPP1 rule 1730 may specify that user 112 associated with subject token 115k should be prioritized above all other users 112 in the system 100. As a result, by applying the particular PPP1 rule 1730, TBAC module 110 may determine that the user 112 associated with subject token 115k is a high priority user 112 and that packets from the high priority user 112 should be processed before packets from any other user 112 of system 100.

TBAC module 110 may generate a notification token 115q indicating the priority of user 112. In particular embodiments, notification token 115q may include the user identifier associated with the high priority user 112 and the device identifier associated with the device 114 of the high priority user 112. Notification token 115q further include instructions on how to prioritize packet 1720 from user 112. As an example and not by way of limitation, if user 112 is a high priority user, notification token 115q may include instructions to prioritize packet 1720 from user 112. TBAC module 110 may then communicate notification token 115q to network 120. In particular embodiments, TBAC module 110 may communicate notification token 115q to a network component of network 120 such as, for example, a router, a switch, a gateway, or a server such as a secure token server. In response, network 120 may recognize packet 1720 from user 112 as a high priority packet 1720 and prioritize high priority packet 1720 over other packets 1725. As an example and not by way of limitation, network 120 may process high priority packets 1720 before it processes other packets 1725 even if the other packets 1725 arrived at network 120 prior to the high priority packet 1720.

In this manner, a process associated with the high priority user 112 may be prioritized over the process of another user 112. As an example and not by way of limitation, high priority user 112 may be authenticated prior to other users 112 because the packets 1720 of high priority user 112 are prioritized over the packets 1725 of other users 112. As another example and not by way of limitation, by prioritizing packets 1720 from high priority user 112, high priority user 112 may be authorized to access a resource 145 before other users 112 of the system 100. Although this disclosure describes prioritizing particular processes of high priority user 112, this disclosure contemplates prioritizing any suitable process of high priority user 112. In general, TBAC module 110 may communicate a session associated with the high priority user 112 to network 120 such that all packets 1720 associated with the session of the high priority user 112 may be prioritized over the packets 1725 of other users 112. TBAC module may further designate the session token 115j associated with the session as a high priority session token 115j.

As yet another example and not by way of limitation, TBAC module 110 may prioritize the provisioning of a container 210 to device 114 associated with the high priority user 112 by prioritizing the packets 1720 of the high priority user 112. TBAC module 110 may communicate a token 115 to facilitate the provisioning of a container 210 to device 114. Container 210 may include a virtual machine. If notification token 115q indicates that user 112 is a high priority user, network 120 may process the packets 1720 associated with token 115 before processing the packets 1725 of other users 112 of system 100. As a result, network 120 may facilitate the provisioning of the container 210 to device 114 before processing other packets 1725. As an example and not by way of limitation, if a high priority user 112 and another user 112 were both waiting for a container 210 to be provisioned to their devices 114, network 120 may prioritize the packets 1725 of the high priority user 112 thereby resulting in the provisioning of the container 210 to the high priority user 112 prior to provisioning of the container 210 to the other user 112.

Although this disclosure describes TBAC module 110 performing certain actions with respect to FIG. 17, this disclosure contemplates the processor 132 and the memory 134 of the TBAC module 110 performing these actions. The illustration of system 100 in FIG. 17 does not specifically illustrate all of the elements from the illustration of system 100 in FIG. 1 so that particular aspects of system 100 may be emphasized. However, system 100 of FIG. 17 includes all the elements of system 100 in FIG. 1.

FIG. 18 is a flowchart illustrating a method 1800 of prioritizing packets 1725 using the system 100 of FIG. 1. TBAC module 110 may perform method 1800. As provided by FIG. 18, TBAC module 110 may begin by storing a hard token 115g, a compliance token 115h, and a session token 115j, among others, as appropriate, in step 1810. TBAC module 110 may continue by receiving a subject token 115k indicating the priority of a user 112 in step 1820. In particular embodiments, the subject token 115k may indicate the user 112 is a high priority user. In particular embodiments, in response to the determination that the user 112 is a high priority user, the session token 115j may be designated a high priority session token. TBAC module 110 may continue by accessing PPP1 rules 1730 in step 1830. In step 1840, TBAC module 110 may determine, based on PPP1 rules 1730, if the user 112 is a high priority user. If the user 112 is not a high priority user, TBAC module 110 may conclude.

If the user 112 is a high priority user, TBAC module 110 may initiate packet prioritization for the high priority user. To begin, TBAC module 110 generate a notification token 115q that includes a user identifier identifying the high priority user and a device identifier identifying a device 114 of the high priority user in step 1850. TBAC module 110 may conclude in step 1860 by communicating the notification token 115q to at least one network component to instruct the network component to prioritize packet communications associated with the high priority user or the device 114 of the high priority user.

In particular embodiments, by prioritizing the packets of certain users 112, system 100 may provide more dynamic functionality to users 112. Furthermore, because TBAC module 110 uses tokens 115 to facilitate packet prioritization, system 100 may be able to quickly and efficiently determine when to prioritize the packets of a certain user.

Figure 19:
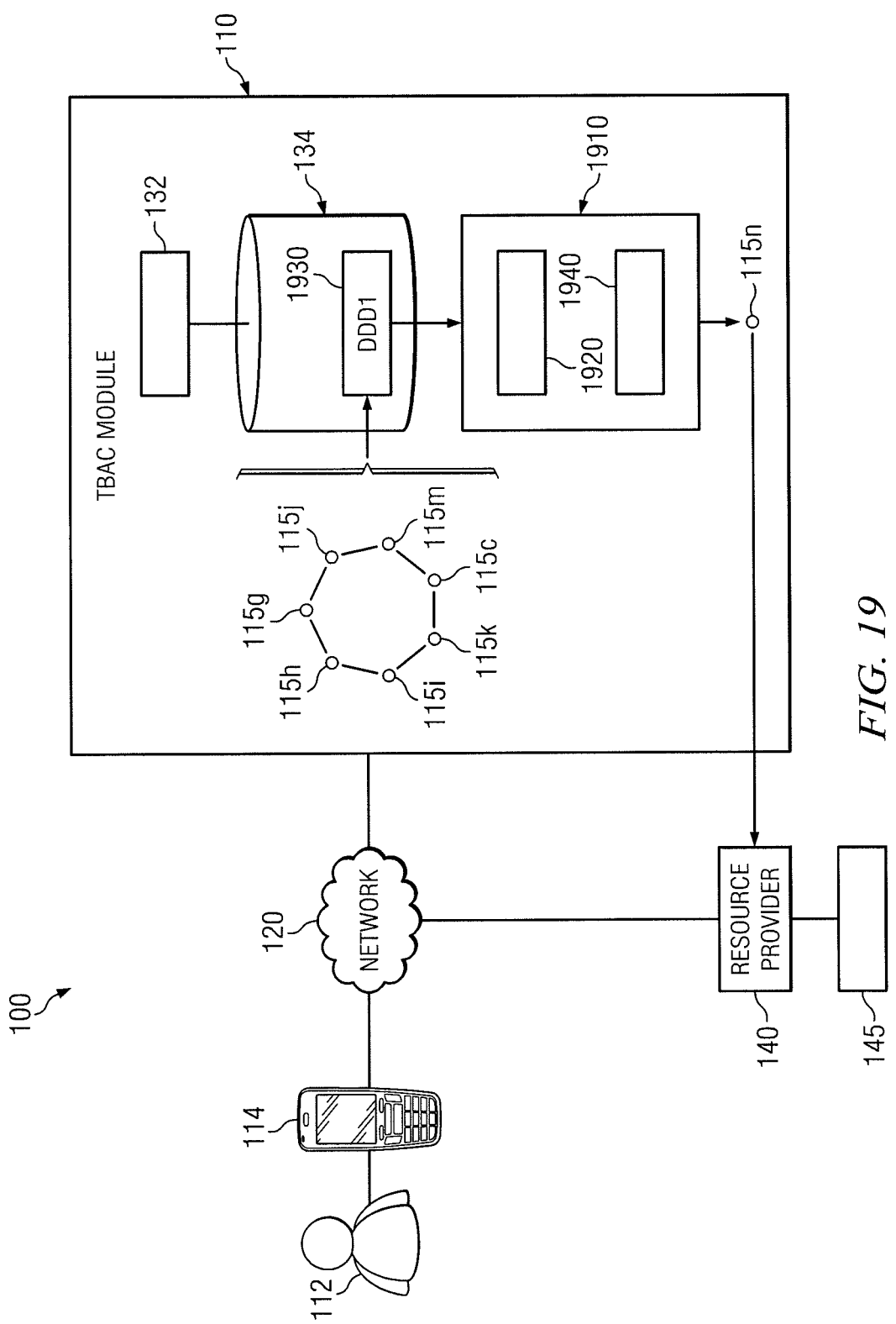
FIG. 19 illustrates the system of FIG. 1 conditioning an access decision.
Figure 20:
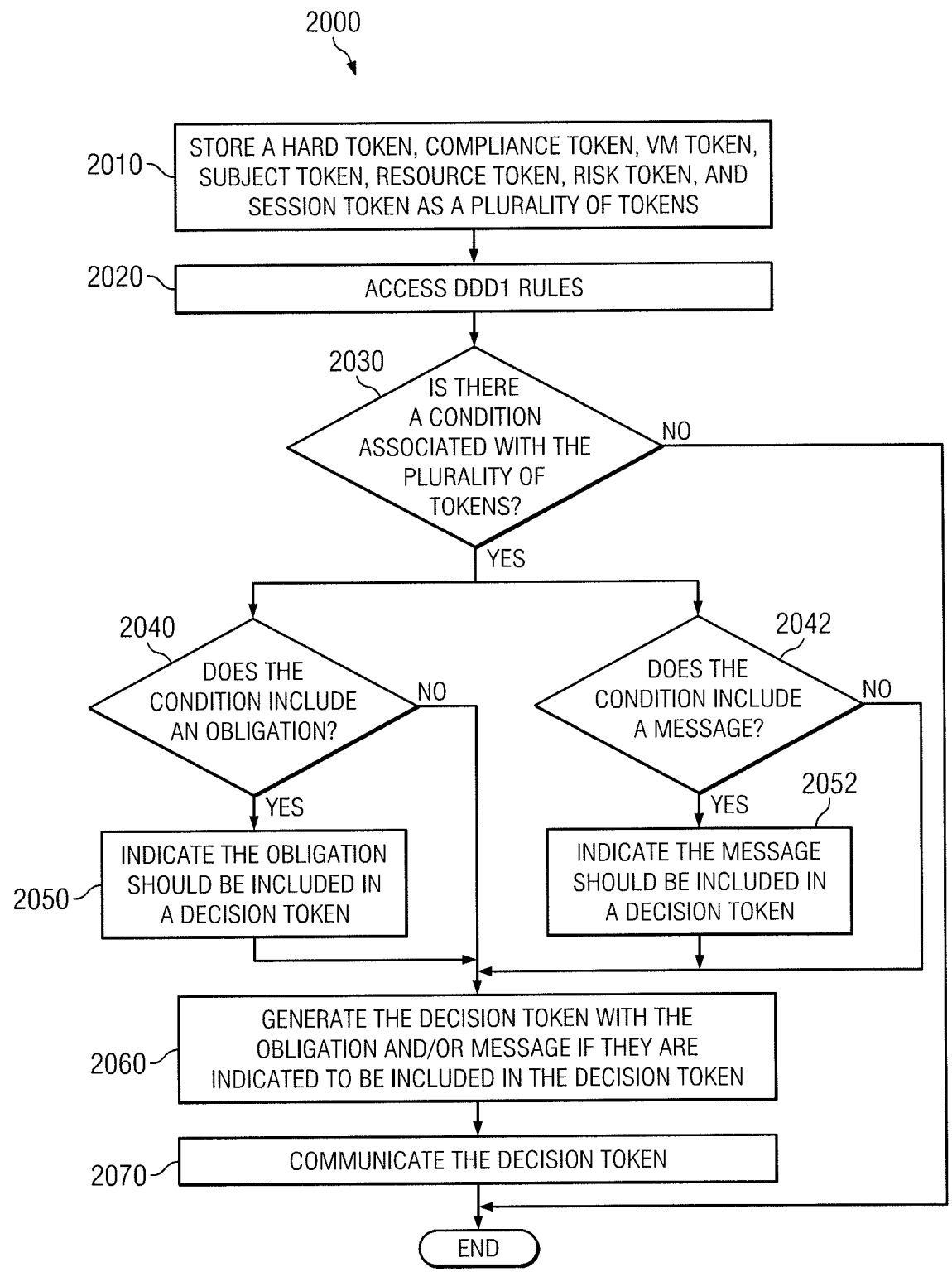
FIG. 20 is a flowchart illustrating a method of conditioning access decisions using the system of FIG. 1.

FIGS. 19 and 20 illustrate system 100 conditioning an access decision 900. In some instances, making an access decision 900 may be more complicated than granting or denying access. There may be conditions 1910 attached to those decisions. For example, a decision to deny may be accompanied with a condition 1910 that, if satisfied, may result in the granting of access. The process of determining conditions 1910 and communicating the conditions 1910 is referred to as conditioning, which is discussed further with respect to FIGS. 19 and 20.

TBAC module 110 may make an access decision 900 following the process discussed with respect to FIGS. 8-10. In addition to making a decision to grant or deny access, TBAC module 110 may determine conditions associated with the decision to grant or deny access. TBAC module 110 may generate a decision token 115n that represents the condition, and may communicate the decision token 115n to facilitate enforcement of the condition.

FIG. 19 illustrates the system 100 of FIG. 1 conditioning an access decision 900. As provided in FIG. 19, TBAC module 110 may store a hard token 115g, a compliance token 115h, a VM token 115i, a subject token 115k, a dataset token 115l, a risk token 115m, and a session token 115j, among others, as appropriate. These tokens 115 may indicate a user 112 is requesting access to a resource 145 over a network 120. Using these tokens 115, TBAC module 110 may make an access decision 900 following the process described with respect to FIGS. 8 through 10. In addition to making an access decision 900, TBAC module 110 may determine a condition 1910 associated with the access decision 900. TBAC module 110 may use the stored tokens 115 to access conditioning (DDD1) rules 1930 stored in memory 134 to determine the condition 1910. A particular DDD1 rule 1930 may specify a condition 1910 associated with accessing a particular resource 145. In particular embodiments, the condition 1910 may include an obligation 1920, and/or a message 1940 associated with the access decision 900.

Condition 1910 may include an obligation 1920 to be fulfilled in conjunction with enforcing the access decision 900. In particular embodiments, obligation 1920 must be performed in conjunction with enforcing the access decision 900. As an example and not by way of limitation, obligation 1920 may indicate that resource provider 140 must synchronize its system clock with the network 120 clock before granting access to a resource 145. In certain embodiments, obligation 1920 may be optional with respect to enforcing the access decision 900. As an example and not by way of limitation, obligation 1920 may recommend that resource provider 140 may synchronize its system clock with the network 120 clock before granting access to a resource 145.

Obligation 1920 may indicate a task to be performed by a component of system 100 upon receiving the access decision 900 along with the obligation 1920. As an example and not by way of limitation, obligation 1920 may be synchronizing a system clock of the resource provider 140 with a clock on a network 120. Upon receiving the access decision 900 along with the obligation 1920 to synchronize a system clock, resource provider 140 may enforce the access decision 900 and synchronize its system clock with a clock on network 120. As another example and not by way of limitation, obligation 1920 may be initializing the logging of errors and performance metrics related with enforcing the access decision 900. Upon receiving the access decision 900 along with the obligation 1920, resource provider 140 may enforce the access decision 900 and initialize the logging of errors and performance metrics related with enforcing the access decision. As yet another example and not by way of limitation, obligation 1920 may be tracking transactions over network 120. Upon receiving the access decision 900 along with the obligation 1920, resource provider 140 may enforce the access decision 900 and begin tracking transactions associated with a requested resource 145.

Obligation 1920 may indicate a task to be performed by user 112 before access to the resource 145 may be granted. As an example and not by way of limitation, obligation 1920 may indicate that a peripheral device such as a USB drive is attached to device 114 and that the peripheral device should be removed before access may be granted to resource 145. During enforcement of an access decision 900, user 112 may be notified to remove the peripheral device. If user 112 removes the peripheral device from device 114, obligation 1920 may be satisfied and access to resource 145 may be granted to user 112. As another example, and not by way of limitation, obligation 1920 may indicate that information required to access resource 145 such as, for example, the birthday of the user 112 may be missing. If user 112 supplies the missing information, for example by entering the birthday into device 114, obligation 1920 may be satisfied and access to resource 145 may be granted.

Condition 1910 may include a message 1940. Message 1940 may provide an explanation for the access decision 900. As an example and not by way of limitation, if access to resource 145 was denied because user 112 was not of a particular age, message 1940 may state that access was denied because user 112 was not old enough. As another example and not by way of limitation, if access to resource 145 was granted because user 112 was exempt from an age restriction, message 1940 may state that access was granted because user 112 is exempt from the age restriction. Message 1940 may further provide instructions on how to fulfill obligation 1920. For example, if obligation 1920 indicates that user 112 should remove a USB drive attached to device 114 before access may be granted, message 1940 may instruct user 112 to remove the USB drive.

In particular embodiments, TBAC module 110 may generate a decision token 115n representing condition 1910. In certain embodiments, decision token 115n may also represent the access decision 900. TBAC module 110 may communicate decision token 115n to resource provider 140 to facilitate the enforcement of the access decision 900 and the condition 1910.

Although this disclosure describes TBAC module 110 performing certain actions with respect to FIG. 19, this disclosure contemplates the processor 132 and the memory 134 of the TBAC module 110 performing these actions. The illustration of system 100 in FIG. 19 does not specifically illustrate all of the elements from the illustration of system 100 in FIG. 1 so that particular aspects of system 100 may be emphasized. However, system 100 of FIG. 19 includes all the elements of system 100 in FIG. 1.

FIG. 20 is a flowchart illustrating a method 2000 of conditioning access decisions 900 using the system 100 of FIG. 1. TBAC module 110 may perform method 2000. As provided in FIG. 20, TBAC module 110 may begin by storing a hard token 115g, compliance token 115h, VM token 115i, subject token 115k, risk token 115m, and session token 115j, among others, as appropriate, as a plurality of tokens in step 2010. TBAC module 110 may continue by accessing DDD1 rules 1930 in step 2020. In step 2030, TBAC module 110 may determine if there is a condition 1910 associated with the plurality of tokens. If there is no condition 1910 associated with the plurality of tokens, TBAC module 110 may conclude.

If there is a condition 1910 associated with the plurality of tokens, TBAC module 110 may initiate conditioning. To begin, TBAC module 110 may continue to steps 2040 and 2042. In step 2040, TBAC module 110 may determine if the condition 1910 includes an obligation 1920. If the condition 1910 does include an obligation 1920, TBAC module 110 may continue to step 2050 to indicate the obligation 1920 should be included in a decision token 115n. In step 2042, TBAC module 110 may determine if the condition 1910 includes a message 1940. If the condition 1910 includes a message 1940, TBAC module 110 may continue to step 2052 to indicate the message 1940 should be included in a decision token 115n. TBAC module 110 may continue to step 2060 to generate the decision token 115n with the obligation 1920 and/or message 1940 if they are indicated to be included in the decision token 115n. TBAC module 110 may conclude in step 2070 by communicating the decision token 115n.

In particular embodiments, because system 100 may place conditions on access decisions 900, system 100 may make more robust access decisions 900. Furthermore, because TBAC module 100 uses tokens to perform conditioning, system 100 may make an access decision 900 quicker and more efficiently.

Figure 21:
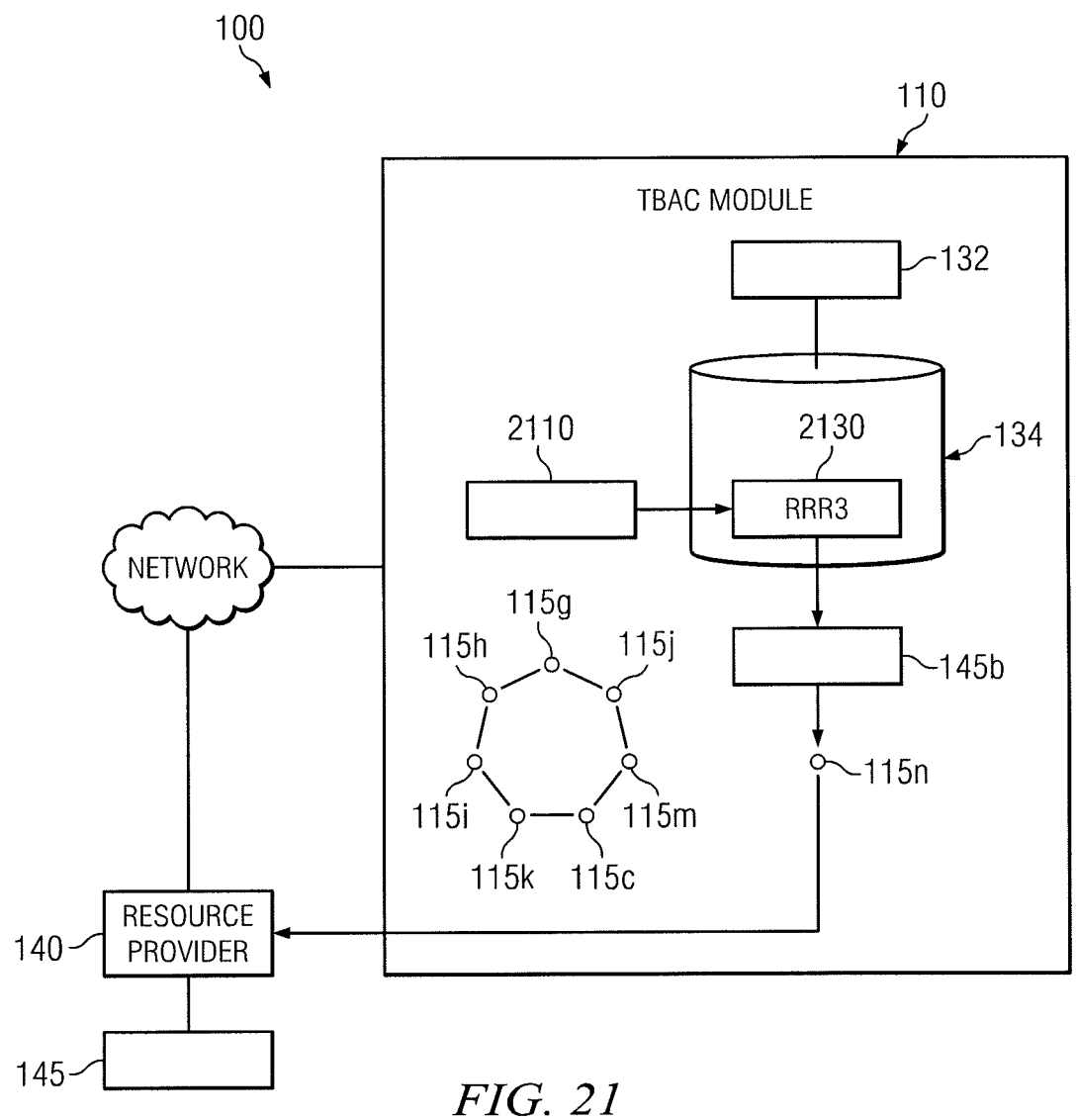
FIG. 21 illustrates the system of FIG. 1 making an access decision for a related resource.
Figure 22:
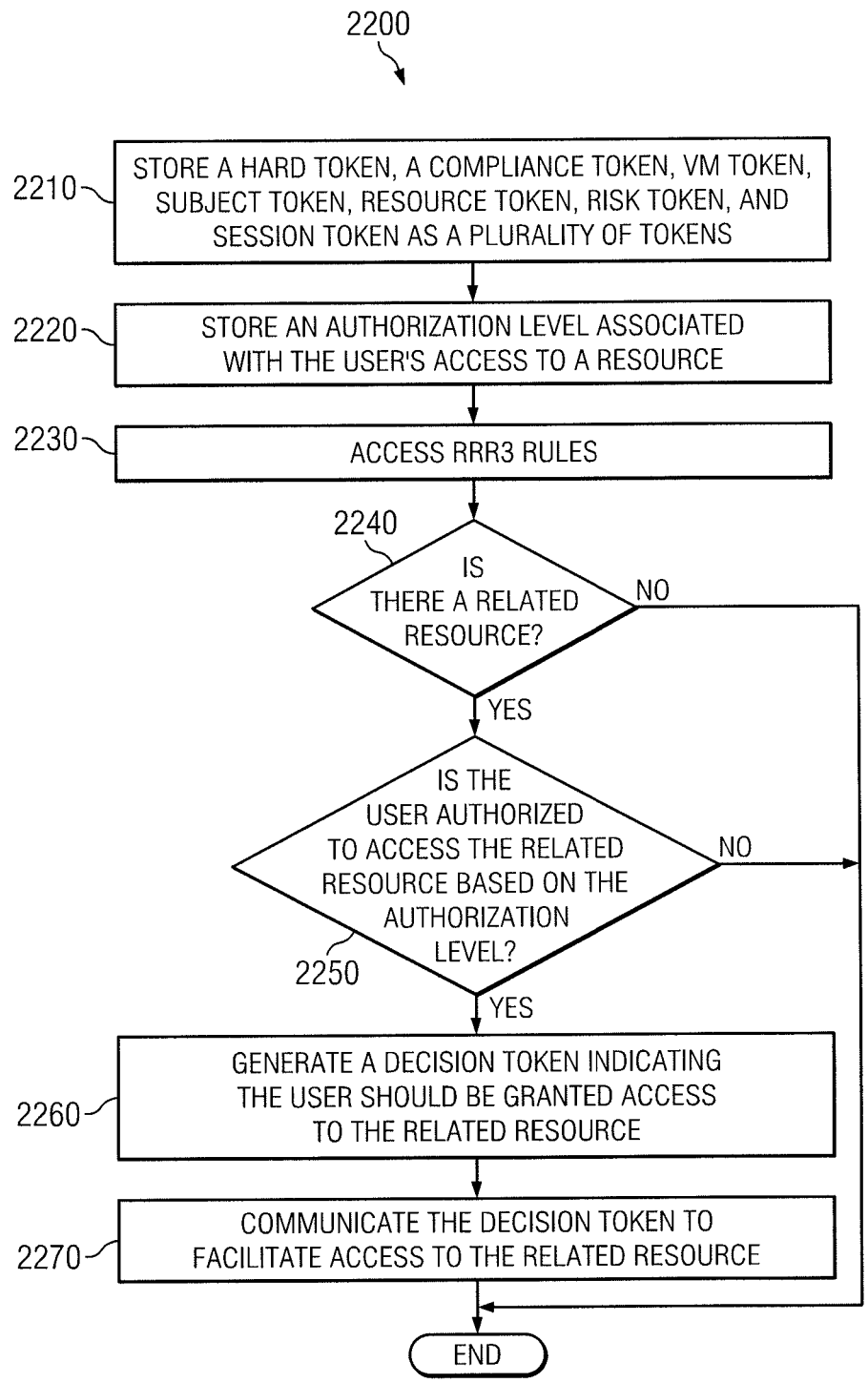
FIG. 22 is a flowchart illustrating a method of making an access decision for a related resource using the system of FIG. 1.

FIGS. 21 and 22 illustrate the system 100 accessing related resources 145b. In general, certain resources 145 may share a relationship with some related resources 145b. For example, a computer resource may include several sub-resources such as an email client, a word processor, and a browser. When system 100 determines whether a user 112 may access a resource 145, system 100 may also determine, based on access to the resource 145, whether there are any related resources 145b that user 112 may also access. This process of determining access to related resources 145b is discussed further with respect to FIGS. 21 and 22. TBAC module 110 may make an access decision 900 for a resource 145 following the process discussed with respect to FIGS. 8-10. TBAC module 110 may also make an access decision 900 for any related resources 145b that share a relationship with the resource 145. For example, user 112 may frequently access the related resource 145b while the user 112 accesses the resource 145. TBAC module 110 may provide the user 112 with a better and more seamless user experience by determining access to the related resource 145b based on the access decision 900 for the resource 145.

FIG. 21 illustrates the system 100 of FIG. 1 making an access decision 900 for a related resource 145b. As provided in FIG. 21, TBAC module 110 may store hard token 115g, compliance token 115h, VM token 115i, subject token 115k, resource token 115c, risk token 115m, and session token 115j, among others, as appropriate. These tokens 115 may indicate that a user 112 is attempting to access a resource 145. TBAC module 110 may use these tokens 115 to make an access decision 900 following the process described with respect to FIGS. 8-10. In particular embodiments, while making the access decision 900, TBAC module 110 may determine an authorization level 2110 associated with access by the user 112 to the resource 145. The authorization level 2110 may be a numerical value. If the value of authorization level 2110 is above a certain threshold, then user 112 may be granted access to resource 145. In particular embodiments, TBAC module 110 may use the authorization level 2110 to determine if user 112 may be granted access to any related resources 145b that share a relationship with resource 145.

To accomplish this, TBAC module 110 may use authorization level 2110 to access resource relationship (RRR3) rules 2130 stored in memory 134. RRR3 rules 2130 may specify a related resource 145b that shares a relationship with the resource 145. As an example and not by way of limitation, a particular RRR3 rule 2130 may specify that resource 145 is a composite resource that includes several sub-resources, and related resource 145b may be a sub-resource of resource 145. As another example and not by way of limitation, a particular RRR3 rule 2130 may specify that related resource 145b is a frequently accessed resource in conjunction with accessing resource 145. Although this disclosure describes related resource 145b sharing particular relationships with resource 145, this disclosure contemplates related resource 145b sharing any suitable relationship with resource 145. Based on authorization level 2110, TBAC module 110 may determine that user 112 is authorized to access related resource 145b. As an example and not by way of limitation, TBAC module 110 may determine that the authorization level 2210 is an 8. If an authorization level 2110 of at least 7 is required to access the related resource 145*b*, then TBAC module 110 may grant access to the related resource 145. As another example and not by way of limitation, if resource 145 includes several sub-resources, one of which is related resource 145*b*, an authorization level 2210 of an 8 may be sufficient to access the related resource 145*b*, but it may not be sufficient to access other sub-resources of resource 145. In that case, user 112 may be granted access to related resource 145*b*, but other sub-resources may be hidden or inaccessible.

In particular embodiments, TBAC module 110 may generate a decision token 115*n* representing the determination that user 112 is authorized to access related resource 145*b*. TBAC module 110 may communicate decision token 115*n* to resource provider 140 to facilitate enforcement of the decision to grant access to the related resource 145*b*. In response, resource provider 140 may grant user 112 access to related resource 145*b*. In particular embodiments, TBAC module 110 may further receive a recomputed risk token 115*m*2 representing the risk associated with granting the user 112 access to the resource 145 and the related resource 145*b*. Recomputed risk token 115*m*2 may be computed based on access by the user 112 to resource 145 and related resource 145*b*, not just resource 145.

Although this disclosure describes TBAC module 110 performing certain actions with respect to FIG. 21, this disclosure contemplates the processor 132 and the memory 134 of the TBAC module 110 performing these actions. The illustration of system 100 in FIG. 21 does not specifically illustrate all of the elements from the illustration of system 100 in FIG. 1 so that particular aspects of system 100 may be emphasized. However, system 100 of FIG. 21 includes all the elements of system 100 in FIG. 1.

FIG. 22 is a flowchart illustrating a method 2200 of making an access decision 900 for a related resource 145*b* using the system 100 of FIG. 1. TBAC module 110 may perform method 2200. As provided in FIG. 22, TBAC module 110 may begin by storing a hard token 115*g*, compliance token 115*h*, VM token 115*i*, subject token 115*k*, resource token 115*c*, risk token 115*m*, and session token 115*j*, among others as appropriate as a plurality of tokens in step 2210. TBAC module 110 may continue by storing an authorization level 2110 associated with access by a user 112 to a resource 145 in step 2220. In particular embodiments, if the authorization level 2110 is above a certain threshold then user 112 may be granted access to the resource 145. TBAC module 110 may continue by accessing RRR3 rules 2130 in step 2230. In step 2240, method 2200 may determine, based on RRR3 rule 2130, if there is a related resource 145*b* that shares a relationship with the resource 145. If there is no related resource 145*b*, TBAC module 110 may conclude. If there is a related resource 145*b*, TBAC module 110 may continue to step 2250 to determine if the user 112 is authorized to access the related resource 145*b* based on the authorization level 2110. If the user is not authorized to access the related resource, TBAC module 110 may conclude. If the user 112 is authorized to access the related resource 145*b*, TBAC module 110 may continue to step 2260 to generate a decision token 115*n* indicating that user 112 should be granted access to the related resource 145*b*. TBAC module 110 may then conclude at step 2270 by communicating the decision token 115*n* to facilitate access to the related resource 145*b*.

In particular embodiments, because system 100 may determine access to related resources 145*b*, system 100 may provide a more seamless user experience for a user 112. Furthermore, because TBAC module 110 uses tokens to determine access to the related resources 145*b*, system 100 may determine access to the related resources 145*b* quicker and more efficiently.

Figure 23:
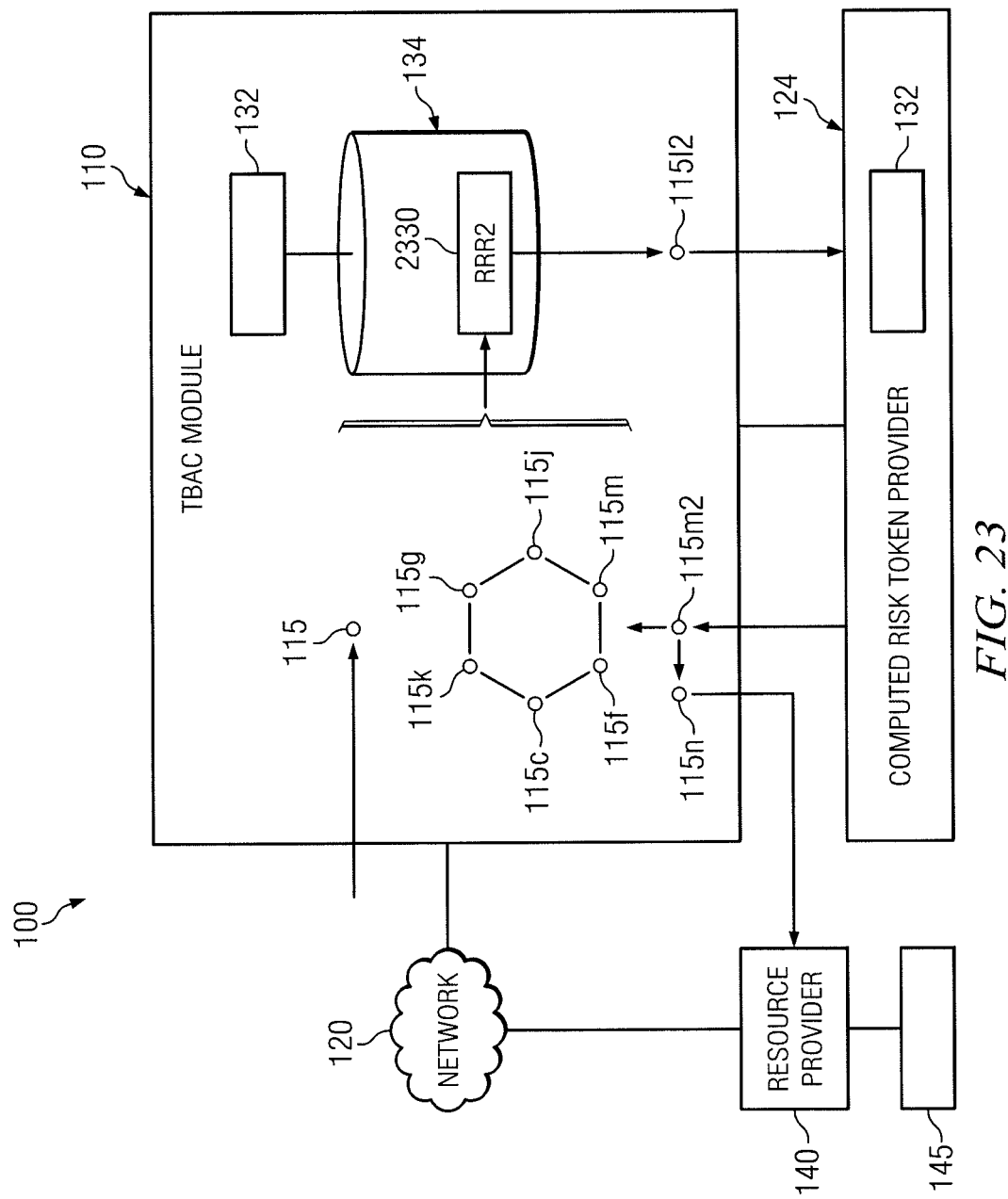
FIG. 23 illustrates the system of FIG. 1 updating risk in real-time.
Figure 24:
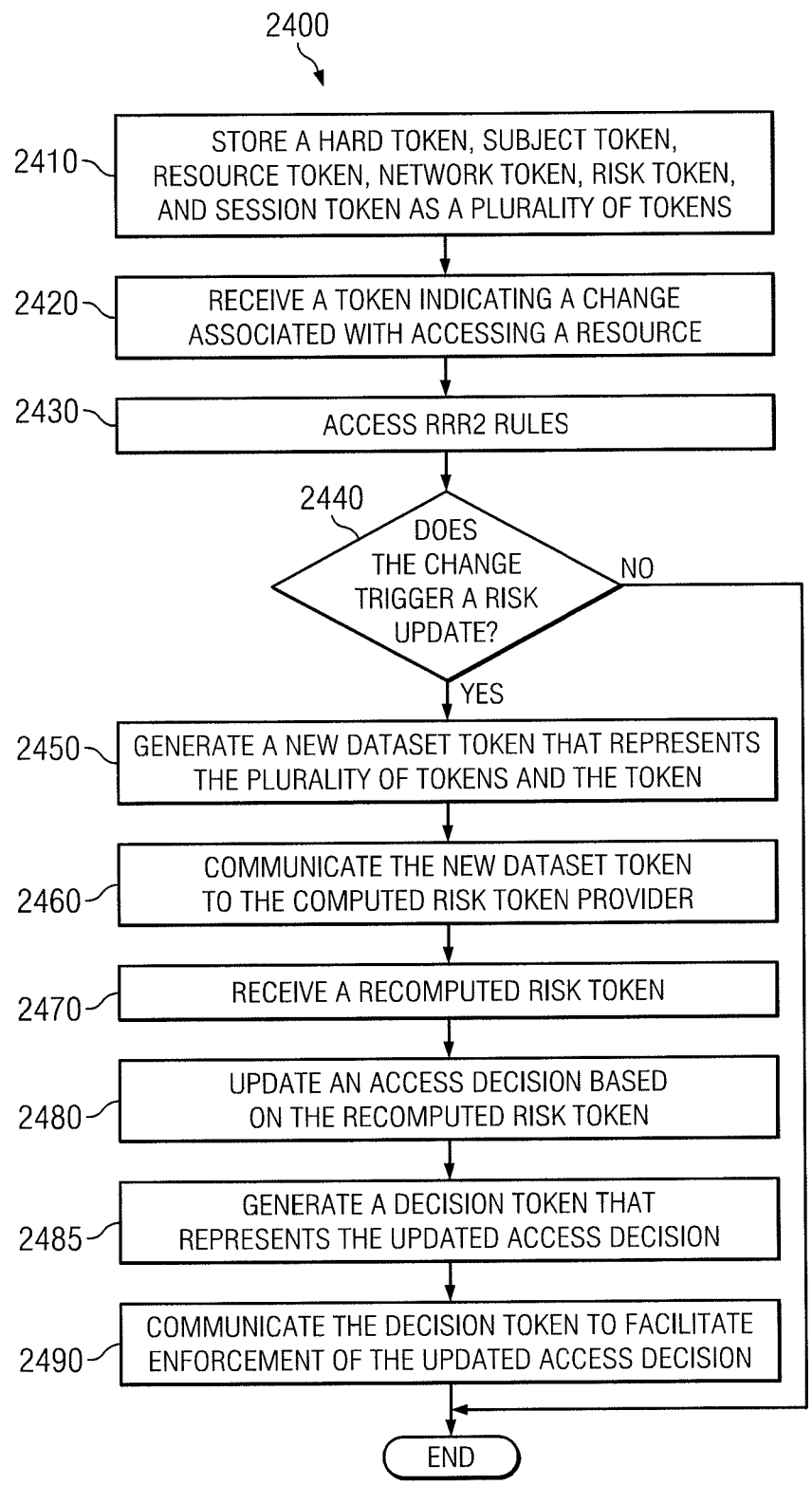
FIG. 24 is a flowchart illustrating a method of updating risk in real-time using the system of FIG. 1.

FIGS. 23 and 24 illustrate the system 100 performing a real-time risk update. In general, changes may occur in the system 100 while a user 112 is accessing a resource 145. These changes may pose risks, such as security risks, for the system 100, and access to the resource 145 may be cut off because of these risks. The process of detecting a change and determining the risk posed by the change is referred to as real-time risk updating, which is discussed further with respect to FIGS. 23 and 24.

TBAC module 110 may detect changes in system 100 while monitoring a session and determine whether those changes trigger a real-time risk update. If a change does trigger a real-time risk update, TBAC module 110 may request a real-time risk update in the form of a recomputed risk token 115*m*2. TBAC module 110 may then use the recomputed risk token 115*m*2 to make an access decision 900 following the process described with respect to FIGS. 8-10.

FIG. 23 illustrates the system 100 of FIG. 1 updating risk in real-time. As provided in FIG. 23, TBAC module 110 may store a hard token 115*g*, a subject token 115*k*, a resource token 115*c*, a network token 115*f*, a risk token 115*m*, and a session token 115*j*, among others as appropriate, as a plurality of tokens. The plurality of tokens may indicate a user 112 is accessing a resource 145 over network 120. TBAC module 110 may receive a token 115 that indicates a change associated with accessing a resource 145. In particular embodiments, token 115 may further indicate that a change has occurred to at least one token 115 in the plurality of tokens. In response to receiving token 115, TBAC module 110 may use token 115 and/or the plurality of tokens to access real-time risk (RRR2) rules 2330 stored in memory 134. In particular embodiments, RRR2 rules 2330 may specify which changes indicated by token 115 may trigger a risk update. As an example and not by way of limitation, a particular RRR2 rule 2330 may specify that jitter over network 120 may trigger a risk update. If token 115 indicates that network 120 is experiencing jitter, then token 115 may trigger a risk update.

To initiate the risk update, TBAC module 110 may generate a new dataset token 115/2 that represents the token 115 and the plurality of tokens. As an example and not by way of limitation, if token 115 is a network token 115*f* indicating that network 120 is experiencing jitter, then new dataset token 115/2 may indicate the presence of the network token 115*f* indicating jitter over the network 120. New dataset token 115/2 may further indicate the presence of the tokens 115 in the plurality of tokens. For example, new dataset token 115/2 may also indicate the presence of risk token 115*m*, which represents a risk associated with accessing the resource before the change. In this manner, new dataset token 115/2 may represent both the state of system 100 prior to the change and the change itself.

TBAC module 110 may communicate the new dataset token 115/2 to the computed risk token provider 124. In response, computed risk token provider 124 may include the change indicated by token 115 in recomputing the risk represented by risk token 115*m*. In this manner, the recomputed risk may represents the risk associated with continuing access to the resource with the change. After recomputing the risk, computed risk token provider 124 may generate a recomputed risk token 115*m*2 that represents the recomputed risk. In particular embodiments, computed risk token provider 124 may communicate the recomputed risk token 115*m*2 to TBAC module 110. In response, TBAC module 110 may incorporate recomputed risk token 115*m*2 into the plurality of tokens. As an example and not by way of limitation, TBAC module 110 may replace risk token 115m with recomputed risk token 115m2. As another example and not by way of limitation, TBAC module 110 may include recomputed risk token 115m2 into the plurality of tokens in addition to the risk token 115m.

In particular embodiments, the recomputed risk represented by recomputed risk token 115m2 may affect an access decision 900 previously made by TBAC module 110 following the process discussed with respect to FIGS. 8-10. In that case, TBAC module 110 may perform that process again with the recomputed risk token 115m2 to produce a new access decision 900. In particular embodiments, TBAC module 110 may generate a decision token 115n that represents the new access decision 900. TBAC module 110 may then communicate decision token 115n to facilitate enforcement of the new access decision 900. In particular embodiments, TBAC module 110 may communicate the decision token 115n to the resource provider 140.

Although this disclosure describes TBAC module 110 and computed risk token provider 124 performing certain actions with respect to FIG. 23, this disclosure contemplates the processor 132 and the memory 134 of the TBAC module 110 and the processor 132 of the computed risk token provider 124 performing these actions. The illustration of system 100 in FIG. 23 does not specifically illustrate all of the elements from the illustration of system 100 in FIG. 1 so that particular aspects of system 100 may be emphasized. However, system 100 of FIG. 23 includes all the elements of system 100 in FIG. 1.

FIG. 24 is a flowchart illustrating a method 2400 of updating risk in real time using the system 100 of FIG. 1. TBAC module 110 may perform method 2400. As provided by FIG. 24, TBAC module 110 may begin by storing a hard token 115g, subject token 115k, resource token 115c, network token 115f, risk token 115m, and session token 115j, among others as appropriate, as a plurality of tokens in step 2410. TBAC module 110 may continue by receiving a token 115 indicating a change associated with accessing a resource 145 in step 2420. In particular embodiments, the change may correspond with a change to a token 115 in the plurality of tokens. TBAC module 110 may continue by accessing RRR2 rules 2330 in step 2430. In step 2440, TBAC module 110 may determine if the change triggers a risk update. If the change does not trigger a risk update, TBAC module 110 may conclude.

If the change does trigger a risk update, TBAC module 110 may initiate the risk updating process. To begin, TBAC module 110 may generate a new dataset token 115l2 that represents the plurality of tokens and the token 115 that indicates the change in step 2450. In particular embodiments, new dataset token 115l2 may indicate the state of system 100 prior to the change and the change itself by representing the plurality of tokens and the token 115 that indicates the change. TBAC module 110 may continue to communicate the new dataset token 115l2 to the computed risk token provider 124 in step 2460. In response, computed risk token provider 124 may include the change represented by the token 115 in recomputing the risk represented by risk token 115m and generate a recomputed risk token 115m2 that represents the recomputed risk. In step 2470, TBAC module 110 may receive the recomputed risk token 115m2.

In particular embodiments, TBAC module 110 may continue to step 2480 to update an access decision 900 based on the recomputed risk token 115m2. TBAC module 110 may update the access decision 900 following the process discussed with respect to FIGS. 8-10. In step 2485, TBAC module 110 may generate a decision token 115n that represents the updated access decision 900. TBAC module 110 may conclude at step 2490 by communicating the decision token 115n to facilitate enforcement of the updated access decision 900.

In particular embodiments, because system 100 may perform real-time risk updates, system 100 may provide better security associated with accessing a resource 145. Furthermore, because TBAC module 110 uses tokens 115 to perform the real-time risk update, system 100 may provide faster and more efficient security.

Figure 25:
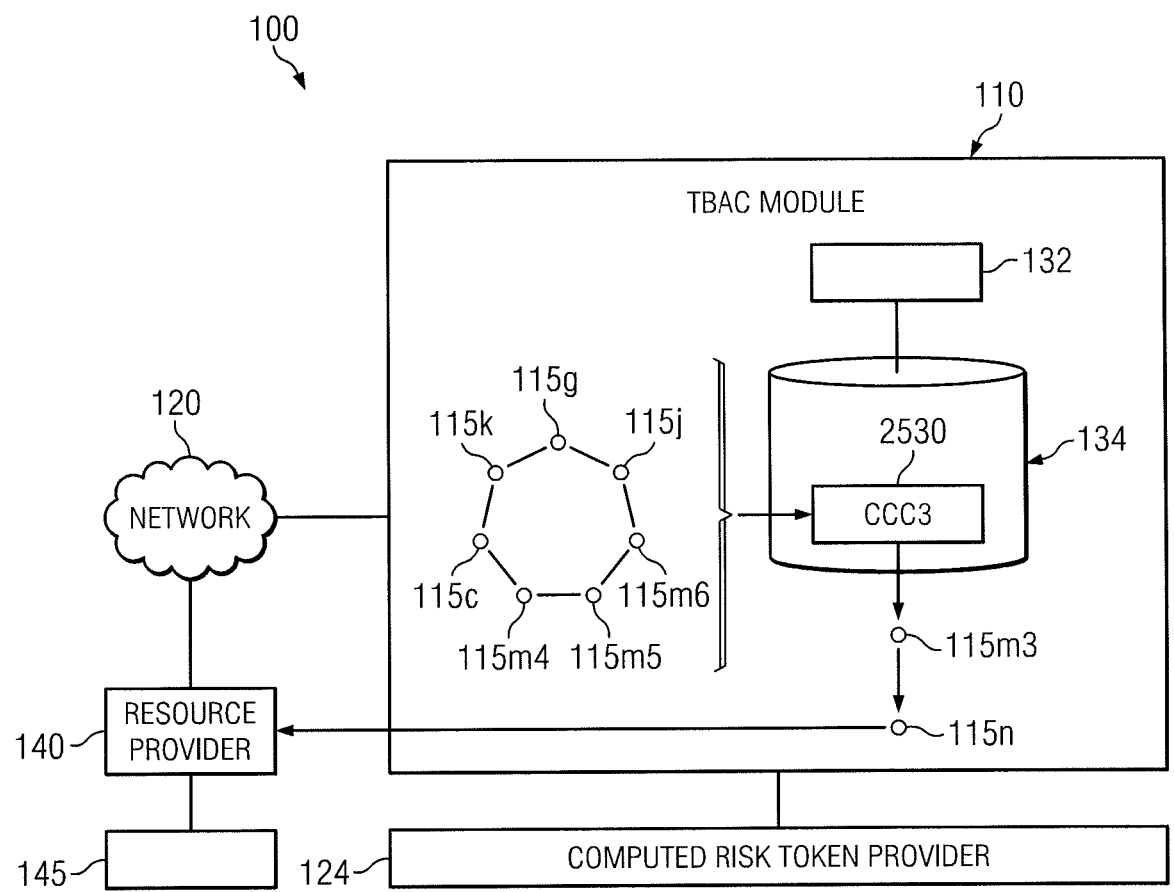
FIG. 25 illustrates the system of FIG. 1 combining risk ratings.
Figure 26:
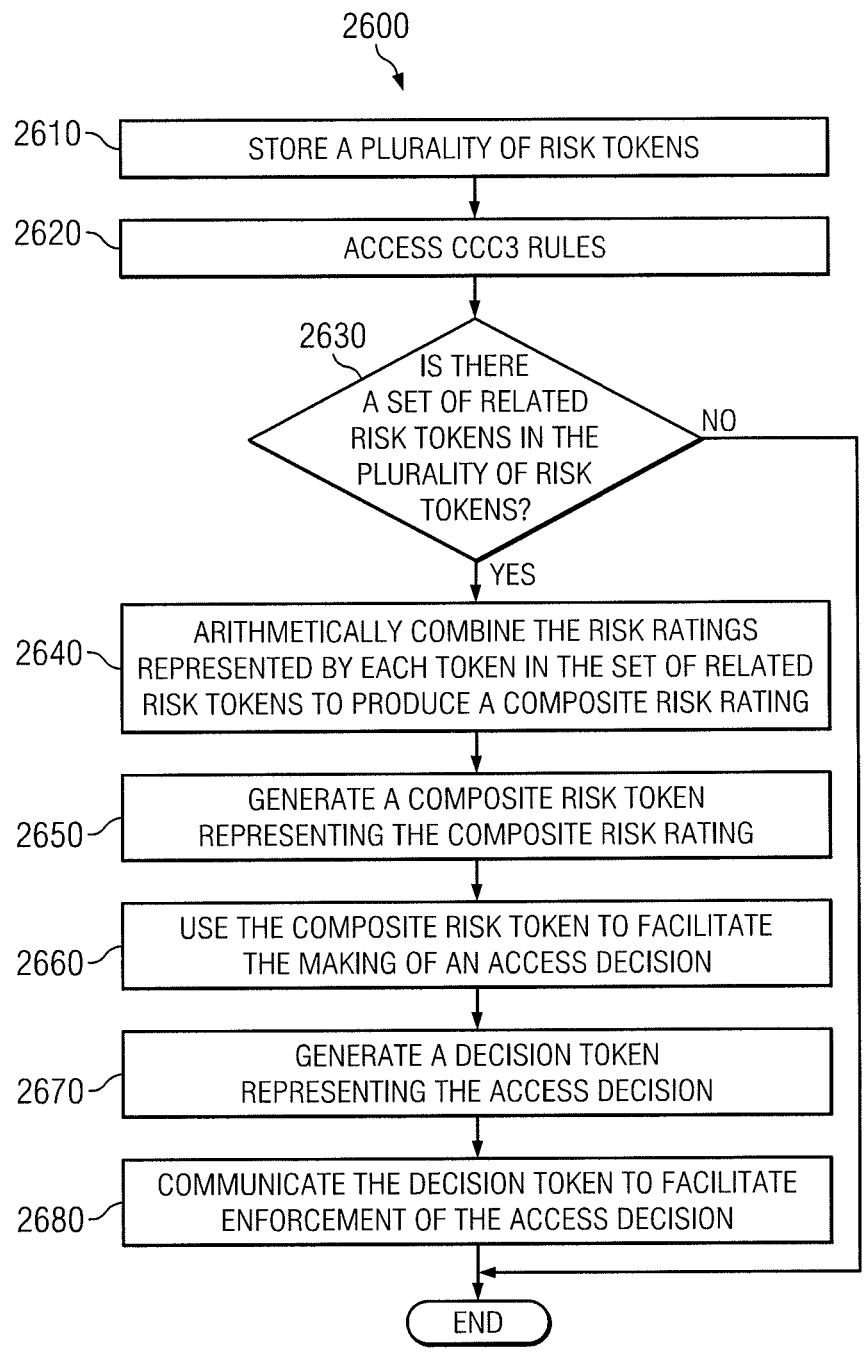
FIG. 26 is a flowchart illustrating a method of combining risk ratings using the system of FIG. 1.

FIGS. 25 and 26 illustrate the system 100 combining risk ratings. In general, during any session, a user 112 may perform several transactions. A particular transaction may have a risk associated with it that is different from the risk associated with another transaction. System 100 may determine if these risks are related and combine them to generate a clearer picture of the overall risk posed by user 112. This process of determining related risks and combining them is referred to as combining risk ratings, which is discussed further with respect to FIGS. 25 and 26.

TBAC module 110 may store multiple risk tokens 115m while monitoring a session. Each risk token 115m may represent a risk associated with a particular transaction. TBAC module 110 may determine which risks are related and combine the related risks into a composite risk token 115m3. TBAC module 110 may then use the composite risk token 115m3 to make an access decision 900 following the process described with respect to FIGS. 8-10.

FIG. 25 illustrates the system 100 of FIG. 1 combining risk ratings. As provided by FIG. 25, TBAC module 110 may store a hard token 115g, a subject token 115k, a resource token 115c, a first risk token 115m4, a second risk token 115m5, a third risk token 115m6, and a session token 115j, among others as appropriate as a plurality of tokens. In particular embodiments, first risk token 115m4, second risk token 115m5, and third risk token 115m6 may each represent a risk rating. The risk rating may be a numerical value that indicates a risk associated with granting a particular user 112 access to a particular resource 145. Although this disclosure describes a particular number of risk tokens 115m stored in TBAC module 110, this disclosure contemplates any number of risk tokens 115m stored in TBAC module 110.

In particular embodiments, particular combinations of the risk ratings represented by first risk token 115m4, second risk token 115m5, and/or third risk token 115m6 may provide more information about the risk associated with user 112 145. To determine these particular combinations, TBAC module 110 may use the first risk token 115m4, the second risk token 115m5, and the third risk token 115m6 to access risk combination (CCC3) rules 2530 stored in memory 134. In particular embodiments, a particular CCC3 rule 2530 may specify which risk tokens 115m may be related, and therefore may be combined to yield information about risk. As an example and not by way of limitation, the particular CCC3 rule 2530 may specify that the second risk token 115m5 and the third risk token 115m6 are related because they are associated with sub-resources 145b of a composite resource 145, and that therefore, the combination of the second risk token 115m5 and the third risk token 115m6 may yield information about the risk associated with granting access to another sub-resource 145b of the composite resource 145. Although this disclosure describes risk tokens 115m being related by resource 145, this disclosure contemplates risk tokens 115m being related in any suitable manner, including by user 112, network 120, an action performed by user 112, or any combination thereof. For example, a particular CCC3 rule 2530 may specify that first risk token 115m4 and the second risk token 115*m*5 are related because they are associated with similar actions performed by user 112, such as for example, withdrawals from particular accounts of user 112, and that therefore, the combination of the first risk token 115*m*4 and the second risk token 115*m*5 may yield information about the risk associated with granting a withdrawal to user 112 for another account.

In particular embodiments, the particular CCC3 rule 2530 may further specify how to combine risk ratings. As an example and not by way of limitation, the particular CCC3 rule 2530 may specify that the risk rating represented by second risk token 115*m*5 and the risk rating represented by third risk token 115*m*6 should be arithmetically combined by a weighted average to produce a composite risk rating. In response, TBAC module 110 may produce a composite risk rating by computing the weighted average, indicated by the particular CCC3 rule 2530, of the risk ratings represented by second risk token 115*m*5 and third risk token 115*m*6. TBAC module 110 may then generate a composite risk token 115*m*3 that represents the composite risk rating. Although this disclosure describes combining risk ratings in a particular manner, this disclosure contemplates combining the risk ratings in any suitable manner.

In particular embodiments, TBAC module 110 may use the composite risk token 115*m*3 to facilitate the making of an access decision 900 following the process discussed with respect to FIGS. 8-10. As an example and not by way of limitation, if composite risk token 115*m*3 was computed from risk tokens 115*m* associated with different sub-resources 145*b* of a composite resource, TBAC module 110 may use composite risk token 115*m*3 to facilitate the making of an access decision 900 associated with access to another sub-resource 145*b* of the composite resource 145. As another example and not by way of limitation, if composite risk token 115*m*3 was computed from risk tokens 115*m* associated with a similar action, such as for example, a withdrawal from different accounts, TBAC module 110 may use composite risk token 115*m*3 to facilitate the making of an access decision 900 associated with the action, such as for example, a withdrawal from another account.

After making the access decision 900, TBAC module 110 may generate a decision token 115*n* that represents the access decision 900. TBAC module 110 may then communicate the decision token 115*n* to facilitate enforcement of the access decision 900. In particular embodiments, TBAC module 110 may communicate the decision token 115*n* to the resource provider 140 to facilitate enforcement of the access decision 900.

Although this disclosure describes TBAC module 110 performing certain actions with respect to FIG. 25, this disclosure contemplates the processor 132 and the memory 134 of the TBAC module 110 performing these actions. The illustration of system 100 in FIG. 25 does not specifically illustrate all of the elements from the illustration of system 100 in FIG. 1 so that particular aspects of system 100 may be emphasized. However, system 100 of FIG. 25 includes all the elements of system 100 in FIG. 1.

FIG. 26 is a flowchart illustrating a method 2600 of combining risk ratings using the system 100 of FIG. 1. TBAC module 110 may perform method 2600. As provided by FIG. 26, TBAC module 110 may begin by storing a plurality of risk tokens 115*m* in step 2610. TBAC module 110 may continue by accessing CCC3 rules 2530 in step 2620. In step 2630, TBAC module 110 may determine, based on CCC3 rules 2530, if there is a set of risk tokens 115*m* in the plurality of risk tokens 115*m* that are related according to the process described above with respect to FIG. 25. If there is not a set of related risk tokens 115*m*, TBAC module 110 may conclude.

If there is a set of related risk tokens 115*m*, TBAC module 110 may combine risk ratings. To begin, TBAC module 110 may arithmetically combine the risk ratings represented by each risk token 115*m* in the set of related risk tokens 115*m* to produce a composite risk rating in step 2640. As an example and not by way of limitation, TBAC module 110 may compute a weighted average of the risk ratings. TBAC module 110 may continue to generate a composite risk token 115*m*2 representing the composite risk rating in step 2650. In step 2660, TBAC module 110 may use the composite risk token 115*m*2 to facilitate the making of an access decision 900 following the process discussed with respect to FIGS. 8-10. TBAC module 110 may continue in step 2670 by generating a decision token 115*n* representing the access decision 900. TBAC module 110 may conclude by communicating the decision token 115*n* to facilitate enforcement of the access decision 900 in step 2680.

In particular embodiments, because system 100 may combine risk ratings, system 100 may make more robust access decisions 900. Furthermore, because TBAC module 110 uses tokens 115 to combine risk ratings, system 100 may generate an overall risk for a user 112 quicker and more efficiently.

Figure 27:
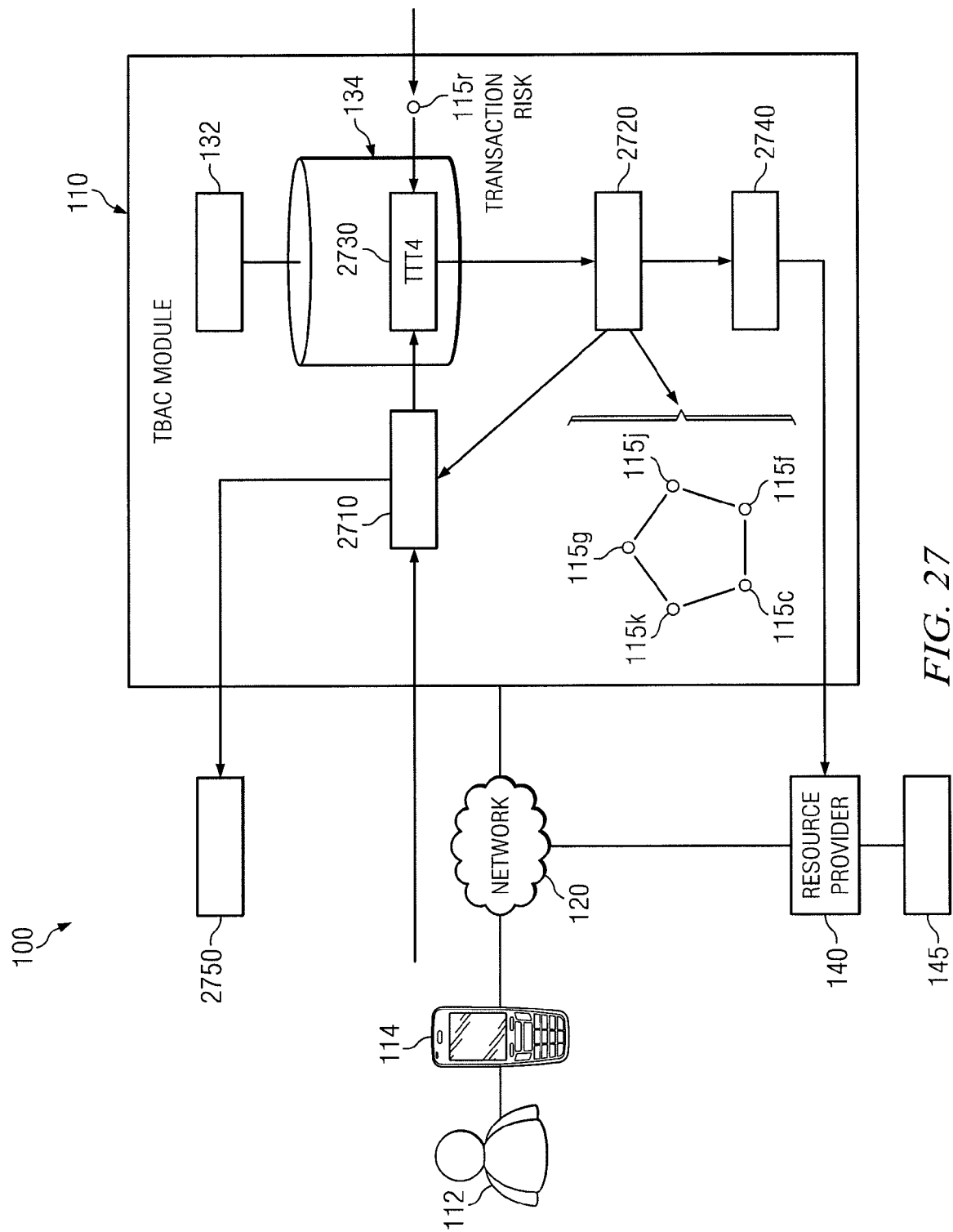
FIG. 27 illustrates the system of FIG. 1 tagging transactions.
Figure 28:
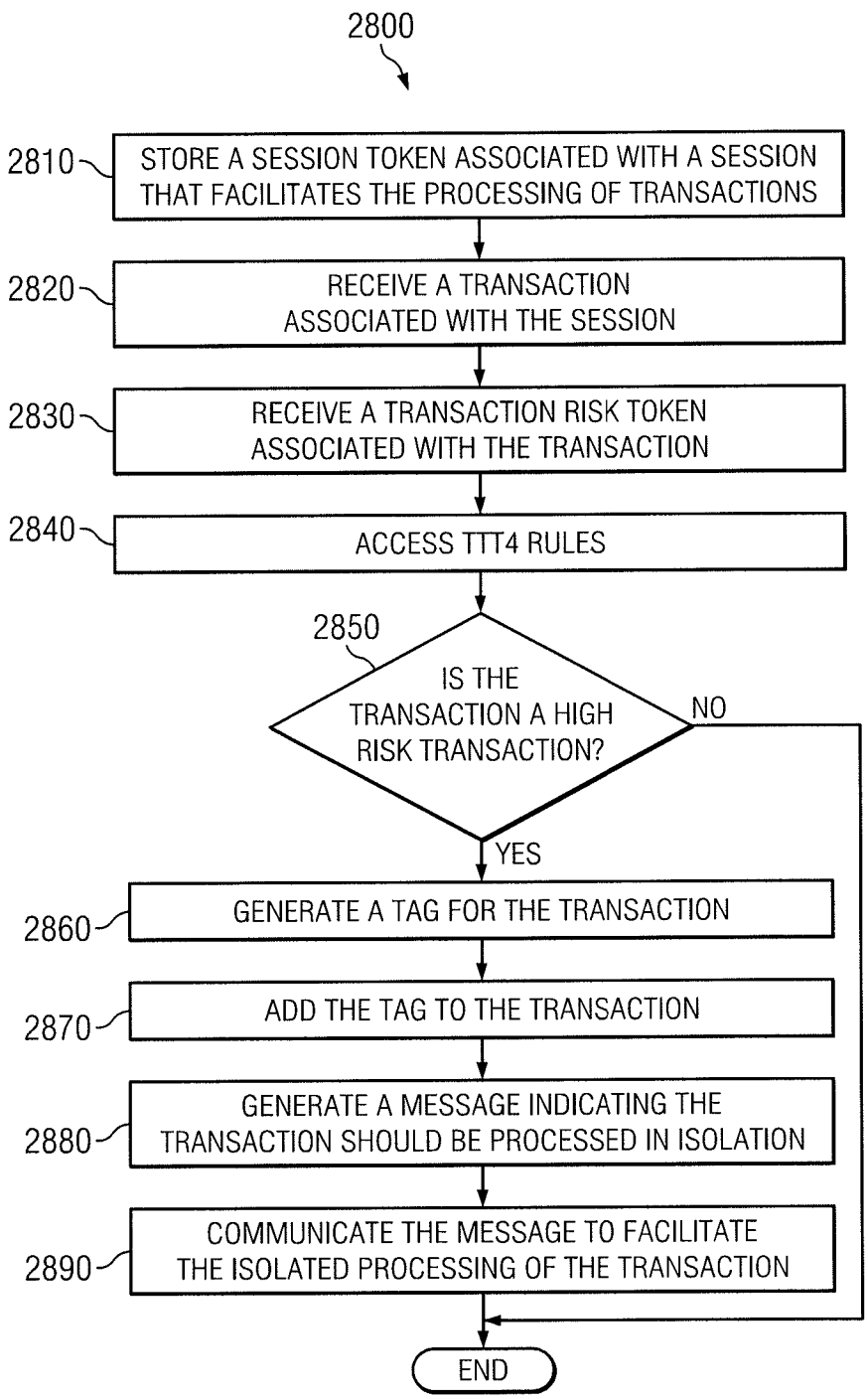
FIG. 28 is a flowchart illustrating a method of tagging transactions using the system of FIG. 1.

FIGS. 27 and 28 illustrate the system 100 tagging transactions 2710. In general, even a very trusted user 112 using a very secure network 120 and device 114 may sometimes perform a risky transaction 2710. In those situations, despite the security credentials of the user 112, it may be desirable to flag the transaction 2710 and monitor it closely. The process of determining when a transaction 2710 is risky and flagging and monitoring the transaction 2710 is referred to as transaction tagging, which is discussed further with respect to FIGS. 27 and 28.

TBAC module 110 may be monitoring a session that facilitates access by a user 112 to a resource 145 when TBAC module 110 detects the user 112 is attempting to perform a transaction 2710 that is risky. In response, TBAC module 110 may generate a tag 2720 that is added to the transaction 2710 and/or the tokens 115 associated with user 112. TBAC module 110 may further generate a message 2740 that indicates the transaction should be processed in isolation.

FIG. 27 illustrates the system 100 of FIG. 1 tagging transactions 2710. As provided in FIG. 27, TBAC module 110 may store a hard token 115*g*, a subject token 115*k*, a resource token 115*c*, a network token 115*f*, a session token 115*j*, and others as appropriate. Session token 115*j* may be associated with a session. In particular embodiments, the session may facilitate the processing of a transaction 2710. The transaction may represent an action taken by a user 112 against a resource 145. As an example and not by way of limitation, transaction 2710 may be a transfer of money from a domestic bank account to a foreign bank account. In particular embodiments, user 112 may attempt to perform the transaction 2710. As a result, TBAC module 110 may receive a transaction risk token 115*r* associated with the transaction 2710. Transaction risk token 115*r* may indicate a risk associated with processing the transaction 2710. As an example and not by way of limitation, if transaction 2710 represents an attempt to transfer money from a domestic bank account to a foreign bank account, transaction risk token 115*r* may indicate that transaction 2710 is a high risk transaction because of the potential for money laundering or tax evasion.

TBAC module 110 may use transaction 2710 and transaction risk token 115*r* to access transaction tagging (TTT4) rules 2730 stored in memory 134. In particular embodiments, TTT4 rules 2730 may specify when a transaction 2710 may be classified as a high risk transaction based on transaction risk token 115r. TBAC module 110 may use TTT4 rules 2730 to determine if a particular transaction 2710 is a high risk transaction. If the particular transaction 2710 is a high risk transaction, TBAC module 110 may initiate the transaction tagging process.

In particular embodiments, TBAC module 110 may initiate the transaction tagging process by generating a tag 2720. Tag 2720 may be added to transaction 2710 to indicate that the transaction 2710 is a high risk transaction. As an example and not by way of limitation, tag 2720 may be a ciphered value added to the syntax of the transaction 2710. Tag 2720 may also be added to a subject token 115k associated with user 112 or a resource token 115c associated with resource 145. In particular embodiments, tag 2720 may facilitate tracing of the transaction 2710. As an example and not by way of limitation, after tag 2720 has been added to transaction 2710, tag 2720 may act as a unique flag that identifies transaction 2710 wherever it may be processed. By following where tag 2720 appears, transaction 2710 may be traced at each step of its processing. By tracing the transaction 2710, it may be possible to remember and even recreate the steps taken to process transaction 2710. In particular embodiments, system 100 may further log the transaction 2710 in a database as it is being traced during processing.

In particular embodiments, if transaction 2710 is tagged as a high risk transaction, TBAC module 110 may generate a message 2740 that indicates that transaction 2710 should be processed in isolation. By isolating transaction 2710 as it is processed, it may be easier to trace transaction 2710 as it is processed. Message 2740 may indicate a processing unit 2750 that is isolated and capable of processing transaction 2710. As an example and not by way of limitation, message 2740 may indicate the location of an isolated server to which transaction 2710 may be sent for isolated processing. In particular embodiments, TBAC module 110 may communicate message 2740 to resource provider 140 to facilitate the transfer of transaction 2710 to an isolated processing unit 2750.

Although this disclosure describes TBAC module 110 performing certain actions with respect to FIG. 27, this disclosure contemplates the processor 132 and the memory 134 of the TBAC module 110 performing these actions. The illustration of system 100 in FIG. 27 does not specifically illustrate all of the elements from the illustration of system 100 in FIG. 1 so that particular aspects of system 100 may be emphasized. However, system 100 of FIG. 27 includes all the elements of system 100 in FIG. 1.

FIG. 28 is a flowchart illustrating a method 2800 of tagging transactions 2710 using the system 100 of FIG. 1. TBAC module 110 may perform method 2800. As provided by FIG. 28, TBAC module 110 may begin by storing a session token 115j associated with a session that facilitates the processing of transactions 2710 in step 2810. In step 2820, TBAC module 110 may receive a transaction 2710 associated with the session. TBAC module 110 may continue by receiving a transaction risk token 115r associated with the transaction 2710 in step 2830. TBAC module 110 may continue by accessing TTT4 rules 2730 in step 2840. In step 2850, TBAC module 110 may determine, based on TTT4 rules 2730, if the transaction 2710 is a high risk transaction. If the transaction is not a high risk transaction, TBAC module 110 may conclude.

If the transaction 2710 is a high risk transaction, TBAC module 110 may initiate the transaction tagging process. To begin, TBAC module 110 may generate a tag 2720 for the transaction 2710 in step 2860. TBAC module 110 may continue by adding the tag 2720 to the transaction 2710 in step 2870. In particular embodiments, the tag 2720 may facilitate the tracing of the transaction 2710 as it is processed. In step 2880 TBAC module 110 may generate a message 2740 indicating the transaction 2710 should be processed in isolation. TBAC module 110 may conclude by communicating the message 2740 to facilitate the isolated processing of the transaction 270 in step 2890.

In particular embodiments, because system 100 may tag transactions 2710, system 100 may provide a more robust security system. Furthermore, because TBAC module 110 may use tokens 115 to tag transactions 2710, system 100 may securely process transactions 2710 quicker and more efficiently.

Figure 29:
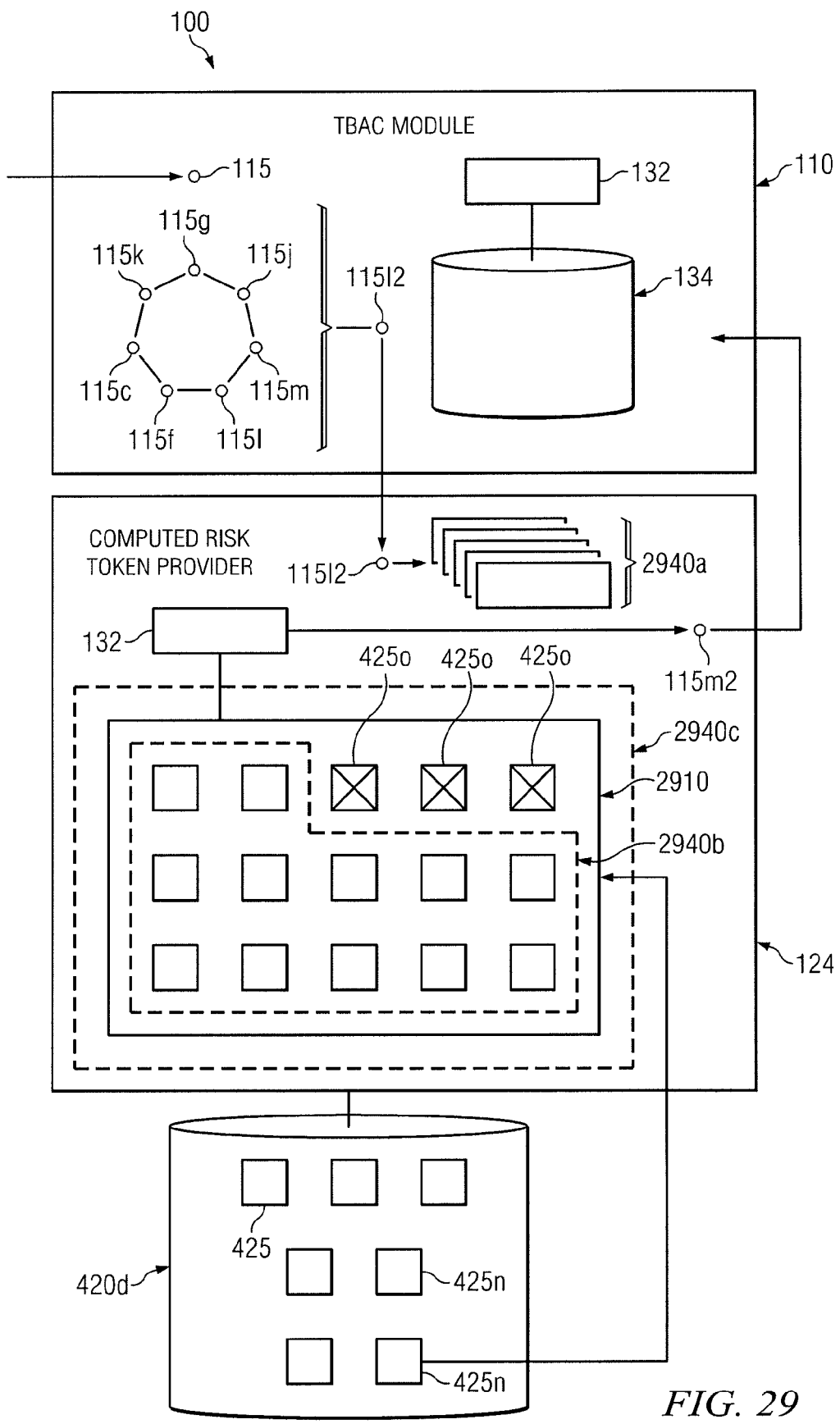
FIG. 29 illustrates the system of FIG. 1 performing context caching.
Figure 30:
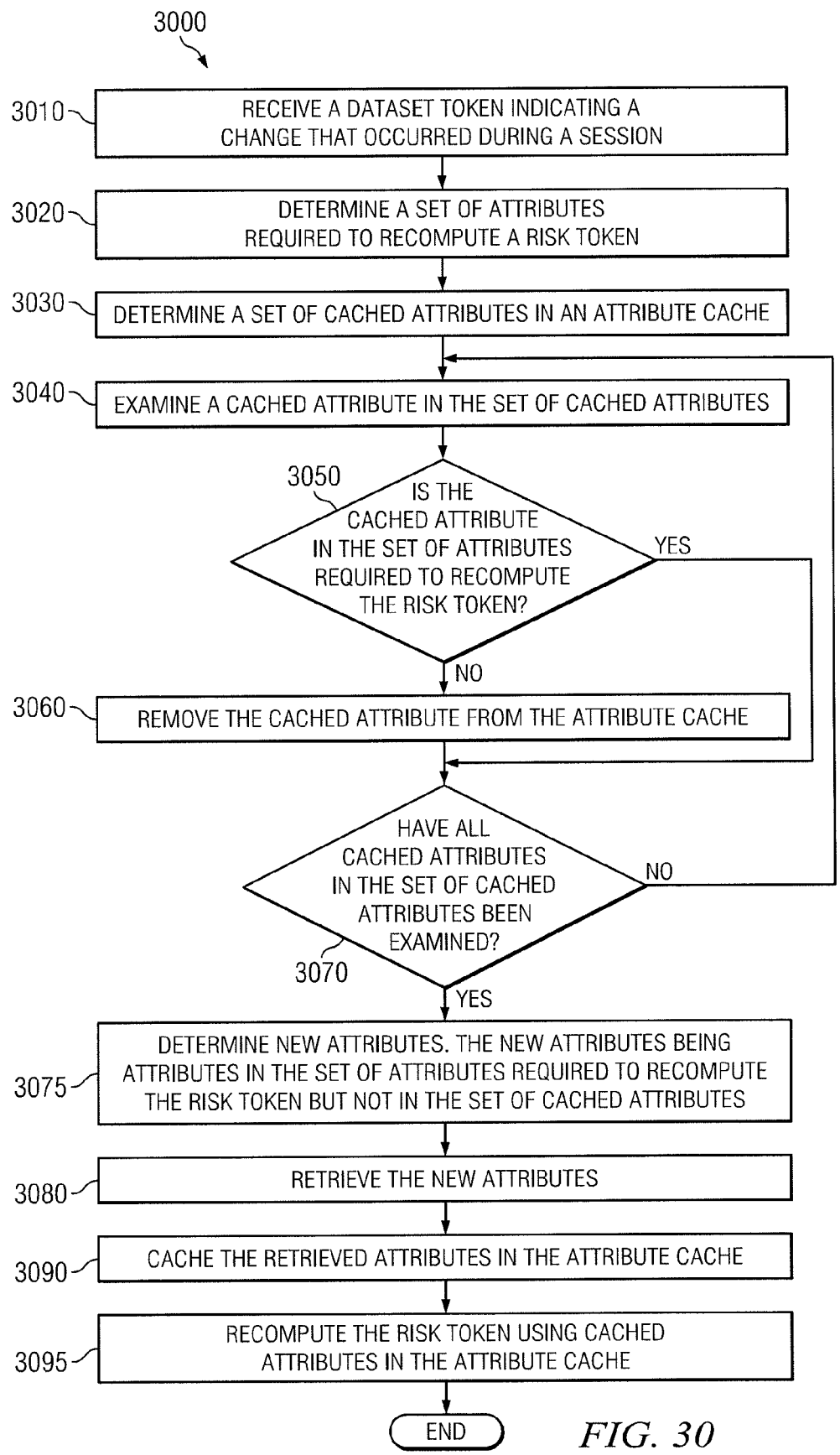
FIG. 30 is a flowchart illustrating a method of performing context caching using the system of FIG. 1.

FIGS. 29 and 30 illustrate the system 100 performing context caching. In general, a token provider may retrieve attributes 425 from a corresponding repository 420a-d and cache those attributes 425 in an attribute cache 2910. If the cache 2910 fills up, subsequently retrieved attributes 425 will need to replace old attributes 425o in the cache. The process of determining which attributes 425 are old and replacing the old attributes 425o with new attributes 425n is referred to as context caching, which is discussed further with respect to FIGS. 29 and 30.

Computed risk token provider 124 may contain an attribute cache 2910. Each time the computed risk token provider 124 computes a risk token 115m, it may retrieve attributes 425 from the risk repository 420d, and cache those attributes 425 in the attribute cache 2910. To avoid filling up the attribute cache 2910, the computed risk token provider 124 may determine, based on a received dataset token 115l, which cached attributes 425 are old and remove them from the attribute cache 2910. Although this disclosure describes context caching using the computed risk token provider 124, this disclosure contemplates context caching taking place in any suitable token provider.

FIG. 29 illustrates the system 100 of FIG. 1 performing context caching. As provided by FIG. 29, TBAC module 110 may be requesting computed risk token provider 124 to compute or recompute a risk token 115m. As an example and not by way of limitation, TBAC module 110 may be performing the real-time risk updating function discussed with respect to FIGS. 23 and 24. Although this disclosure describes TBAC module 110 performing a specific function involving the computed risk token provider 124, this disclosure contemplates TBAC module 110 performing any suitable function that involves computed risk token provider 124. As discussed with respect to FIGS. 23 and 24, TBAC module 110 may receive a token 115 that indicates a change that occurred during a session. TBAC module 110 may generate a new dataset token 115/2 and communicate the new dataset token 115/2 to the computed risk token provider 124. The new dataset token 115/2 may indicate a risk token 115m should be computed or recomputed.

In particular embodiments, computed risk token provider 124 may include an attribute cache 2910. Attribute cache 2910 may cache attributes 425 used in previous computations of a risk token 115m. Cached attributes 2940c may be used during subsequent computations of risk token 115m so that computed risk token provider 124 does not have to retrieve the cached attributes 2940c from a risk repository 420d. When computed risk token provider 124 computes a risk token 115m, computed risk token provider 124 may update attribute cache 2910 by removing old attributes 425o from and by adding new attributes 425n to attribute cache 2910.

To determine the old attributes 425o in attribute cache 2910, computed risk token provider 124 may examine a token 115 received from TBAC module 110. As an example and not by way of limitation, computed risk token provider 124 may receive a new dataset token 115/2 from TBAC module 110. New dataset token 115/2 may indicate a set of attributes 2940a required to compute or recompute a risk token 115m. New dataset token 115/2 may further include instructions on how to compute or recompute risk token 115m that may facilitate the updating of attribute cache 2910. Based on the indicated set of attributes 2940a and the instructions, computed risk token provider 124 may determine which cached attributes 2940c are not used in computing or recomputing the risk tokens 115m. Computed risk token provider 124 may then mark these attributes 425 as old. In particular embodiments, computed risk token provider 124 may consider old attributes 425o as forming an obsolete portion of the attribute cache 2910 and may remove the old attributes 425o from the attribute cache 210. In this manner, computed risk token provider 124 may ensure that attribute cache 2910 contains only attributes 425 that are in the set of attributes 2940a required to compute or recompute risk token 115m.

Computed risk token provider 124 may add new attributes 425n by retrieving them from risk repository 420d and adding them to attribute cache 2910. Computed risk token provider 124 may determine which attributes 425 to retrieve from risk repository 420d by examining the set of attributes 2940a required to compute or recompute risk token 115m and the set of attributes 2940b cached within attribute cache 2910 after the old attributes 425o have been removed. By examining the set of attributes 2940a and the set of attributes 2940b, computed risk token provider 124 may determine that attributes 425 that are in the set of attributes 2940a but not in the set of attributes 2940b. These determined attributes 425 are the new attributes 425n.

Computed risk token provider 124 may then retrieve the new attributes 425n from risk repository 420d and add the new attributes 425n to attribute cache 2910. In particular embodiments, computed risk token provider 124 may then use the attributes 425 cached within attribute cache 2910 to compute or recompute risk token 115m. As an example and not by way of limitation, computed risk token provider 124 may use the attributes 425 cached within attribute cache 2910 to generate a recomputed risk token 115m2 and communicate the recomputed risk token 115m2 to TBAC module 110.

Although this disclosure describes TBAC module 110 and computed risk token provider 124 performing certain actions with respect to FIG. 29, this disclosure contemplates the processor 132 and the memory 134 of the TBAC module 110 and the processor 132 of the computed risk token provider 124 performing these actions. The illustration of system 100 in FIG. 29 does not specifically illustrate all of the elements from the illustration of system 100 in FIG. 1 so that particular aspects of system 100 may be emphasized. However, system 100 of FIG. 29 includes all the elements of system 100 in FIG. 1.

FIG. 30 is a flowchart illustrating a method 3000 of performing context caching using the system 100 of FIG. 1. In particular embodiments, computed risk token provider 124 may perform TBAC module 110. As provided in FIG. 30, computed risk token provider 124 may begin by receiving a dataset token 115l indicating a change that occurred during a session in step 3010. Computed risk token provider 124 may continue by determining a set of attributes 2940a required to recompute a risk token 115m in step 3020. In step 3030, computed risk token provider 124 may determine a set of cached attributes 2940c in an attribute cache 2910.

To free up space in the attribute cache 2910, the old attributes 425o in the set of cached attributes 2940c may be removed. To do so, computed risk token provider 124 may continue by examining a cached attribute 425 in the set of cached attributes 2940c in step 3040. In step 3050, computed risk token provider 124 may determine if the cached attribute 425 is in the set of attributes 2940a required to recompute the risk token 115m. If the cached attribute 425 is in the set of attributes 2940a, then computed risk token provider 124 may leave the cached attribute 425 in the attribute cache 2910. If the cached attribute 425 is not in the set of attributes 2940a, computed risk token provider 124 may remove the cached attribute 425 from the attribute cache 2910 in step 3060.

Computed risk token provider 124 may then continue to step 3070 to determine if all cached attributes 425 in the set of cached attributes 2940c have been examined. If not, computed risk token provider 124 may return to step 3040 to examine another cached attribute 425. If all cached attributes 425 have been examined, computed risk token provider 124 may be sure that attribute cache 2910 contains only the set of attributes 2940b.

Before recomputing a risk token 115m, computed risk token provider 124 may retrieve the new attributes 425n from the risk repository 420d. To accomplish this, computed risk token provider 124 may determine the new attributes 425n by examining the set of attributes 2940a required to recompute the risk token 115m and the set of cached attributes 2940b in step 3075. The new attributes 425n will be the attributes in the set of attributes 2940a but not in the set of cached attributes 2940b. Computed risk token provider 124 may continue to step 3080 by retrieving the new attributes 425n. In step 3090, computed risk token provider 124 may cache the retrieved attributes 425n in the attribute cache 2910. Computed risk token provider 124 may then conclude by recomputing the risk token 115m using cached attributes 425 in the attribute cache 2910 in step 3095.

In particular embodiments, because system 100 may perform context caching, system 100 may provide more efficient caching of attributes 425. Furthermore, because system 100 uses tokens 115 to perform context caching, system 100 may make faster determinations regarding which attributes 425 to remove from the attribute cache 2910.

Figure 31:
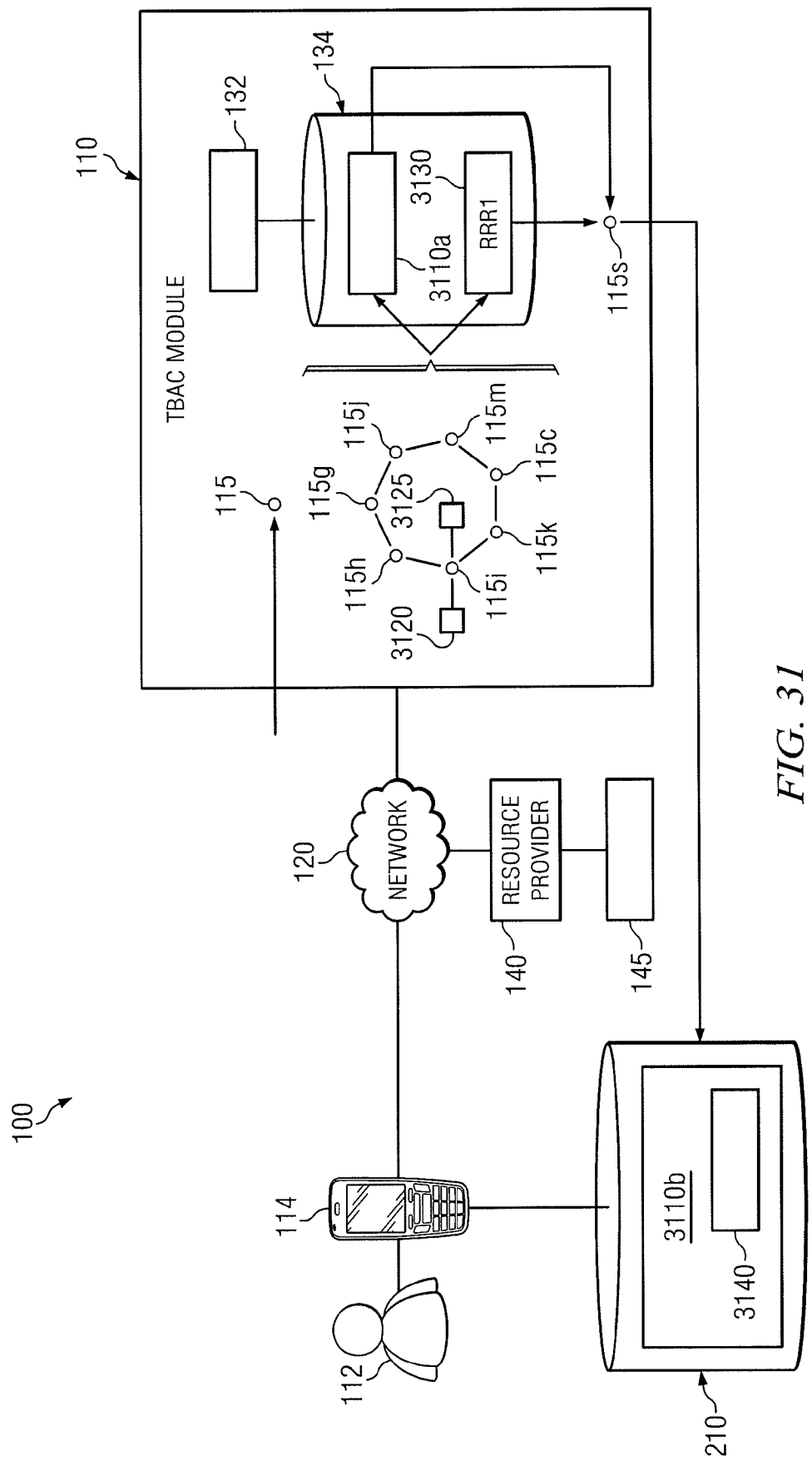
FIG. 31 illustrates the system of FIG. 1 performing virtual machine recycling.
Figure 32:
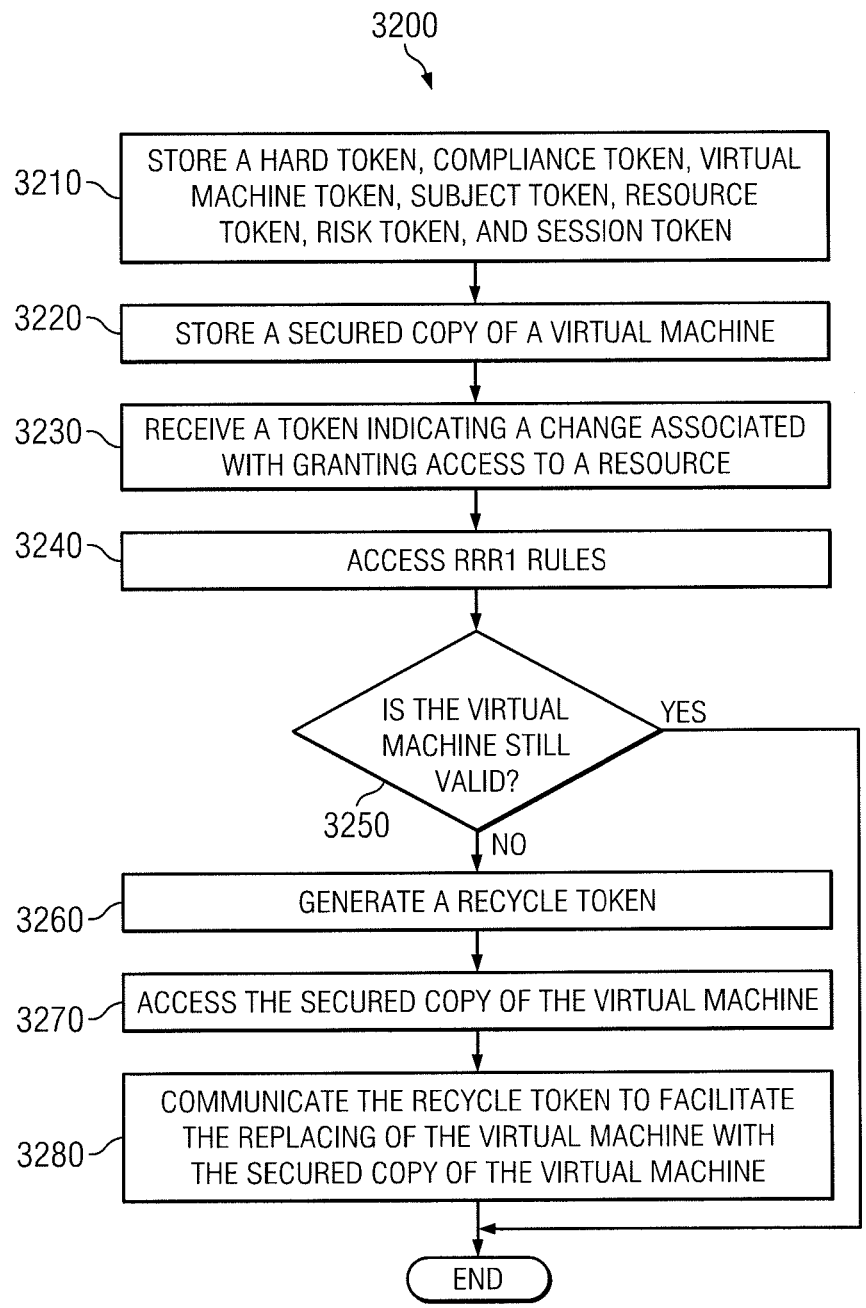
FIG. 32 is a flowchart illustrating a method of performing virtual machine recycling.

FIGS. 31 and 32 illustrate the system 100 recycling a virtual machine 3110b. In general, user 112 may consume a resource 145 through a virtual machine 3110b provisioned to device 114. Over time, virtual machine 3110b may need to be recycled, sometimes frequently. System 100 may determine when a particular virtual machine 3110b needs to be recycled and recycle the virtual machine 3110b accordingly. This recycling process is discussed further with respect to FIGS. 31 and 32.

TBAC module 110 may monitor virtual machine 3110b through a timestamp 3120 and a time threshold 3125. When TBAC module 110 determines, based on the timestamp 3120 and the time threshold 3125, that the virtual machine 3110b is stale, TBAC module 110 may generate a recycle token to facilitate the recycling of the virtual machine 3110b.

FIG. 31 illustrates the system 100 of FIG. 1 performing virtual machine recycling. As provided by FIG. 31, device 114 may have been provisioned with container 210. Container 210 may include a virtual machine 3110b executing a process 3140. Virtual machine 3110b may be executing process 3140 on device 114. TBAC module 110 may store a hard token 115g, a compliance token 115h, a VM token 115i, a subject token 115k, a resource token 115c, a risk token 115m, and a session token 115j, among others as appropriate. The VM token 115i may represent information associated with virtual machine 3110b. In particular embodiments, VM token 115i may include a timestamp 3120 associated with virtual machine 3110b and a time threshold 3125 associated with virtual machine 3110b. Timestamp 3120 may indicate the time at which virtual machine 3110*b* was established. Time threshold 3125 may indicate an amount of time after which virtual machine 3110*b* should be recycled. TBAC module 110 may use timestamp 3120 and time threshold 3125 to determine a time after which the virtual machine 3110*b* should be recycled. As an example and not by way of limitation, TBAC module 110 may add the time threshold 3125 to the timestamp 3120 to determine that time.

In particular embodiments, recycling virtual machine 3110*b* may include replacing virtual machine 3110*b* with a secured copy 3110*a* of virtual machine 3110*b*. Secured copy 3110*a* may have been generated and stored when virtual machine 3110*b* was established. Secured copy 3110*a* may be stored within memory 134. Although this disclosure describes secured copy 3110*a* being stored in TBAC module 110, this disclosure contemplates secured copy 3110*a* being stored in any suitable component.

TBAC module 110 may receive a token 115 that indicates a change associated with granting access to a resource 145. As an example and not by way of limitation, token 115 may indicate user 112 is requesting access to resource 145. Prior to granting access to resource 145, TBAC module 110 may determine if device 114 has been provisioned a valid virtual machine 3110*b*. If the virtual machine 3110*b* is valid, access to the resource 145 may be granted. As another example and not by way of limitation, token 115 may be a hard token 115*g* associated with device 114 indicating the virtual machine 3110*b* may be invalid. Although this disclosure describes token 115 indicating particular changes, this disclosure contemplates token 115 indicating any suitable change. This change could include any suitable communication, process, token, etc in the system 100. In response to receiving token 115, TBAC module 110 may determine if the virtual machine 3110*b* is invalid.

To make the determination whether the virtual machine 3110*b* is valid, TBAC module 110 may use token 115 and VM token 115*i* to access VM recycling (RRR1) rules 3130. In particular embodiments, TBAC module 110 may apply RRR1 rules 3130 to determine if virtual machine 3110*b* is valid based on timestamp 3120 and time threshold 3125. As an example and not by way of limitation, RRR1 rules 3130 may specify that if the current time exceeds the time threshold 3125 added to timestamp 3120, then TBAC module 110 may determine that virtual machine 3110*b* is invalid. Although this disclosure describes TBAC module 110 determining the validity of VM 3110*b* in a particular manner, this disclosure contemplates TBAC module 110 determining the validity of virtual machine 3110*b* in any suitable manner. For example, TBAC module 110 may examine the status of a flag associated with virtual machine 3110*b*. The flag may be turned on when virtual machine 3110*b* becomes invalid. If TBAC module detects that the flag is on, TBAC module 110 may initiate the recycling process.

In response to a determination that the virtual machine 3110*b* is invalid, TBAC module 110 may initiate the virtual machine recycling process by generating a recycle token 115*s*. In particular embodiments, recycle token 115*s* may include instructions to recycle virtual machine 3110*b* and information associated with the secured copy 3110*a* of virtual machine 3110*b*. TBAC module 110 may communicate recycle token 115*s* to facilitate the recycling of virtual machine 3110*b*.

After recycle token 115*s* has been communicated, virtual machine 3110*b* may begin recycling. In particular embodiments, virtual machine 3110*b* may be executing process 3140 when recycling is initiated. TBAC module 110 may wait for virtual machine 3110*b* to finish executing process 3140 before recycling. In some embodiments, rather than wait for process 3140 to finish, TBAC module 110 may facilitate the secure storage of a copy of the process 3140. After the virtual machine 3110*b* finishes recycling, TBAC module 110 may facilitate the recovery of the secured copy of the process 3140, and the recycled virtual machine 3110*b* may complete the process 3140.

To recycle virtual machine 3110*b*, virtual machine 3110*b* may be replaced with the secured copy 3110*a* of virtual machine 3110*b*. TBAC module 110 may send information about the location of the secured copy 3110*a* of virtual machine 3110*b* using recycle token 115*s*. Device 114 may download the secured copy 3110*a* of virtual machine 3110*b* from that location. After virtual machine 3110*b* has been recycled, timestamp 3120 and time threshold 3125 may be updated to reflect the recycling.

Although this disclosure describes TBAC module 110 performing certain actions with respect to FIG. 31, this disclosure contemplates the processor 132 and the memory 134 of the TBAC module 110 performing these actions. The illustration of system 100 in FIG. 31 does not specifically illustrate all of the elements from the illustration of system 100 in FIG. 1 so that particular aspects of system 100 may be emphasized. However, system 100 of FIG. 31 includes all the elements of system 100 in FIG. 1.

FIG. 32 is a flowchart illustrating a method 3200 of performing virtual machine recycling. TBAC module 110 may perform method 3200. As provided by FIG. 32, TBAC module 110 may begin by storing a hard token 115*g*, compliance token 115*h*, VM token 115*i*, subject token 115*k*, resource token 115*c*, risk token 115*m*, and session token 115*j*, among others as appropriate in step 3210. In particular embodiments, VM token 115*i* may be associated with a virtual machine 3110*b*. Virtual machine 3110*b* may be associated with a timestamp 3120 and a time threshold 3125. TBAC module 110 may continue by storing a secured copy 3110*a* of virtual machine 3110*b* in step 3220. At step 3230, TBAC module 110 may receive a token 115 indicating a change associated with granting access to a resource 145. As an example and not by way of limitation, token 115 may indicate that a user 112 is attempting to access resource 145.

In response, TBAC module 110 may access VM recycling (RRR1) rules 3130 in step 3240. In step 3250, TBAC module 110 may determine, based on RRR1 rules 3130, if the virtual machine 3110*b* is still valid. If the virtual machine 3110*b* is still valid, TBAC module 110 may conclude. If the virtual machine 3110*b* is not valid, TBAC module 110 may generate a recycle token 115*s* in step 3260. In particular embodiments, recycle token 115*s* may include the location of the secured copy 3110*a* of the virtual machine 3110*b*. TBAC module 110 may also access the secured copy 3110*a* of the virtual machine 3110*b* in step 3270. TBAC module 110 may conclude by communicating the recycle token 115*s* to facilitate the replacing of the virtual machine 3110*b* with the secured copy 3110*a* of the virtual machine 3110*b* in step 3280.

In particular embodiments, because system 100 may facilitate the recycling of virtual machine 3110*b*, system 100 may provide a faster and more seamless user experience to user 112. Furthermore, because TBAC module 110 uses tokens 115 to monitor virtual machine 3110*b*, system 100 may determine more quickly when a virtual machine 3110*b* needs to be recycled.

Figure 33:
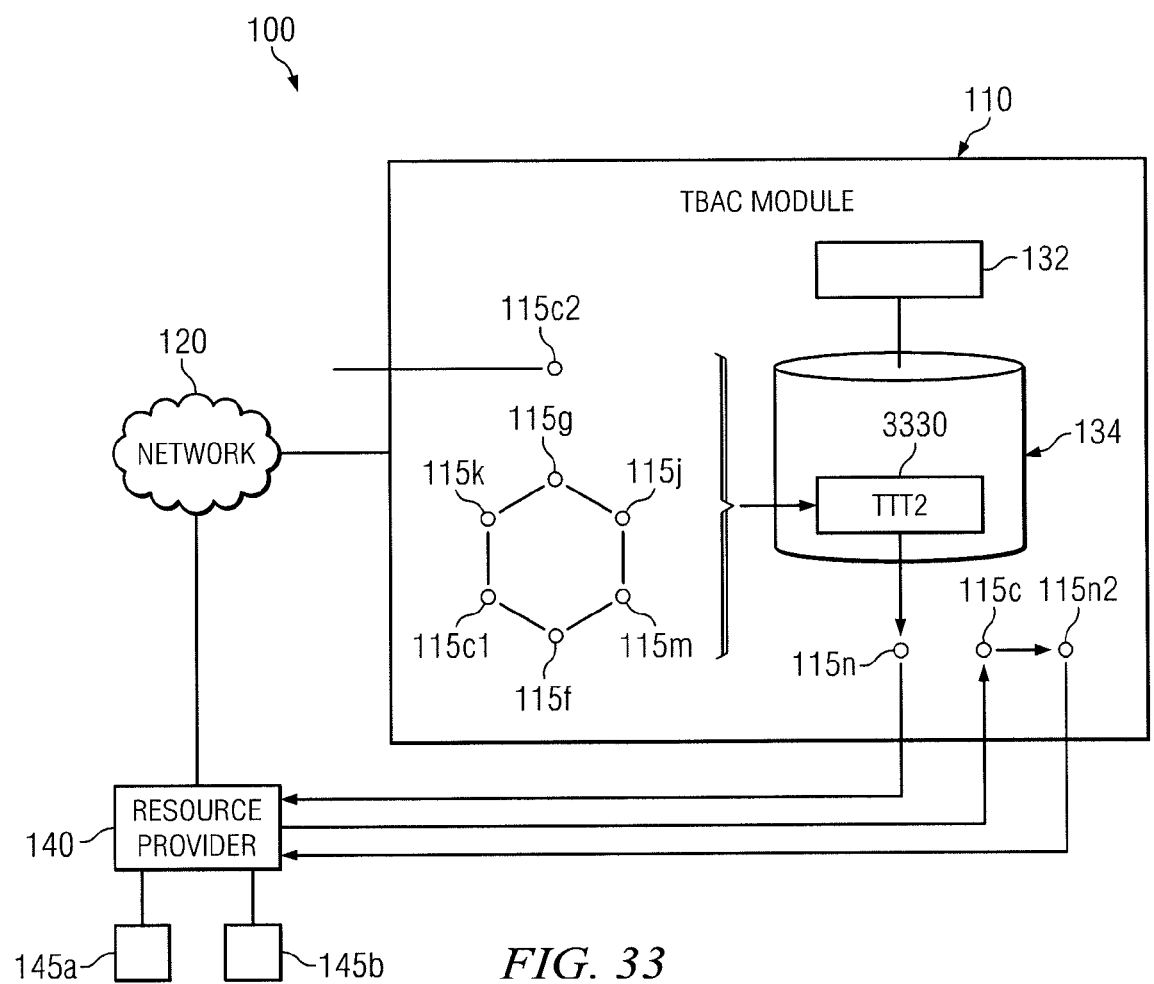
FIG. 33 illustrates the system of FIG. 1 performing token termination.
Figure 34:
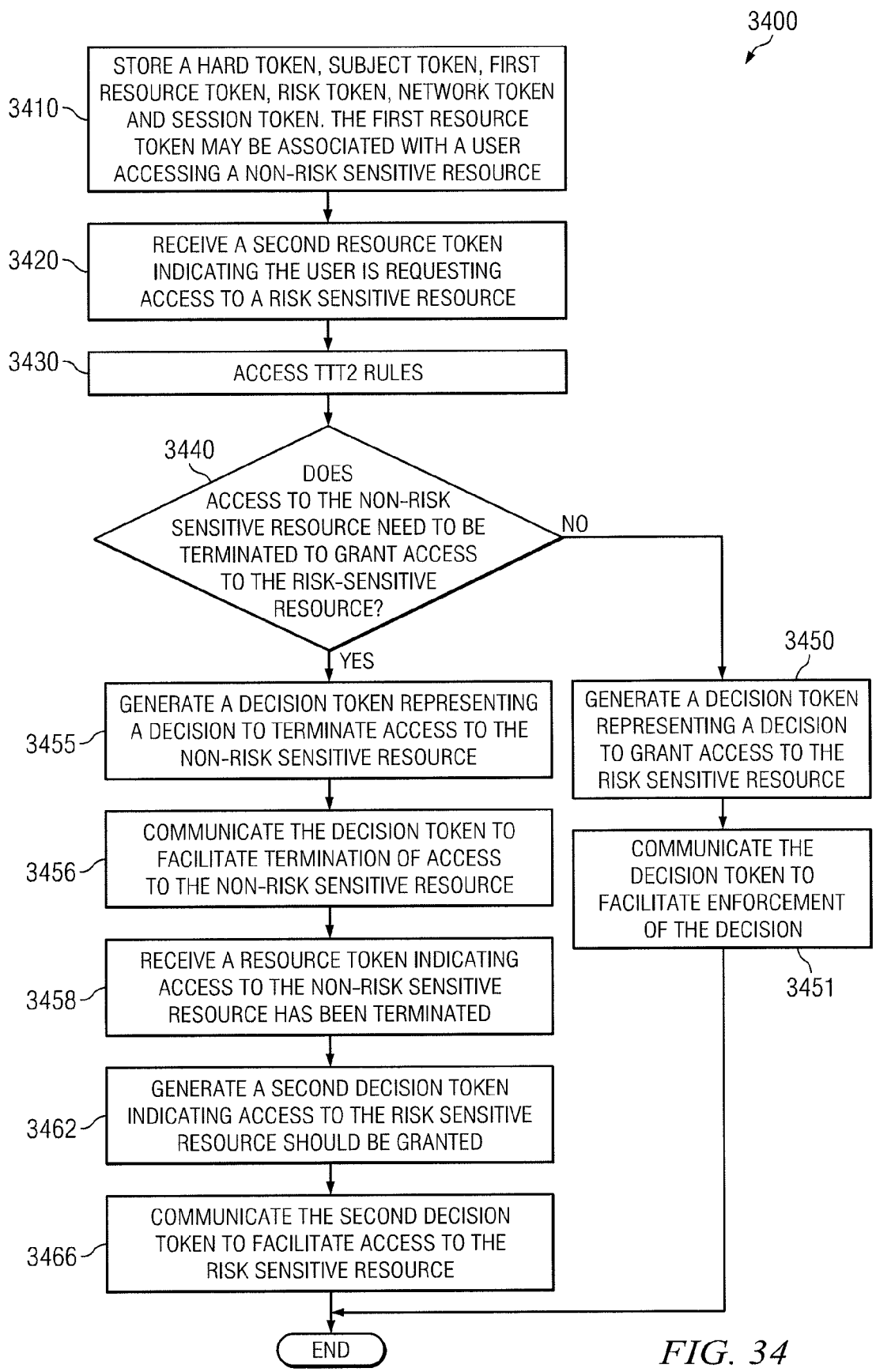
FIG. 34 is a flowchart illustrating a method of performing token termination using the system of FIG. 1.

FIGS. 33 and 34 illustrate the system 100 performing token termination. In general, a user 112 may perform some action that will block access to a resource 145. For example, accessing a resource 145 that contains numerous security holes may block access to another resource 145 that is sensitive to risk.

The process of determining whether access to a resource 145 should be blocked and enforcing that determination is known as token termination, which is discussed further with respect to FIGS. 33 and 34.

TBAC module 110 may track which resources 145 are non risk sensitive resources 145a and which are risk sensitive resources 145b. If a user 112 requests access to a risk sensitive resource 145b while the user 112 is exposing security risks, TBAC module 110 may perform token termination to block user 112 from accessing the risk sensitive resource 145b until the security risks are remedied.

FIG. 33 illustrates the system 100 of FIG. 1 performing token termination. As provided by FIG. 33, TBAC module 110 may store a hard token 115g, subject token 115k, first resource token 115c1, network token 115f, risk token 115m, and session token 115j, among others as appropriate. First resource token 115c1 may be associated with a user 112 accessing a non-risk sensitive resource 145a. In particular embodiments, TBAC module 110 may receive a token 115 indicating a change associated with accessing a resource 145. As an example and not by way of limitation, the token 115 may be a second resource token 115c2 indicating that the user 112 is requesting access to a risk sensitive resource 145b. In particular embodiments, simultaneous access to non-risk sensitive resource 145a and risk sensitive resource 145b may not be allowed for security purposes. As an example and not by way of limitation, non-risk sensitive resource 145a may be a chat session and risk sensitive resource 145b may be a personal banking application. The chat session may contain security holes that leave the personal banking application vulnerable to potential hacks and malware. Therefore, it may not be desirable to grant simultaneous access to the chat session and the personal banking application.

When TBAC module 110 receives second resource token 115c2 indicating that a user 112 is requesting access to the risk sensitive resource 145b, TBAC module 110 may access token termination (TTT2) rules 3330 stored in memory 134 to determine if access to the non-risk sensitive resource 145a should be terminated prior to granting access to the risk sensitive resource 145b. In particular embodiments, a particular TTT2 rule 3330 may specify that accessing a non-risk sensitive resource 145a represented by first resource token 115c1 may pose a security risk if access to risk sensitive resource 145b was granted simultaneously. In this case, TBAC module 110 may determine, based on TTT2 Rules 3330, that access to the non-risk sensitive resource 145a should be terminated before granting access to risk sensitive resource 145b represented by second resource token 115c2.

TBAC module 110 may generate a decision token 115n representing the determination to terminate access to the non-risk sensitive resource 145a. TBAC module 110 may communicate the decision token 115n to facilitate the termination of access to the non-risk sensitive resource. In particular embodiments, after access to the non-risk sensitive resource 145a has been terminated, TBAC module 110 may receive a resource token 115c indicating that access to the non-risk sensitive resource has been terminated. In response, TBAC module 110 may generate a second decision token 115n2 indicating that access to the risk sensitive resource 145b should be granted. In particular embodiments, TBAC module 110 may also terminate the first resource token 115c1 in response to receiving the resource token 115c. TBAC module 110 may communicate the second decision token to facilitate the granting of access to the risk sensitive resource 145b. In particular embodiments, the second decision token 115n2 may be communicated to resource provider 140, which may grant access to the risk sensitive resource 145b after receiving the second decision token 115n2.

In particular embodiments, user 112 may be presented with the option to terminate access to the non-risk sensitive resource 145a. If the user 112 chooses not to terminate access to the non-risk sensitive resource 145a, the user 112 may be blocked from accessing the risk sensitive resource 145b.

In particular embodiments, user 112 may expose security risks through other means than by accessing a non-risk sensitive resource 145a. For example, user 112 may attach a peripheral device, such as a USB drive, to device 114. The peripheral device may present security risks. In that case, TBAC module 110 may receive a hard token 115g indicating that device 114 has a peripheral device attached. When user 112 requests access to risk sensitive resource 145b, TBAC module 110 may perform token termination to block access to the risk sensitive resource 145b until user 112 removes the peripheral device. In particular embodiments, user 112 may attach the peripheral device while user 112 is accessing the risk sensitive resource 145b. In that case, TBAC module 110 may detect the hard token 115g and in response, perform token termination to terminate access to the risk sensitive resource 145b until user 112 removes the peripheral device. After user 112 removes the peripheral device, TBAC module 110 may receive a second hard token 115g indicating that the peripheral device has been removed. TBAC module 110 may then generate a decision token 115n to facilitate access to the risk sensitive resource 145b.

Although this disclosure describes TBAC module 110 performing certain actions with respect to FIG. 33, this disclosure contemplates the processor 132 and the memory 134 of the TBAC module 110 performing these actions. The illustration of system 100 in FIG. 33 does not specifically illustrate all of the elements from the illustration of system 100 in FIG. 1 so that particular aspects of system 100 may be emphasized. However, system 100 of FIG. 33 includes all the elements of system 100 in FIG. 1. Although this disclosure describes particular user actions creating a security hole, there could be any number of different ways that a user's action, a resource parameter, a network condition, or any other characteristic of system 100 could create a security hole that needs to be addressed before a user may be granted access to a risk sensitive resource. This disclosure contemplates any of those potential security holes.

FIG. 34 is a flowchart illustrating a method 3400 of performing token termination. TBAC module 110 may perform the method 3400. As provided by FIG. 34, TBAC module 110 may begin by storing a hard token 115b, subject token 115k, first resource token 115c1, risk token 115m, network token 115f, and session token 115j, among others as appropriate in step 3410. The first resource token 115c1 may be associated with a user 112 accessing a non-risk sensitive resource 145a. TBAC module 110 may continue by receiving a second resource token 115c2 indicating the user 112 is requesting access to a risk sensitive resource 145b in step 3420. In response, TBAC module 110 may access TTT2 rules 3330 in step 3430. In step 3440, TBAC module 110 may determine, based on TTT2 rules 3330, if access to the non-risk sensitive resource 145a should be terminated before granting access to the risk sensitive resource 145b. If access to the non-risk sensitive resource need not be terminated, TBAC module 110 may continue to step 3450 to generate a decision token 115n representing a decision to grant access to the risk sensitive resource 145b. TBAC module 110 may then communicate the decision token 115n to facilitate enforcement of that decision in step 3451.

If access to the non-risk sensitive resource should to be terminated, then TBAC module 110 may generate a decision token 115n representing the decision to terminate access to the non-risk sensitive resource 145a in step 3455. TBAC module 110 may then communicate the decision token 115n to facilitate the termination of access to the non-risk sensitive resource 145a in step 3456. After access to the non-risk sensitive resource 145a has been terminated, TBAC module 110 may receive a resource token 115c indicating that access has been terminated in step 3458. In response to receiving the resource token 115c, TBAC module 110 may generate a second decision token 115n2 indicating access to the risk sensitive resource 145b should be granted in step 3462. TBAC module 110 may then communicate the second decision token 115n2 to facilitate access to the risk sensitive resource 145b in step 3466.

In particular embodiments, because system 100 may perform token termination, system 100 may provide a more robust security system that provides for blocking access based on the risk sensitivity of the resources. Furthermore, because TBAC module 110 may terminate tokens 115, system 100 may provide a faster and more efficient security system.

Figure 35:
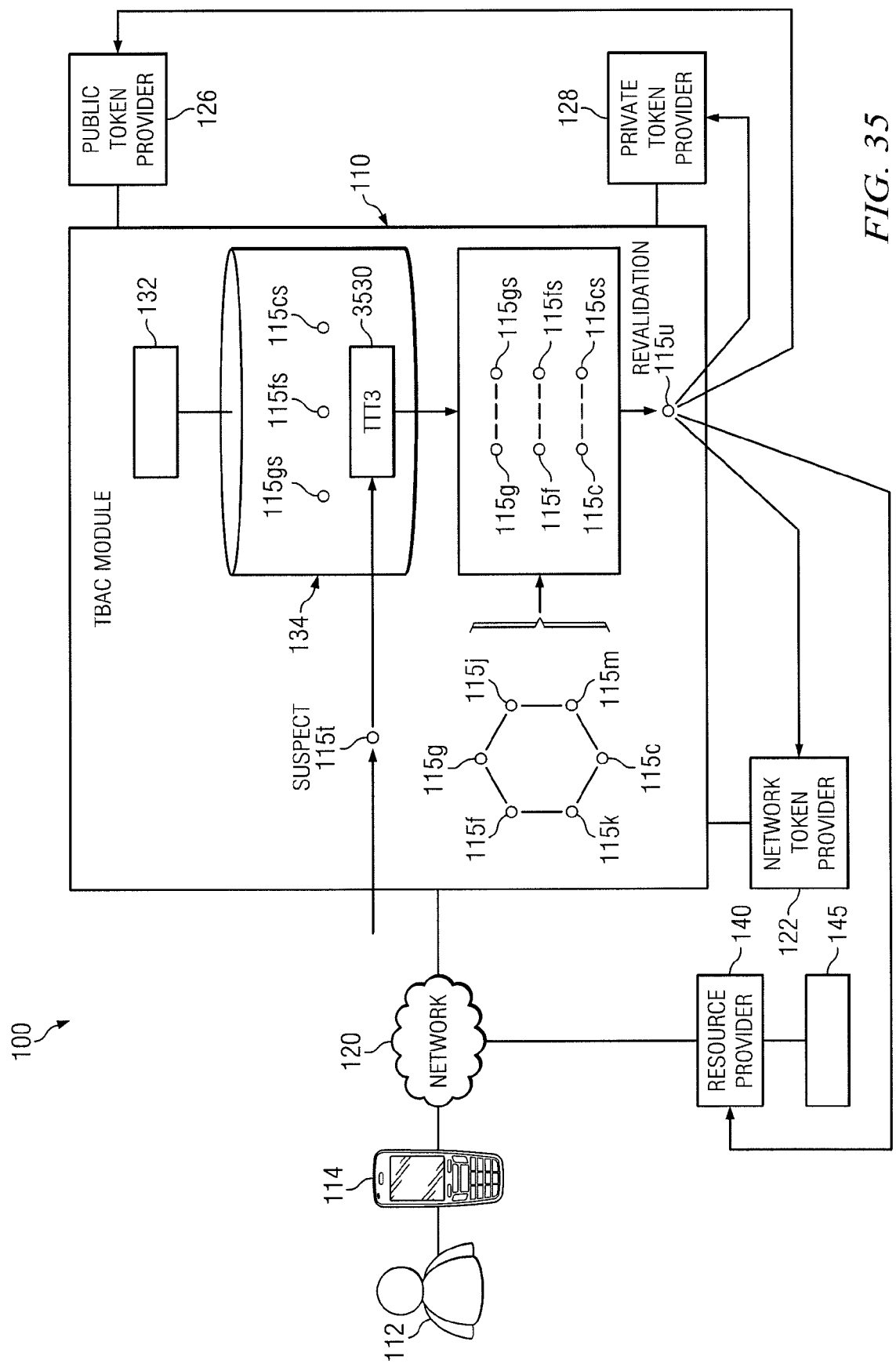
FIG. 35 illustrates the system of FIG. 1 detecting tampering.
Figure 36:
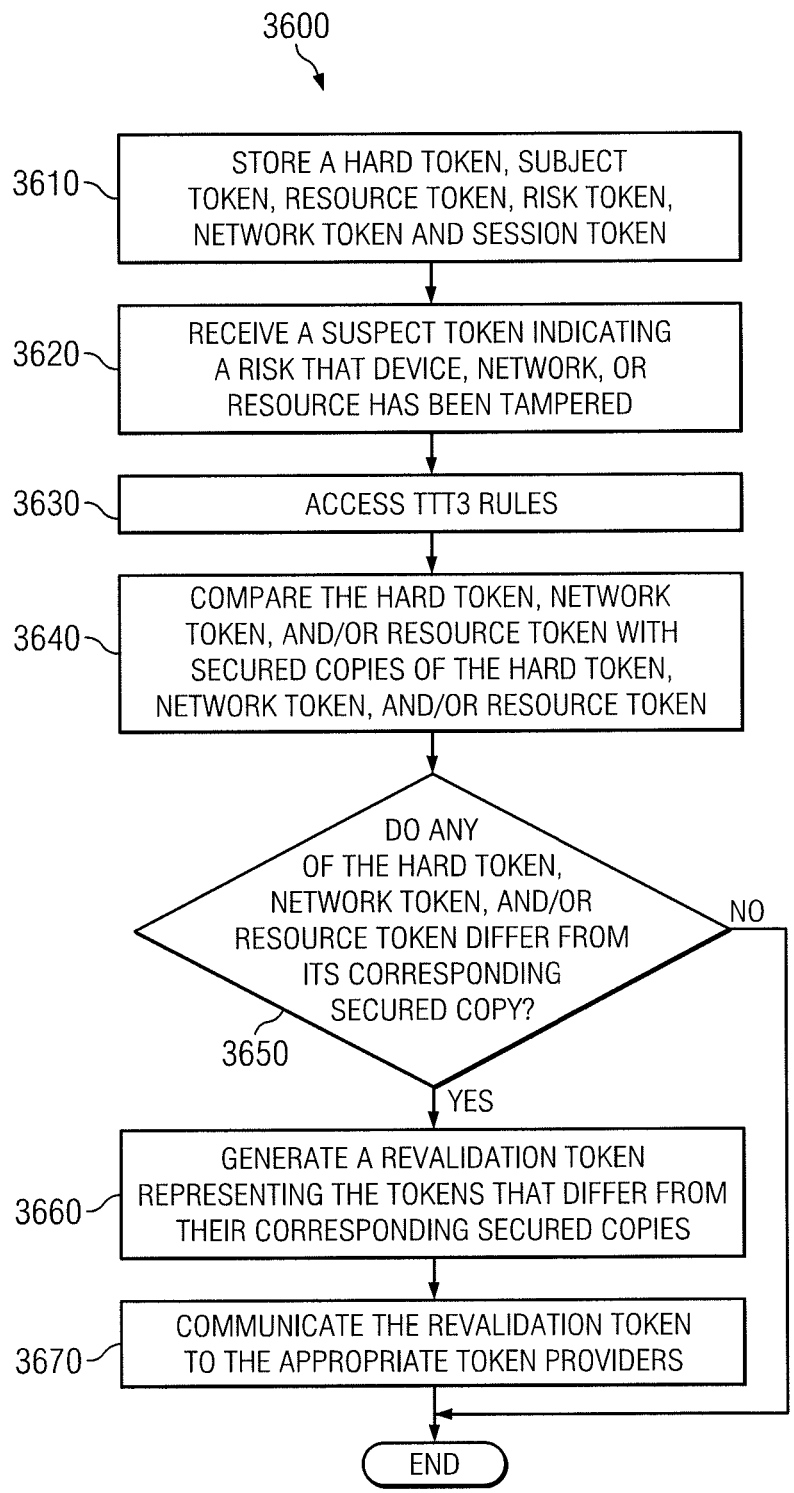
FIG. 36 is a flowchart illustrating a method of detecting tampering using the system of FIG. 1.

FIGS. 35 and 36 illustrate the system 100 performing tamper detection. In general, mechanical components of system 100 such as the device 114, network 120, or resource 145 may be the subject of attacks by viruses, malware, or hackers. When attacks happen, the tokens 115 associated with those mechanical components may be affected. System 100 may detect when those components may be attacked by examining the tokens 115 associated with those components. The process of detecting when those components have been affected is known as tamper detection, which is discussed further with respect to FIGS. 35 and 36.

TBAC module 110 may store tokens 115 associated with the mechanical components of system 100 as well as secured copies of those tokens. An attack on a component may affect the token 115 associated with that component. When a token 115 associated with a component changes, TBAC module 110 may compare the token 115 with its corresponding secured copy to determine if the component has been attacked.

FIG. 35 illustrates the system 100 of FIG. 1 detecting tampering. As provided in FIG. 35, TBAC module 110 may store a hard token 115g, a network toke 115f, a subject token 115k, a resource token 115c, a risk token 115m, and a session token 115j. Hard token 115g may be associated with a device 114. Network token 115f may be associated with network 120 and resource token 115c may be associated with a resource 145. Device 114 may be consuming resource 145 over network 120. Furthermore, hard token 115g, network token 115f, and resource token 115c may have corresponding secured copies 115gs, 115fs, and 115cs stored in memory 134. The secured copies 115gs, 115fs, and 115cs may have been generated when the corresponding tokens 115g, 115f, and 115c were first generated. Although this disclosure describes secured copies 115gs, 115fs, and 115cs stored in a particular component of system 100, this disclosure contemplates secured copies 115gs, 115fs, and 115cs stored in any suitable component of system 100.

In particular embodiments, TBAC module 110 may receive a suspect token 115t that indicates a risk that device 114, network 120, or resource 145 may have been tampered. Tampering may include any security breaches by viruses, malware, or hackers. As an example and not by way of limitation, suspect token 115t may indicate that device 114 has been infected with a virus. As another example and not by way of limitation, suspect token 115t may indicate that network 120 is beginning to distribute malware. As yet another example and not by way of limitation, suspect token 115t may indicate that resource 145 is being targeted in a denial of service attack. Tampering of the device 114, network 120, or resource 145 may result in a change in any of the hard token 115g, network token 115f, or resource token 115c.

TBAC module 110 may detect changes within hard token 115g, network token 115f, or resource token 115c that resulted from tampering. To detect these changes, TBAC module 110 may use suspect token 115t to access token tampering (TTT3) rules 3530 stored in memory 134. In particular embodiments, TTT3 rules 3530 may specify which tokens 115 of the hard token 115g, network token 115f, and resource token 115c may have been affect as a result of the risk indicated in suspect token 115t. TBAC module 110 may then compare the tokens 115 that may have been changed as a result of tampering with their corresponding secured copies. As an example and not by way of limitation, suspect token 115t may indicate a risk that malware may be causing a denial of service attack. In that situation, TTT3 rules 3530 may specify that network token 115f and resource token 115c should be compared with their corresponding secured copies 115fs and 115cs. If any differences that resulted from tampering are detected during the comparisons, TBAC module 110 may indicate that the token 115 containing that difference has been compromised. As an example and not by way of limitation, if network 120 is distributing malware but resource 145 is not experiencing a denial of service attack, then the comparisons may indicate that network token 115f is different from its corresponding secured copy 115fs and that that difference may have resulted from tampering (e.g., malware infection).

In particular embodiments, in response to the determination that a token 115 has been compromised as a result of tampering, TBAC module 110 may replace that token 115 with its corresponding secured copy. As an example and not by way of limitation, if network token 115f has been compromised as a result of tampering, TBAC module 110 may replace network token 115f with its corresponding secured copy 115fs. In certain embodiments, TBAC module 110 may replace the tampered token 115 by terminating the tampered token 115 and generating a new token 115 that matches the corresponding secured copy of the tampered token 115.

In particular embodiments, TBAC module 110 may perform additional checks to determine if a token 115 has been tampered. As an example and not by way of limitation, TBAC module 110 may detect that a Kerberos token 115 associated with device 114 may have been tampered. In addition to comparing the Kerberos token 115 with its corresponding secured copy, TBAC module 110 may verify the integrity of a ticket associated with the Kerberos token 115. If the ticket is valid, TBAC module 110 may treat the valid ticket as an indication that the Kerberos token 115 has not been tampered. If the ticket is invalid, TBAC module 110 may treat the invalid ticket as an indication that the Kerberos token 115 has been tampered.

In particular embodiments, TBAC module 110 may generate a revalidation token 115u to indicate which tokens 115 have been compromised as a result of tampering. As an example and not by way of limitation, if network token 115f has been compromised because network 120 is distributing malware, then revalidation token 115u may indicate that network token 115f has been compromised. In certain embodiments, TBAC module 110 may communicate revalidation token 115u to a token provider corresponding to the token 115 that was compromised as a result of tampering. As an example and not by way of limitation, TBAC module 110 may communicate revalidation token 115*u* to network token provider 122 if network token 115*f* was compromised as a result of tampering. In particular embodiments, revalidation token 115*u* may be communicated to computed risk token provider 124 to compute or recomputed a risk token 115*m*. As an example and not by way of limitation, if a network token 115*f* is discovered to have been tampered, the risk associated with granting access to a resource 145 over network 120 may increase. Computed risk token provider 124 may generate a risk token 115*m* representing that increase in risk. The risk token 115*m* may then be used to facilitate the making of an access decision 900 following the process described with respect to FIGS. 8-10.

Although this disclosure describes TBAC module 110 performing certain actions with respect to FIG. 35, this disclosure contemplates the processor 132 and the memory 134 of the TBAC module 110 performing these actions. The illustration of system 100 in FIG. 35 does not specifically illustrate all of the elements from the illustration of system 100 in FIG. 1 so that particular aspects of system 100 may be emphasized. However, system 100 of FIG. 35 includes all the elements of system 100 in FIG. 1.

FIG. 36 is a flowchart illustrating a method 3600 of detecting tampering using the system 100 of FIG. 1. TBAC module 110 may perform method 3600. As provided in FIG. 36, TBAC module 110 may begin by storing a hard token 115*g*, subject token 115*k*, resource token 115*c*, risk token 115*m*, network token 115*f*, and session token 115*j* in step 3610. The hard token 115*g* may be associated with a device 114. The network token 115*f* may be associated with network 120. The resource token 115*c* may be associated with a resource 145. TBAC module 110 may receive a suspect token 115*t* indicating a risk that device 114, network 120, or resource 145 has been tampered in step 3620. In response to receiving the suspect token 115*t*, TBAC module 110 may access TTT3 rules 3530 in step 3630. TTT3 rules 3530 may specify which tokens 115 should be examined for potential tampering.

TBAC module 110 may then compare the hard token 115*g*, network token 115*f*, and/or resource token 115*c* with secured copies of the hard token 115*gs*, network token 115*fs*, and resource token 115*cs* in step 3640. In step 3650, TBAC module 110 may determine if any of the hard token 115*g*, network token 115*f*, and/or resource token 115*c* differ from its corresponding secured copy 115*gs*, 115*fs*, or 115*cs*. If none of the tokens 115 differ from its corresponding secured copy, TBAC module 110 may conclude. However, if any of the tokens differ from its corresponding secured copy, TBAC module 110 may proceed to step 3660 to generate a revalidation token 115*u* representing the tokens 115 that differ from their corresponding secured copies. TBAC module 110 may then conclude by communicating the revalidation token 115*u* to the appropriate token providers in step 3670. Communicating the revalidation token 115*u* may facilitate the replacement of a tampered token 115 with its corresponding secured copy.

In particular embodiments, because system 100 may detect tampering, system 100 may provide a more responsive and robust security system. Furthermore, because TBAC module 110 uses tokens to monitor components, system 100 may respond faster to any attacks on those components.

Figure 37:
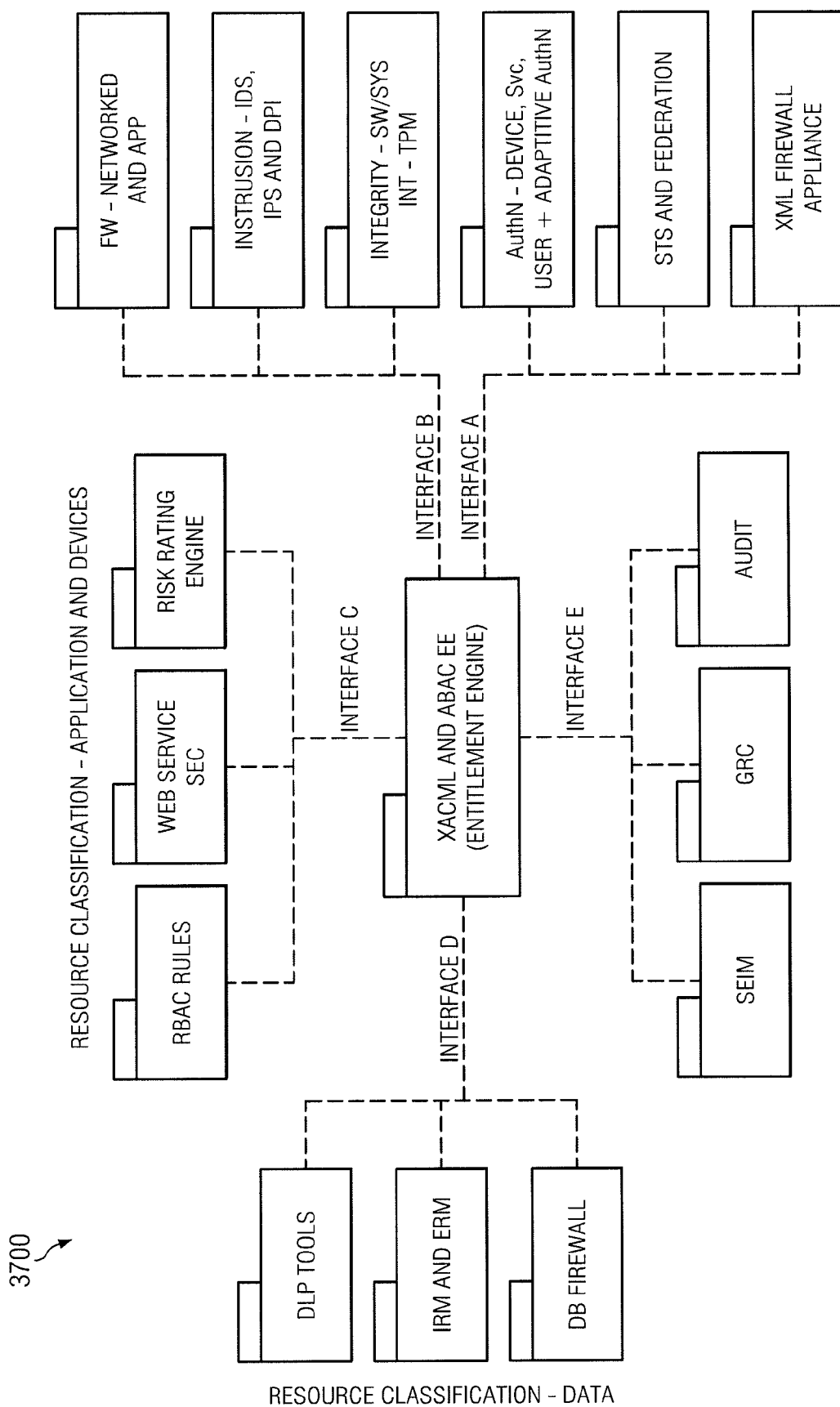
FIG. 37 is a high level architectural diagram of a system that does not use tokens to control access to a resource.
Figure 38:
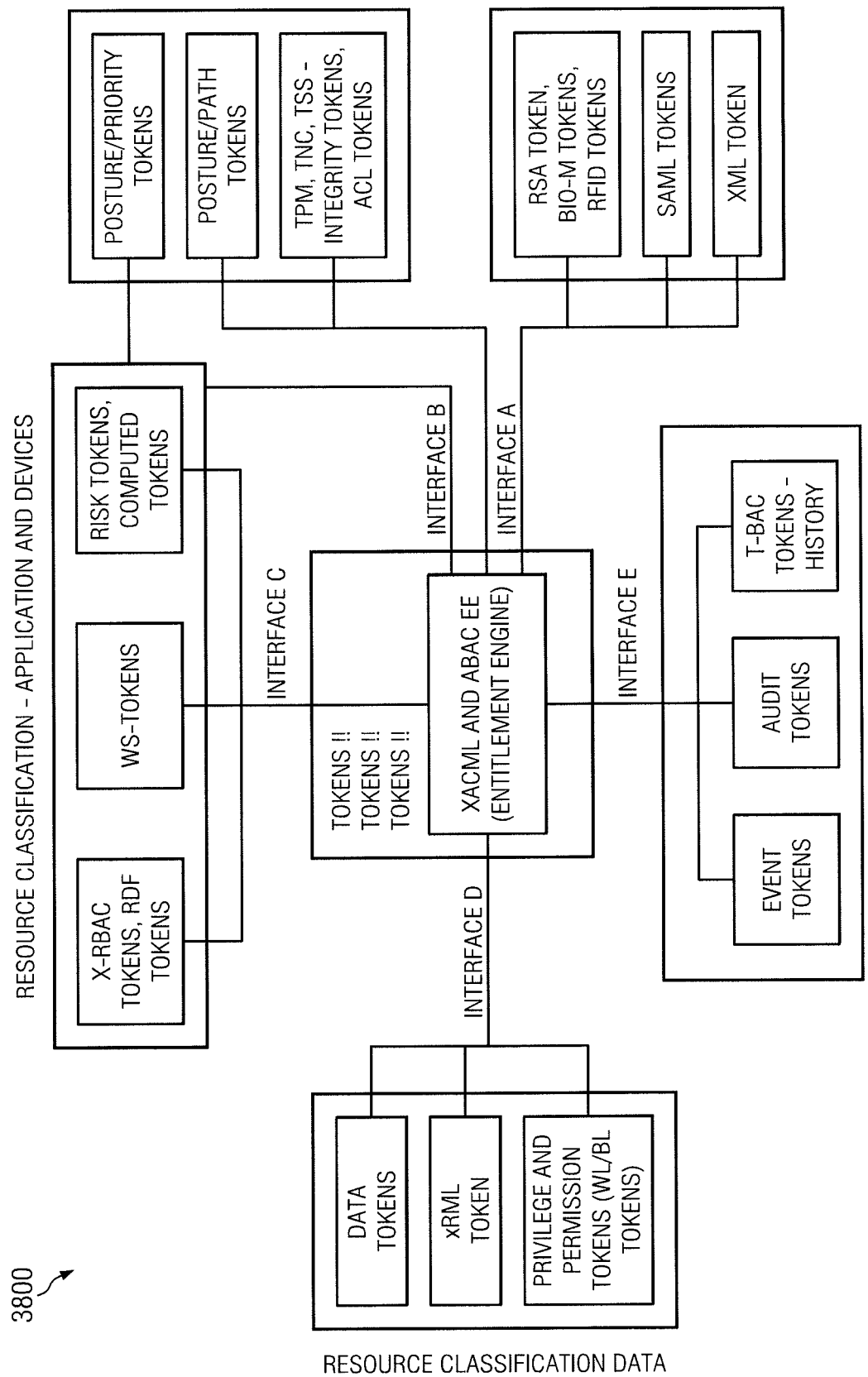
FIG. 38 is a high level architectural diagram of a system that uses tokens to control access to a resource.

FIGS. 37 and 38 are high level architectural diagrams of a system 3700 that does not use tokens 115 and of a system 3800 that does use tokens 115 respectively. System 3700 may include an Entitlement Engine that handles directly attributes 425 associated with Interfaces A-E. To augment system 3700 to use tokens 115, system 3800 may include an additional token layer that interacts with Interfaces A-E. The various interfaces and token layer will be discussed further with respect to FIGS. 37 and 38.

FIG. 37 is a high level architectural diagram of a system 3700 that does not use tokens 115 to control access to a resource 145. As provided in FIG. 37, the Entitlement Engine may make access decisions 900 by directly using attributes 425 associated with Interfaces A-E. Interface A may include attributes 425 associated with authentication (AuthN) such as for example, device 114, service, and user 112 authentication. Interface A may further include attributes 425 associated with STS and Federation and XML Firewall Appliance. Interface B may include attributes 425 associated with network 120 such as for example, firewalls, intrusion, and integrity. Interface C may include attributes 425 associated with risk (similar to the attributes 425 represented by risk token 115*m*). Interface D may include attributes 425 associated with data (similar to attributes 425 associated with data token provider 129). Interface E may include attributes 425 associated with access control management (akin to attributes 425 associated with privilege tokens 115*p*) such as for example, attributes 425 associated with Security Event and Incident Management (SEIM), Governance Risk & Compliance (GRC), and auditing.

FIG. 38 is a high level architectural diagram of a system 3800 that uses token 115 to control access to a resource 145. As provided by FIG. 38, system 3800 may add a layer that processes tokens 115 around the Entitlement Engine, which may now make access decisions 900 by using tokens 115 associated with Interfaces A-E. For example, Interface A may include tokens 115 associated with user 112 authentication, such as for example, biometric tokens, RFID tokens, Rivest, Shamir, Adelman (RSA) tokens, SAML tokens, and XML tokens. These tokens may be similar to subject tokens 115*k*. Interface B may include tokens 115 associated with network 120, such as for example, Posture/Priority tokens, Packet/Path tokens, TPM tokens, TNC tokens, Transaction Security System (TSS) tokens, Integrity tokens, and Access Control List (ACL) tokens. These tokens 115 may be similar to network tokens 115*f*. Interface C may include tokens 115 associated with risk, such as for example, risk tokens 115*m*. Interface D may include tokens 115 associated with data of user 112, such as for example, data tokens 115*e*. Interface D may further include xRML tokens and Privilege/Permission tokens. Interface E may include tokens 115 associated with access control management such as for example, Event tokens, Audit tokens, and T-BAC module 110 tokens.

In particular embodiments, system 3800 may provide several advantages over system 3700 by using tokens 115. First, system 3800 may be operable to align the function of tokens 115 with the appropriate OSI layer associated with the tokens 115. Second, system 3800 may leverage the advances made in token 115 technologies to improve security functions. Third, system 3800 may perform session control via session specific policies using tokens 115. Fourth, system 3800 may leverage the mapping of tokens 115 to attributes 425 for more efficient processing. Fifth, system 3800 may use tokens 115 to quickly and efficiently compute Identity Assurance levels 940, trust levels 920, integrity levels 910, and risk levels 930 to make access decisions 900.

Although this disclosure describes system 100 using singular tokens 115*a-u* to perform the described functions, this disclosure contemplates system 100 using any suitable number and combination of tokens 115*a-u* to perform the described functions.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus comprising:
   a memory operable to store a plurality of tokens indicating a user is requesting access to a resource over a network, the plurality of tokens comprising a resource token indicating a form of authentication provided by the resource; and
   a processor operable to:
      determine at least one condition associated with accessing the resource based on the plurality of tokens, the condition determined in addition to a determination to grant or deny access to the resource, the at least one condition comprising:
         an obligation to be fulfilled, the obligation comprising:
            a task to be performed in conjunction with accessing the resource, wherein the task indicates a peripheral device attached to the device should be removed before access may be granted; and
            a second task that is optional with respect to accessing the resource, the second task indicating synchronizing a system clock of the resource provider with a clock on the network; and
         a message providing instruction regarding how to fulfill the obligation, wherein the message further indicates a reason access to the resource was not granted;
      generate a decision token representing the at least one condition; and
      communicate the decision token to a resource provider to facilitate enforcement of the at least one condition.

2. The apparatus of claim 1, wherein the second task further indicates at least one of initializing logging of errors and performance metrics related with granting access to the resource and consuming the resource, and tracking transactions end to end.

3. The apparatus of claim 1, wherein the obligation further comprises a second task indicating that missing information required to access the resource should be provided.

4. The apparatus of claim 1, the memory further operable to store a plurality of token-based rules, wherein a token-based rule facilitates the generation of the decision token.

5. The apparatus of claim 1, wherein the determination of the at least one privilege is based on a token-based rule.

6. A method for communicating an access control determination to a resource comprising:
   storing a plurality of tokens indicating a user is requesting access to a resource over a network, the plurality of tokens comprising a resource token indicating a form of authentication provided by the resource;
   determining, by a processor, at least one condition associated with accessing the resource based on the plurality of tokens, the condition determined in addition to a determination to grant or deny access to the resource, the at least one condition comprising:
      an obligation to be fulfilled, the obligation comprising:
         a task to be performed in conjunction with accessing the resource, wherein the task indicates a peripheral device attached to the device should be removed before access may be granted; and
         a second task that is optional with respect to accessing the resource, the second task indicating synchronizing a system clock of the resource provider with a clock on the network; and
      a message providing instruction regarding how to fulfill the obligation, wherein the message further indicates a reason access to the resource was not granted;
   generating a decision token representing the at least one condition; and
   communicating, by the processor, the decision token to a resource provider to facilitate enforcement of the at least one condition.

7. The method of claim 6, wherein the second task further indicates at least one of initializing logging of errors and performance metrics related with granting access to the resource and consuming the resource, and tracking transactions end to end.

8. The method of claim 6, wherein the obligation further comprises a second task indicating that missing information required to access the resource should be provided.

9. The method of claim 6, further comprising storing a plurality of token-based rules, wherein a token-based rule facilitates the generation of the decision token.

10. The method of claim 6, wherein the determination of the at least one privilege is based on a token-based rule.

11. One or more computer-readable non-transitory storage media embodying software that is operable when executed to:
   store a plurality of tokens indicating a user is requesting access to a resource over a network, the plurality of tokens comprising a resource token indicating a form of authentication provided by the resource;
   determine at least one condition associated with accessing the resource based on the plurality of tokens, the condition determined in addition to a determination to grant or deny access to the resource, the at least one condition comprising:
      an obligation to be fulfilled, the obligation comprising:
         a task to be performed in conjunction with accessing the resource, wherein the task indicates a peripheral device attached to the device should be removed before access may be granted; and
         a second task that is optional with respect to accessing the resource, the second task indicating synchronizing a system clock of the resource provider with a clock on the network; and
      a message providing instruction regarding how to fulfill the obligation, wherein the message further indicates a reason access to the resource was not granted;
   generate a decision token representing the at least one condition; and
   communicate the decision token to a resource provider to facilitate enforcement of the at least one condition.

12. The media of claim 11, wherein the second task further indicates at least one of initializing logging of errors and performance metrics related with granting access to the resource and consuming the resource, and tracking transactions end to end.

13. The media of claim 11, wherein the obligation further comprises a second task indicating that missing information required to access the resource should be provided.

14. The media of claim 11 embodying software further operable to store a plurality of token-based rules, wherein a token-based rule facilitates the generation of the decision token.

15. The media of claim 11, wherein the determination of the at least one privilege is based on a token-based rule.

* * * * *